US010729206B2

(12) United States Patent
Campos, II et al.

(10) Patent No.: US 10,729,206 B2
(45) Date of Patent: Aug. 4, 2020

(54) ARTICLE OF FOOTWEAR WITH OUTSOLE BONDED TO CUSHIONING COMPONENT AND METHOD OF MANUFACTURING AN ARTICLE OF FOOTWEAR

(71) Applicant: NIKE, Inc., Beaverton, OR (US)

(72) Inventors: Fidencio Campos, II, Dallas, OR (US); Zachary M. Elder, Portland, OR (US); Benjamin J. Monfils, Portland, OR (US); Levi J. Patton, Portland, OR (US); Lee D. Peyton, Tigard, OR (US); Danielle L. Taylor, Portland, OR (US)

( * ) Notice: Subject to any disclaimer, the term of this patent is extended or adjusted under 35 U.S.C. 154(b) by 0 days.

(21) Appl. No.: 16/278,846

(22) Filed: Feb. 19, 2019

(65) Prior Publication Data

US 2019/0174866 A1    Jun. 13, 2019

Related U.S. Application Data

(60) Continuation of application No. 15/348,450, filed on Nov. 10, 2016, now Pat. No. 10,271,613, which is a
(Continued)

(51) Int. Cl.
*A43B 13/20* (2006.01)
*A43B 13/18* (2006.01)
(Continued)

(52) U.S. Cl.
CPC .......... *A43B 13/186* (2013.01); *A43B 1/0072* (2013.01); *A43B 13/141* (2013.01);
(Continued)

(58) Field of Classification Search
CPC ...... A43B 13/20; A43B 13/203; A43B 13/206
See application file for complete search history.

(56) References Cited

U.S. PATENT DOCUMENTS 2,128,134 A * 8/1938 Giusto .................. A43C 15/00
36/7.5
3,251,144 A   5/1966 Weitzner
(Continued)

FOREIGN PATENT DOCUMENTS

WO    WO-2014130626 A1    8/2014

OTHER PUBLICATIONS

USPTO, Final Office Action for U.S. Appl. No. 15/348,450, dated Oct. 29, 2018.
(Continued)

*Primary Examiner* — Ted Kavanaugh
(74) *Attorney, Agent, or Firm* — Honigman LLP; Matthew H. Szalach; Jonathan P. O'Brien

(57) ABSTRACT

A method of manufacturing an article of footwear includes disposing a first polymer sheet and a second polymer sheet in a mold assembly, and disposing a preformed unitary outsole in the mold assembly adjacent the second polymer sheet. The method includes closing the mold assembly to compress the first and second polymer sheets and the outsole, and thermally bonding the first and second polymer sheets to one another in the mold assembly to form a cushioning component with a chamber, a top wall, a bottom wall, a medial side wall, and a lateral side wall. A bottom portion of the outsole is thermally bonded to the bottom wall, a medial side portion of the outsole is thermally bonded to the medial side wall, and a lateral side portion of the outsole is thermally bonded to the lateral side wall.

17 Claims, 43 Drawing Sheets

Related U.S. Application Data division of application No. 14/725,701, filed on May 29, 2015, now Pat. No. 9,521,877, which is a continuation-in-part of application No. 13/773,360, filed on Feb. 21, 2013, now Pat. No. 9,420,848.

(51) Int. Cl.

| | | |
|---|---|---|
| *A43B 1/00* | (2006.01) | |
| *B29D 35/12* | (2010.01) | |
| *A43B 13/14* | (2006.01) | |
| *A43B 13/38* | (2006.01) | |
| *B29D 35/00* | (2010.01) | |
| *B29K 23/00* | (2006.01) | |
| *B29K 75/00* | (2006.01) | |

(52) U.S. Cl.
CPC ............ *A43B 13/189* (2013.01); *A43B 13/20* (2013.01); *A43B 13/206* (2013.01); *A43B 13/38* (2013.01); *B29D 35/0009* (2013.01); *B29D 35/0063* (2013.01); *B29D 35/122* (2013.01); *B29D 35/128* (2013.01); *B29K 2023/086* (2013.01); *B29K 2075/00* (2013.01); *B29K 2995/0026* (2013.01)

(56) References Cited

U.S. PATENT DOCUMENTS

| | | |
|---|---|---|
| 3,719,965 A | 3/1973 | Chevallereau |
| 4,245,406 A | 1/1981 | Landay et al. |
| 4,635,384 A | 1/1987 | Huh et al. |
| 4,817,304 A | 4/1989 | Parker et al. |
| 5,005,299 A | 4/1991 | Whatley |
| 5,010,662 A | 4/1991 | Dabuzhsky et al. |
| 5,083,361 A | 1/1992 | Rudy |
| 5,178,663 A | 1/1993 | Harada et al. |
| 5,245,766 A | 9/1993 | Warren |
| 5,363,570 A * | 11/1994 | Allen .............. A43B 13/20 36/28 |
| 5,425,184 A | 6/1995 | Lyden et al. |
| 5,440,826 A | 8/1995 | Whatley |
| 5,543,194 A * | 8/1996 | Rudy .............. A43B 13/189 428/69 |
| 5,595,004 A | 1/1997 | Lyden et al. |
| D391,750 S | 3/1998 | Santos et al. |
| D391,751 S | 3/1998 | Santos et al. |
| 5,755,001 A | 5/1998 | Potter et al. |
| 5,771,606 A | 6/1998 | Litchfield et al. |
| D395,744 S | 7/1998 | Edington et al. |
| 5,830,553 A | 11/1998 | Huang |
| 5,987,780 A * | 11/1999 | Lyden .............. A43B 13/20 36/153 |
| 5,987,781 A | 11/1999 | Pavesi et al. |
| 5,993,585 A | 11/1999 | Goodwin et al. |
| 6,009,637 A | 1/2000 | Pavone |
| 6,026,593 A | 2/2000 | Harmon-Weiss et al. |
| 6,029,962 A | 2/2000 | Shorten et al. |
| 6,119,371 A | 9/2000 | Goodwin et al. |
| 6,178,663 B1 | 1/2001 | Schoesler |
| 6,253,466 B1 | 7/2001 | Harmon-Weiss et al. |
| 6,266,897 B1 | 7/2001 | Seydel et al. |
| 6,503,355 B1 | 1/2003 | Anzani et al. |
| 6,665,958 B2 * | 12/2003 | Goodwin .............. A43B 13/12 36/29 |
| 6,694,642 B2 | 2/2004 | Turner |
| 6,763,612 B2 | 7/2004 | Stubblefield et al. |
| 6,837,951 B2 | 1/2005 | Rapaport |
| 6,848,201 B2 | 2/2005 | Staffaroni et al. |
| 6,915,594 B2 | 7/2005 | Kim |
| 6,944,973 B2 | 9/2005 | Goodwin |
| 7,080,467 B2 | 7/2006 | Marvin et al. |
| 7,082,702 B2 | 8/2006 | Cretinon |
| 7,086,180 B2 | 8/2006 | Dojan et al. |
| 7,131,218 B2 | 11/2006 | Schindler |
| 7,132,032 B2 | 11/2006 | Tawney et al. |
| 7,331,124 B2 | 2/2008 | Meschan |
| 7,430,817 B2 | 10/2008 | Abadjian et al. |
| 7,451,556 B2 | 11/2008 | Harmon-Weiss et al. |
| 7,555,851 B2 | 7/2009 | Hazenberg et al. |
| 7,588,654 B2 | 9/2009 | Schindler et al. |
| 7,624,516 B2 | 12/2009 | Meschan |
| 7,784,196 B1 | 8/2010 | Christensen et al. |
| 7,802,378 B2 | 9/2010 | Harmon Weiss et al. |
| 8,151,486 B2 | 4/2012 | Dua |
| 8,181,361 B2 | 5/2012 | Kimura |
| 8,225,533 B2 | 7/2012 | Meschan |
| 8,241,451 B2 | 8/2012 | Rapaport et al. |
| 8,296,969 B2 | 10/2012 | Granger et al. |
| 8,341,857 B2 | 1/2013 | Dojan et al. |
| 8,789,294 B2 | 7/2014 | Dojan et al. |
| 2001/0011427 A1 | 8/2001 | Seydel et al. |
| 2003/0150133 A1 * | 8/2003 | Staffaroni .............. A43B 13/20 36/35 B |
| 2005/0000115 A1 | 1/2005 | Kimura et al. |
| 2005/0167029 A1 | 8/2005 | Rapaport et al. |
| 2005/0252038 A1 | 11/2005 | Braunschweiler |
| 2005/0268492 A1 | 12/2005 | Fuerst |
| 2007/0063368 A1 * | 3/2007 | Schindler .............. A43B 13/187 264/45.1 |
| 2007/0169379 A1 | 7/2007 | Hazenberg et al. |
| 2007/0240332 A1 | 10/2007 | Ellis |
| 2008/0005929 A1 | 1/2008 | Hardy et al. |
| 2009/0013558 A1 * | 1/2009 | Hazenberg ........... A43B 1/0009 36/88 |
| 2009/0178300 A1 | 7/2009 | Parker |
| 2009/0288312 A1 | 11/2009 | Dua |
| 2009/0293305 A1 | 12/2009 | Pelsue et al. |
| 2010/0263240 A1 | 10/2010 | Shelton et al. |
| 2010/0325914 A1 * | 12/2010 | Peyton .............. A43B 7/144 36/29 |
| 2011/0030240 A1 | 2/2011 | Schmidt |
| 2011/0131831 A1 | 6/2011 | Peyton et al. |
| 2011/0252670 A1 | 10/2011 | Smith |
| 2012/0117826 A1 | 5/2012 | Jarvis |
| 2012/0174434 A1 | 7/2012 | Ellis |
| 2012/0260526 A1 | 10/2012 | Smith et al. |
| 2012/0291312 A1 | 11/2012 | Peyton et al. |
| 2013/0227858 A1 * | 9/2013 | James .............. A43B 13/20 36/88 |
| 2013/0276329 A1 | 10/2013 | James |
| 2014/0230272 A1 | 8/2014 | Feshbach et al. |
| 2014/0230276 A1 | 8/2014 | Campos, II et al. |
| 2014/0259742 A1 | 9/2014 | Wu et al. |
| 2014/0259749 A1 | 9/2014 | Taylor et al. |
| 2015/0040425 A1 | 2/2015 | Adams |
| 2015/0040426 A1 | 2/2015 | Elder et al. |
| 2015/0173456 A1 | 6/2015 | Rushbrook |
| 2015/0257483 A1 | 9/2015 | Meschter et al. |
| 2015/0272271 A1 | 10/2015 | Campos, II et al. |
| 2015/0273778 A1 | 10/2015 | Campos, II et al. |

OTHER PUBLICATIONS

USPTO, Non-Final Office Action for U.S. Appl. No. 15/348,450, dated May 1, 2018.

International Search Report and Written Opinion for International Application No. PCT/US2014/017310, dated Jul. 22, 2014.

USPTO, Non-Final Office Action for U.S. Appl. No. 13/773,360, dated Dec. 9, 2015.

* cited by examiner

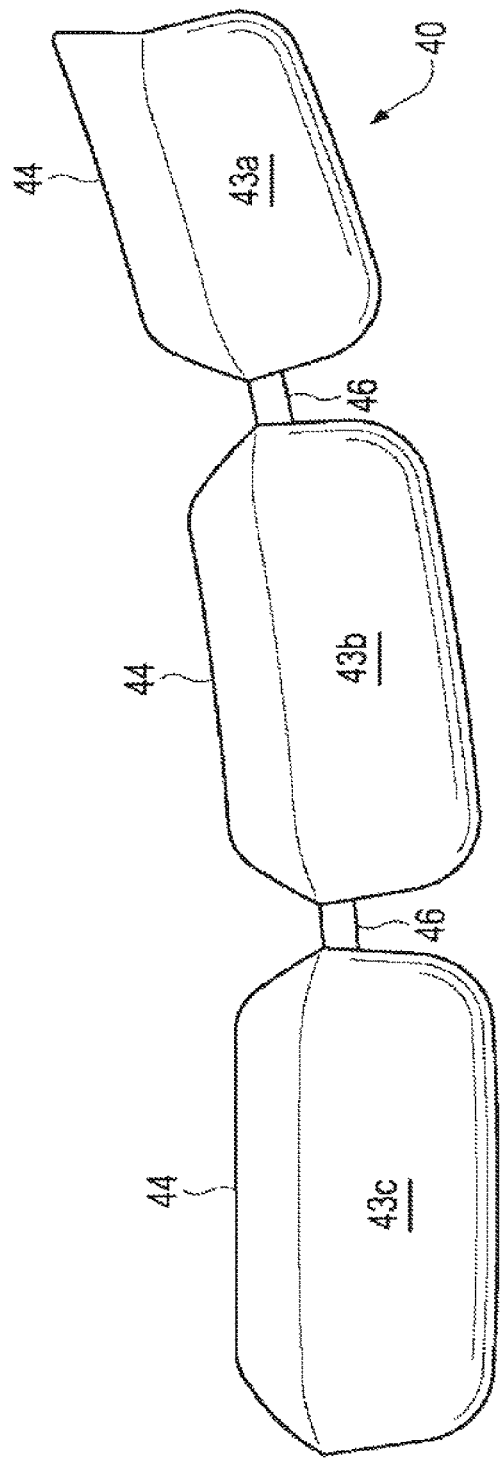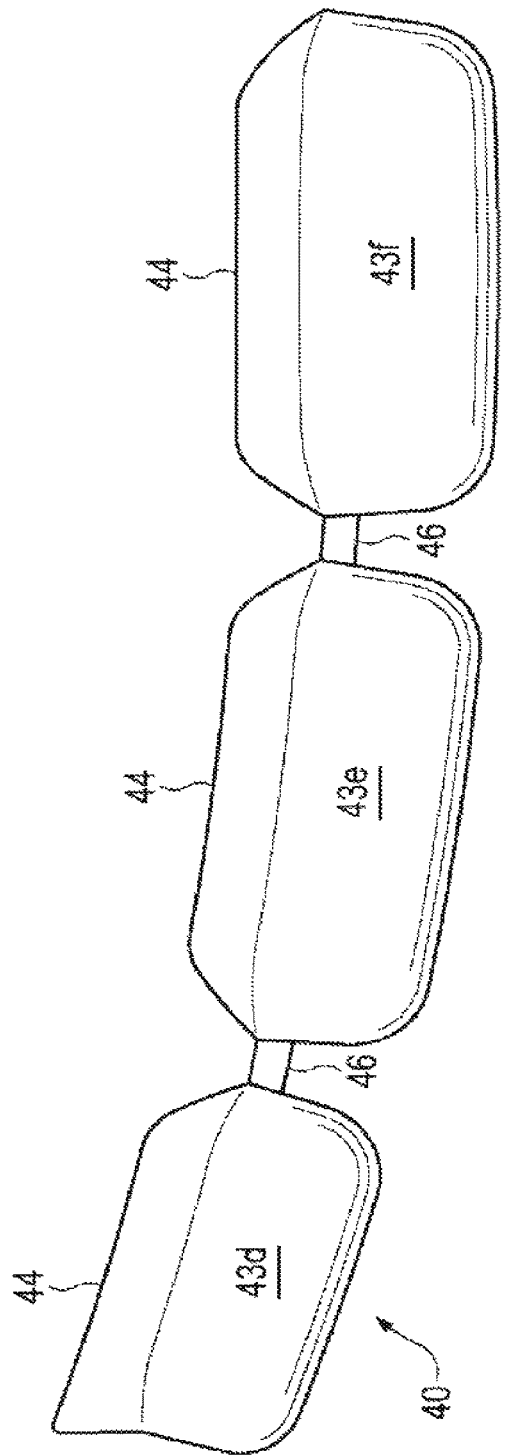

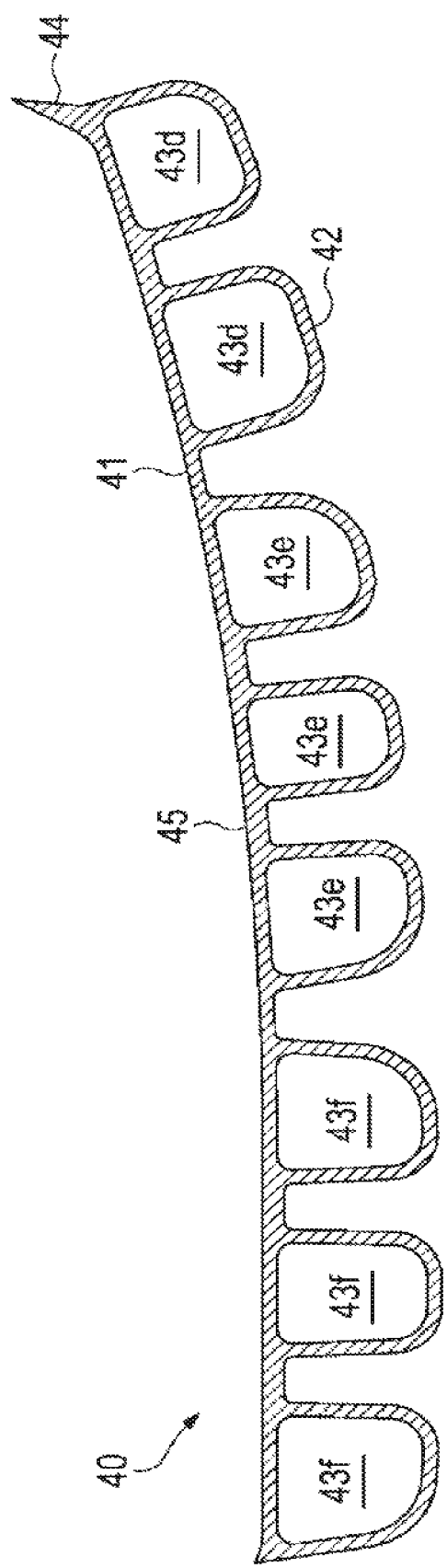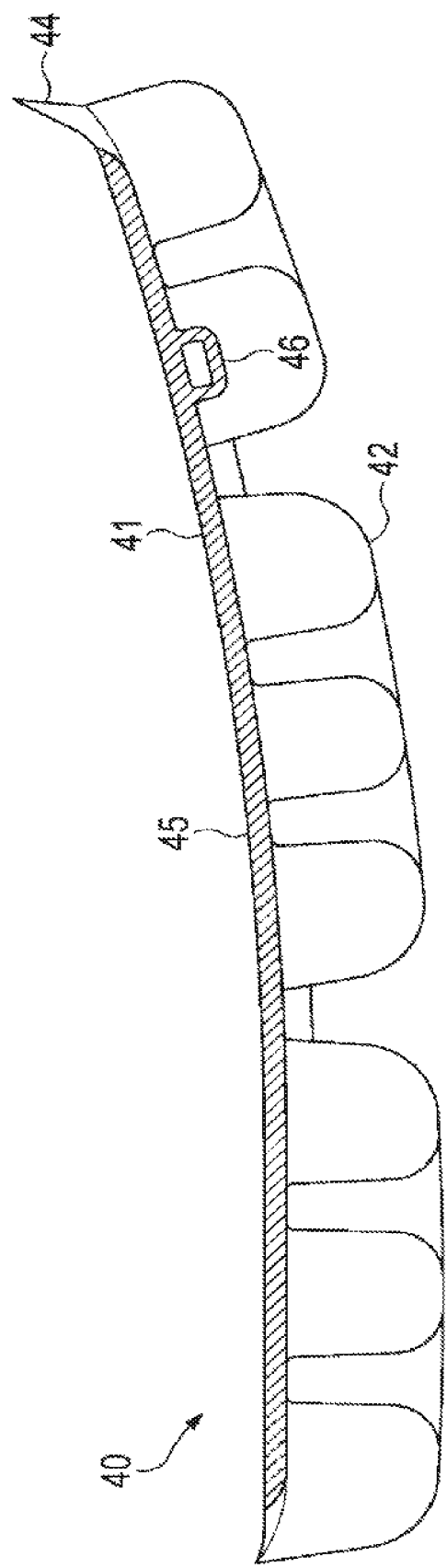

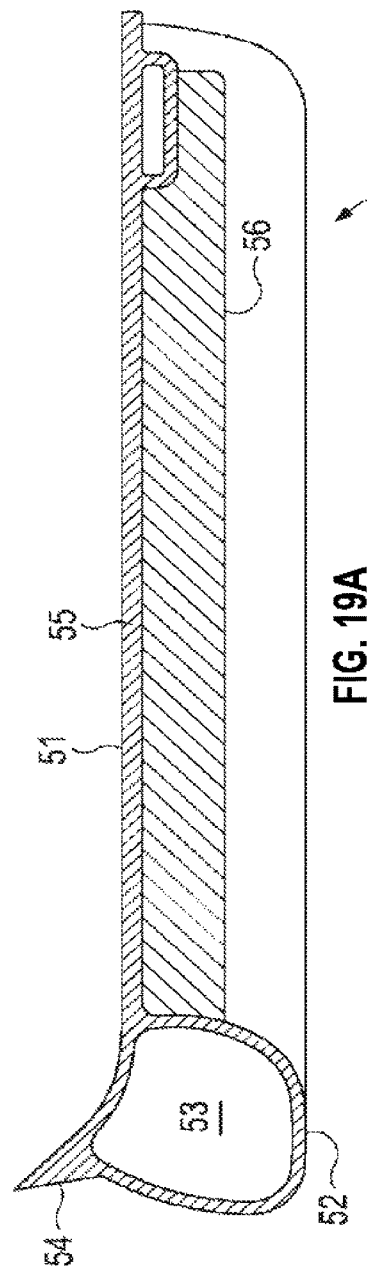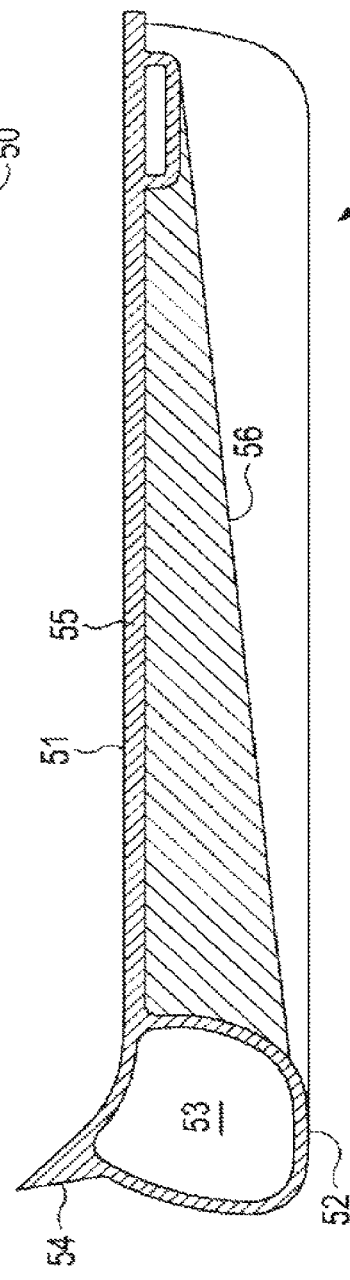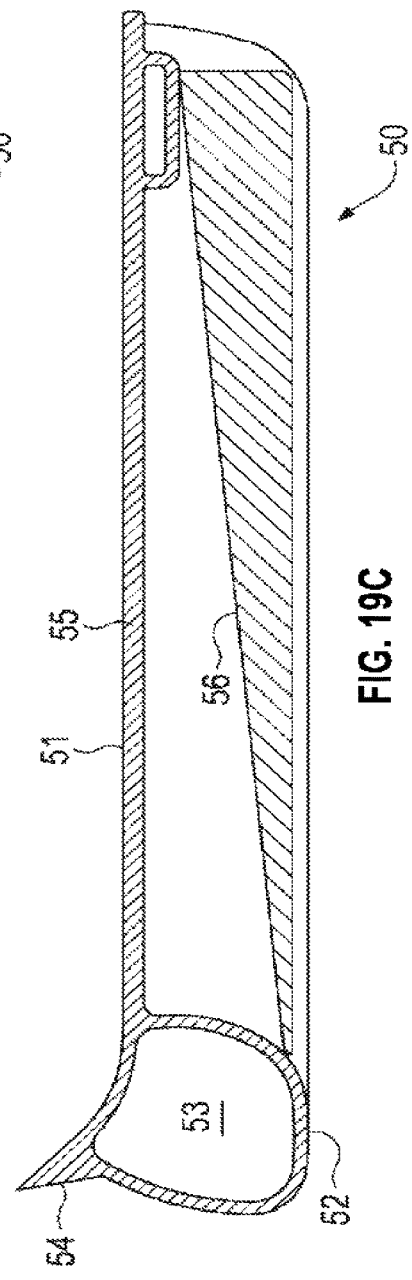

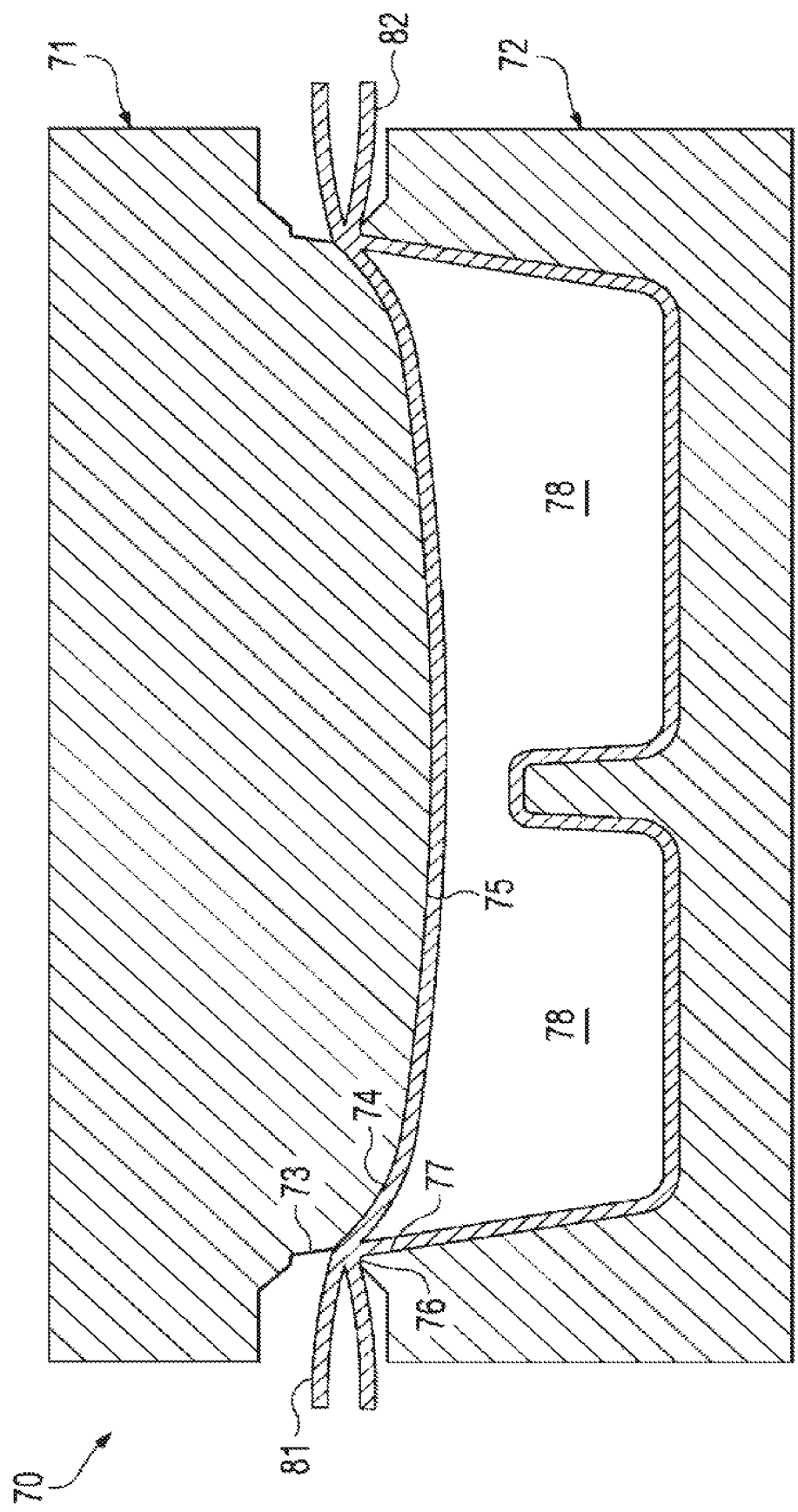

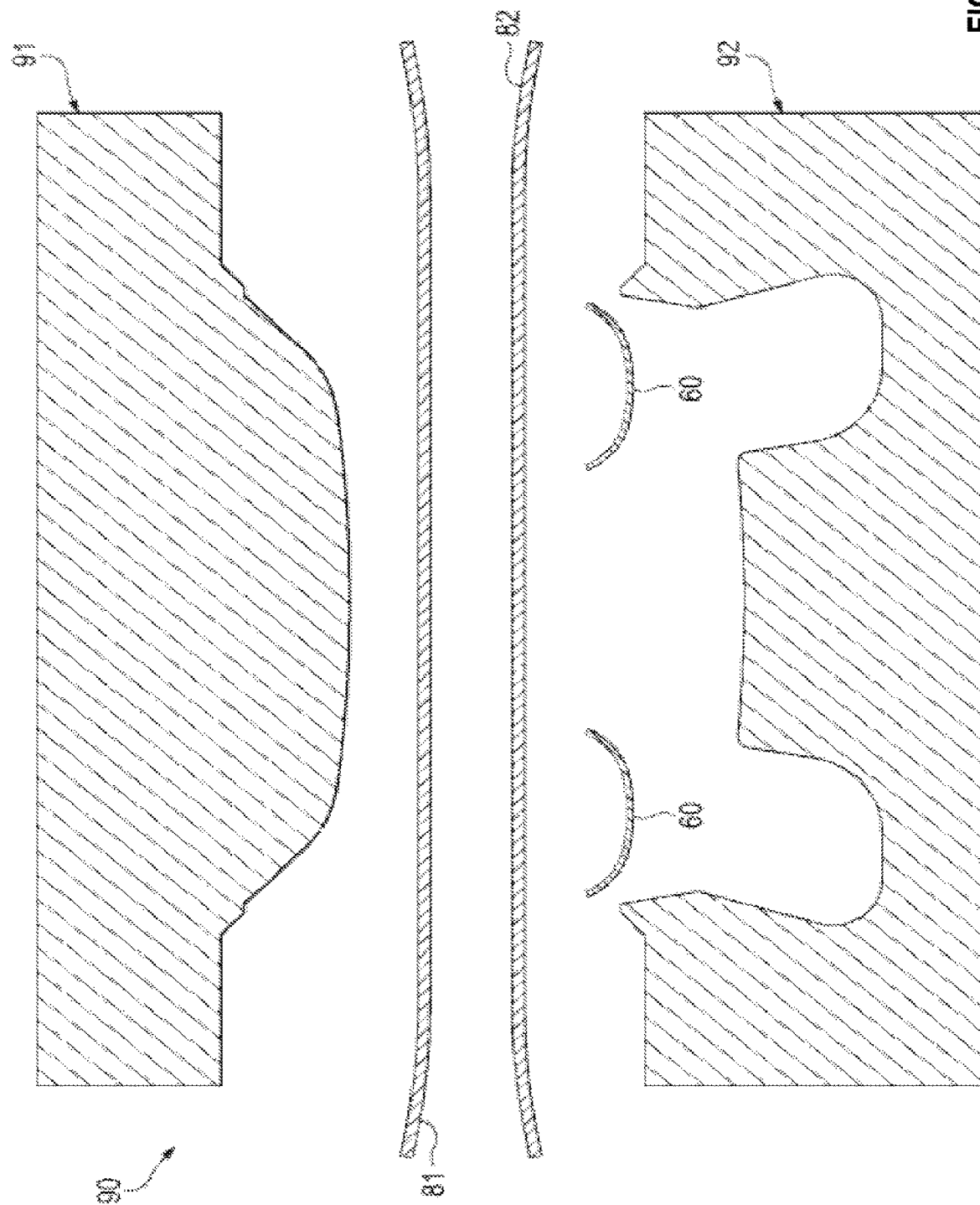

ARTICLE OF FOOTWEAR WITH OUTSOLE BONDED TO CUSHIONING COMPONENT AND METHOD OF MANUFACTURING AN ARTICLE OF FOOTWEAR

CROSS REFERENCE TO RELATED APPLICATIONS

This application is a continuation of and claims the benefit of priority to U.S. application Ser. No. 15/348,450, filed Nov. 10, 2016, which is hereby incorporated by reference in its entirety. U.S. application Ser. No. 15/348,450 is a divisional of and claims the benefit of priority to U.S. application Ser. No. 14/725,701, filed May 29, 2015, now U.S. Pat. No. 9,521,877, which is hereby incorporated by reference in its entirety. U.S. application Ser. No. 14/725,701 is a continuation-in-part of and claims the benefit of priority to U.S. application Ser. No. 13/773,360, filed Feb. 21, 2013, now U.S. Pat. No. 9,420,848, which is incorporated by reference in its entirety.

TECHNICAL FIELD

The present teachings generally include a method of manufacturing an article of footwear with a cushioning component and an outsole.

BACKGROUND

Conventional articles of athletic footwear include two primary elements, an upper and a sole structure. The upper is generally formed from a plurality of elements (e.g., textiles, foam, leather, synthetic leather) that are stitched or adhesively bonded together to form an interior void for securely and comfortably receiving a foot. The sole structure incorporates multiple layers that are conventionally referred to as a sockliner, a midsole, and an outsole. The sockliner is a thin, compressible member located within the void of the upper and adjacent to a plantar (i.e., lower) surface of the foot to enhance comfort. The midsole is secured to the upper and forms a middle layer of the sole structure that attenuates ground reaction forces (i.e., imparts cushioning) during walking, running, or other ambulatory activities. The outsole forms a ground-contacting element of the footwear and is usually fashioned from a durable and wear-resistant rubber material that includes texturing to impart traction.

The primary material forming many conventional midsoles is a polymer foam, such as polyurethane or ethylvinylacetate. In some articles of footwear, the midsole may also incorporate a fluid-filled chamber that increases durability of the footwear and enhances ground reaction force attenuation of the sole structure. In some footwear configurations, the fluid-filled chamber may be at least partially encapsulated within the polymer foam, as in U.S. Pat. No. 5,755,001 to Potter, et al., U.S. Pat. No. 6,837,951 to Rapaport, and U.S. Pat. No. 7,132,032 to Tawney, et al. In other footwear configurations, the fluid-filled chamber may substantially replace the polymer foam, as in U.S. Pat. No. 7,086,180 to Dojan, et al. In general, the fluid-filled chambers are formed from a polymer material that is sealed and pressurized, but may also be substantially unpressurized or pressurized by an external source. In some configurations, textile or foam tensile members may be located within the chamber, or reinforcing structures may be bonded to an exterior surface of the chamber to impart shape to or retain an intended shape of the chamber.

Fluid-filled chambers suitable for footwear applications may be manufactured through various processes, including a two-film technique, thermoforming, and blowmolding. In the two-film technique, two planar sheets of polymer material are bonded together in various locations to form the chamber. In order to pressurize the chamber, a nozzle or needle connected to a fluid pressure source is inserted into a fill inlet formed in the chamber. Following pressurization, the fill inlet is sealed and the nozzle is removed. Thermoforming is similar to the two-film technique, but utilizes a heated mold that forms or otherwise shapes the sheets of polymer material during the manufacturing process. In blowmolding, a molten or otherwise softened elastomeric material in the shape of a tube (i.e., a parison) is placed in a mold having the desired overall shape and configuration of the chamber. The mold has an opening at one location through which pressurized air is provided. The pressurized air induces the liquefied elastomeric material to conform to the shape of the inner surfaces of the mold, thereby forming the chamber, which may then be pressurized.

BRIEF DESCRIPTION OF THE DRAWINGS

FIG. 7 is a lateral side elevational view of the forefoot component.

FIG. 8 is a medial side elevational view of the forefoot component.

FIGS. 9A-9E are cross-sectional views of the forefoot component, as defined by section lines 9A-9E in FIG. 5.

FIGS. 19A-19C are cross-sectional views corresponding with FIG. 17B and depicting further configurations of the heel component.

FIGS. 22A-22E are cross-sectional views depicting a manufacturing process for forming the forefoot component utilizing the forefoot component mold, as defined along a section line 22 in FIGS. 20 and 21.

FIGS. 25A-25D are cross-sectional views depicting a manufacturing process for forming the heel component utilizing the heel component mold, as defined along a section line 25 in FIGS. 23 and 24.

DESCRIPTION

Figure 1:
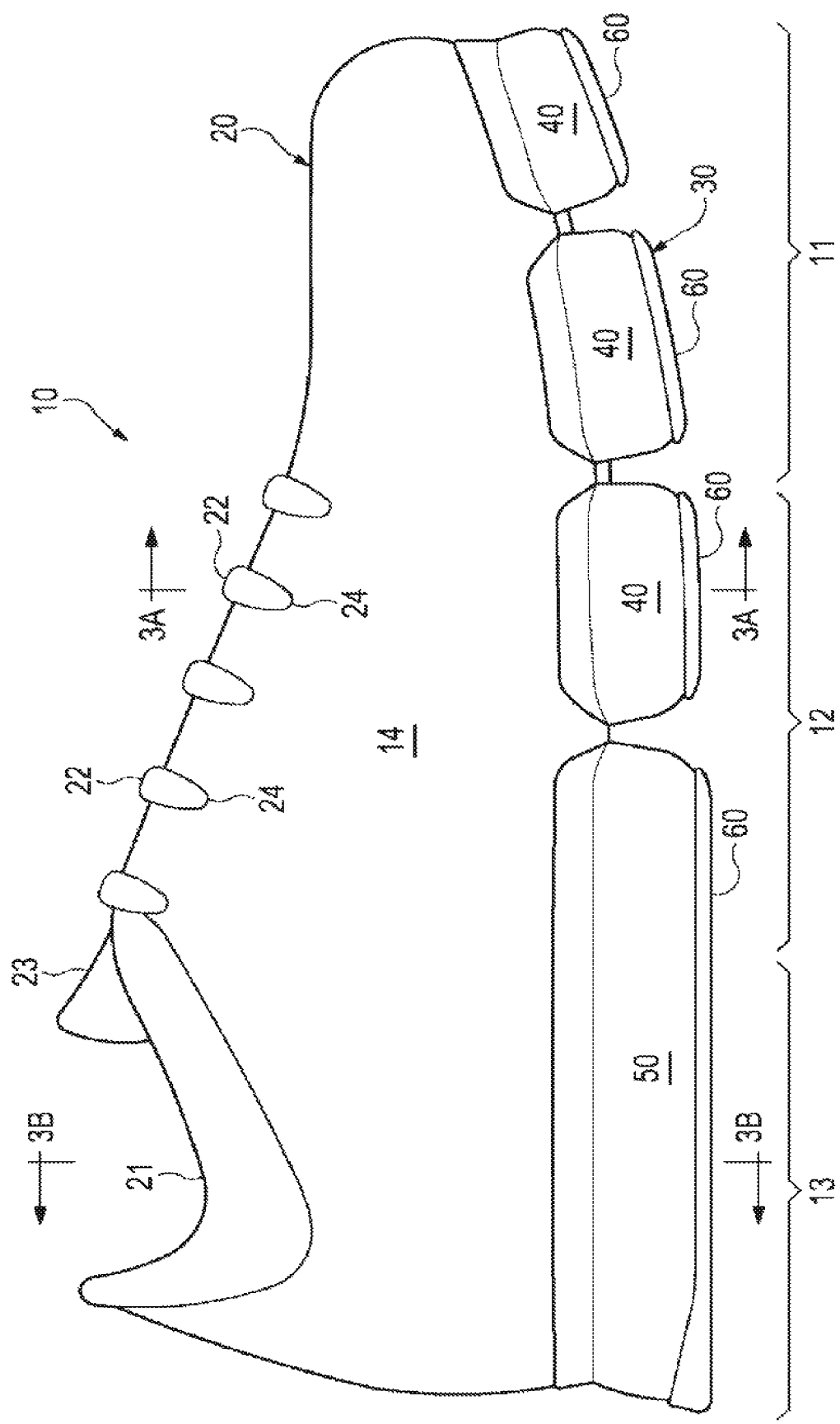
FIG. 1 is lateral side elevational view of an article of footwear.

An article of footwear is provided that comprises a sole structure having a cushioning component defining an enclosed, fluid-filled chamber. The cushioning component has a top wall, a bottom wall, a medial side wall, and a lateral side wall. The cushioning component includes a unitary outsole having a bottom portion, a medial side portion, and a lateral side portion. The bottom portion is bonded to the bottom wall, the medial side portion is bonded to the medial side wall, and the lateral side portion is bonded to the lateral side wall of the cushioning component. The unitary outsole thus wraps around the cushioning component by extending at least partially up the side portions from the bottom portion. The unitary outsole may also have integral tread portions on the bottom portion.

The bottom wall of the cushioning component may have a heel portion, a midfoot portion, and a forefoot portion. The bottom portion of the outsole may be coextensive with the bottom wall of the cushioning component.

In an embodiment, the cushioning component includes a first polymer sheet, and a second polymer sheet bonded to the first polymer sheet so that the first and second polymer sheets form a peripheral flange and define the fluid-filled chamber. The first polymer sheet includes the top wall, and the second polymer sheet includes the bottom wall, the medial side wall and the lateral side wall. The peripheral flange is nearer the top wall than the bottom wall.

The first polymer sheet and the second polymer sheet may be a variety of materials, such as multi-layer polymer sheets including thermoplastic polyurethane layers alternating with barrier layers that comprise a copolymer of ethylene and vinyl alcohol (EVOH) impermeable to fluid contained in the chamber.

The cushioning component may include a tether element joined to an inner surface of the top wall and to an inner surface of the bottom wall within the chamber. The tether element may be any of various configurations. In an embodiment, the tether element includes a first plate bonded to the inner surface of the top wall, a second plate bonded to the inner surface of the bottom wall, and a plurality of tethers secured to the first plate and to the second plate and extending in the fluid-filled chamber between the first plate and the second plate. The fluid-filled chamber may be pressurized by fluid in the chamber to place the tethers in tension.

In an embodiment, the cushioning component has a midfoot portion and a heel portion rearward of the midfoot portion. At least one of the lateral side portion and the medial side portion forms at least one peak disposed at or rearward of the midfoot portion and at least one valley disposed rearward of the at least one peak. The peak may be at least partially aligned with the tether element. In one embodiment, the cushioning component is substantially transparent. This allows the tethers to be viewed through the valley. Additionally, the outsole may be substantially transparent, such as a substantially transparent thermoplastic polyurethane. In such an embodiment, the tethers may be viewed both through the valley and through the peak.

The at least one peak may include multiple peaks and the at least one valley may include multiple valleys, with the peaks and the valleys arranged in alternating order such that the peaks are spaced apart from one another by the valleys. Additionally, the peaks may vary in height. For example, the cushioning component may have a heel portion, a midfoot portion, and a forefoot portion. A first one of the peaks may be at the heel portion and have a first height, and a second one of the peaks may be at the forefoot portion and have a second height less than the first height. A third one of the peaks may be at the midfoot portion and have a third height less than the second height. In an embodiment, the peaks and the valleys are fingers and notches, respectively.

The article of footwear may include an additional footwear component, such as an upper, that has a bottom surface, a lateral surface, and a medial surface. The bottom surface may be supported on the top wall of the cushioning component. The peripheral flange of the cushioning component may be bonded to the lateral surface and the medial surface of the additional footwear component. Accordingly, the outsole cups the cushioning component by wrapping at least partially up the sides of the cushioning component, and the peripheral flange of the cushioning component cups the additional footwear component by wrapping at least partially up the sides of the additional footwear component.

A method of manufacturing an article of footwear includes disposing first and second polymer sheets in a mold assembly, and disposing a preformed unitary outsole in the mold assembly adjacent the second polymer sheet. The preformed unitary outsole has a bottom portion, a medial side portion, and a lateral side portion, and may be preformed such as by injection molding. The method includes closing the mold assembly to compress the first and second polymer sheets and the outsole, and thermally bonding the first and second polymer sheets, and the outsole to one another in the mold assembly. The first and second polymer sheets are bonded to one another to form a cushioning component with a chamber. The cushioning component has a top wall, a bottom wall, a medial side wall, and a lateral side wall. The bottom portion of the outsole is bonded to the bottom wall, the medial side portion of the outsole is bonded to the medial side wall, and the lateral side portion of the outsole is bonded to the lateral side wall.

In an embodiment, the cushioning component has a midfoot portion and a heel portion rearward of the midfoot portion, and at least one of the lateral side portion and the medial side portion forms at least one peak disposed at or rearward of the midfoot portion and at least one valley disposed rearward of the at least one peak. In such an embodiment, disposing the preformed unitary outsole adjacent the second polymer sheet may include aligning the at least one peak with the tether element.

In an embodiment, thermally bonding the first and second polymer sheets to one another in the mold assembly comprises establishing a peripheral flange, and the method further includes bonding the peripheral flange to side surfaces of an additional footwear component, such as an upper.

The method may include thermoforming the first and second polymer sheets in the mold assembly, such as to conform to shapes of the mold portions. The method may further include vacuum forming the first and second polymer sheets in the mold assembly, such as to draw the first polymer sheet against the surface of a portion of the mold and to draw the second polymer sheet against the outsole.

In an embodiment, the method includes disposing a tether element in a mold assembly between a first polymer sheet and a second polymer sheet. The chamber contains the tether element, and the tether element is bonded to inner surfaces of the first and second polymer sheets. The tether element may include a first plate thermally bonded to the top wall, a second plate thermally bonded to the bottom wall, and a plurality of tethers secured to the first plate and to the second plate and extending in the chamber between the first plate and the second plate. Thermally bonding the tether element to inner surfaces of the first and second polymer sheets may be simultaneous with thermally bonding the first and second polymer sheets to one another to establish a peripheral flange. The method may include inflating the chamber to place the tethers in tension.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

The following discussion and accompanying figures disclose various fluid-filled chambers. Concepts related to the chambers are disclosed with reference to footwear that is suitable for running. The chambers are not limited to footwear designed for running, however, and may be utilized with a wide range of athletic footwear styles, including basketball shoes, cross-training shoes, cycling shoes, football shoes, soccer shoes, tennis shoes, and walking shoes, for example. Various configurations of the chambers may be utilized with footwear styles that are generally considered to be non-athletic, including dress shoes, loafers, sandals, and boots. Accordingly, concepts related to the chambers may apply to a wide variety of footwear styles.

General Footwear Structure

Figure 2:
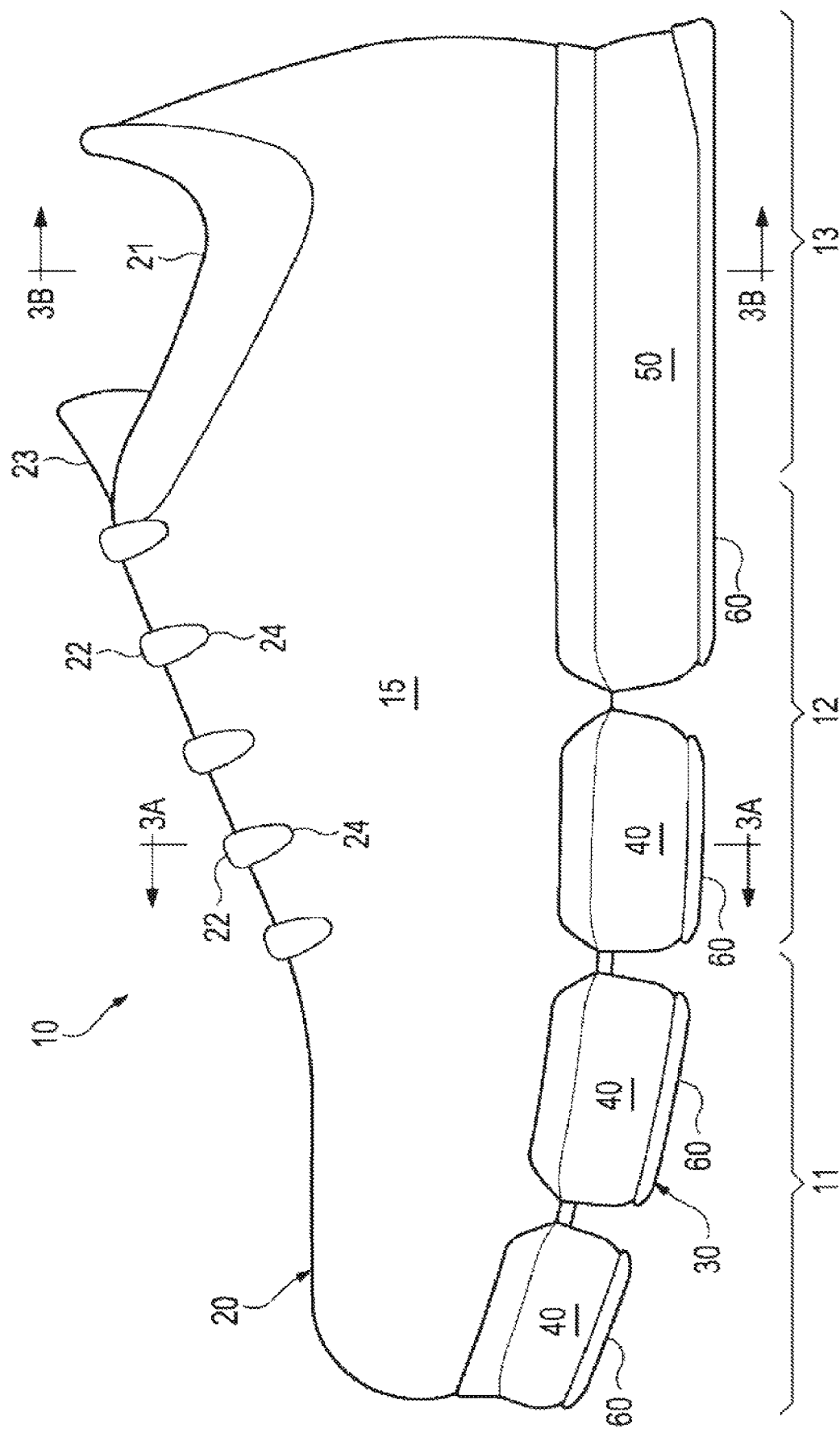
FIG. 2 is a medial side elevational view of the article of footwear.

An article of footwear 10 is depicted in FIGS. 1 and 2 as including an upper 20 and a sole structure 30. Upper 20 provides a comfortable and secure covering for a foot of a wearer. As such, the foot may be located within upper 20 to effectively secure the foot within footwear 10 or otherwise unite the foot and footwear 10. Sole structure 30 is secured to a lower area of upper 20 and extends between the foot and the ground to attenuate ground reaction forces (i.e., cushion the foot), provide traction, enhance stability, and influence the motions of the foot, for example. In effect, sole structure 30 is located under the foot and supports the foot.

For reference purposes, footwear 10 may be divided into three general regions: a forefoot region 11, a midfoot region 12, and a heel region 13. Forefoot region 11 generally includes portions of footwear 10 corresponding with toes of the foot and the joints connecting the metatarsals with the phalanges. Midfoot region 12 generally includes portions of footwear 10 corresponding with an arch area of the foot. Heel region 13 generally corresponds with rear portions of the foot, including the calcaneus bone. Footwear 10 also includes a lateral side 14 and a medial side 15, which correspond with opposite sides of footwear 10 and extend through each of regions 11-13. More particularly, lateral side 14 corresponds with an outside area of the foot (i.e. the surface that faces away from the other foot), and medial side 15 corresponds with an inside area of the foot (i.e., the surface that faces toward the other foot). Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Figure 3A:
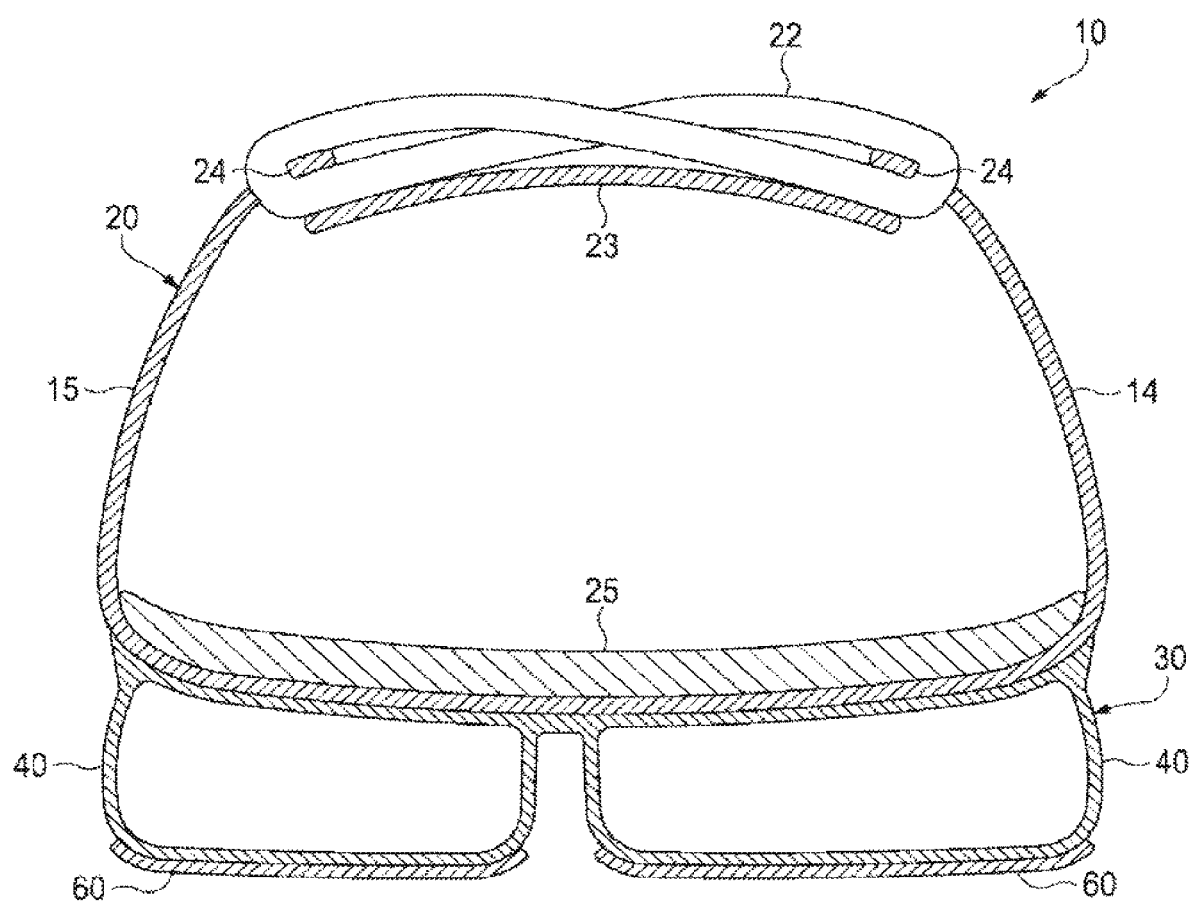
FIGS. 3A and 3B are cross-sectional views of the article of footwear, as defined by section lines 3A and 3B in FIGS. 1 and 2
Figure 3B:
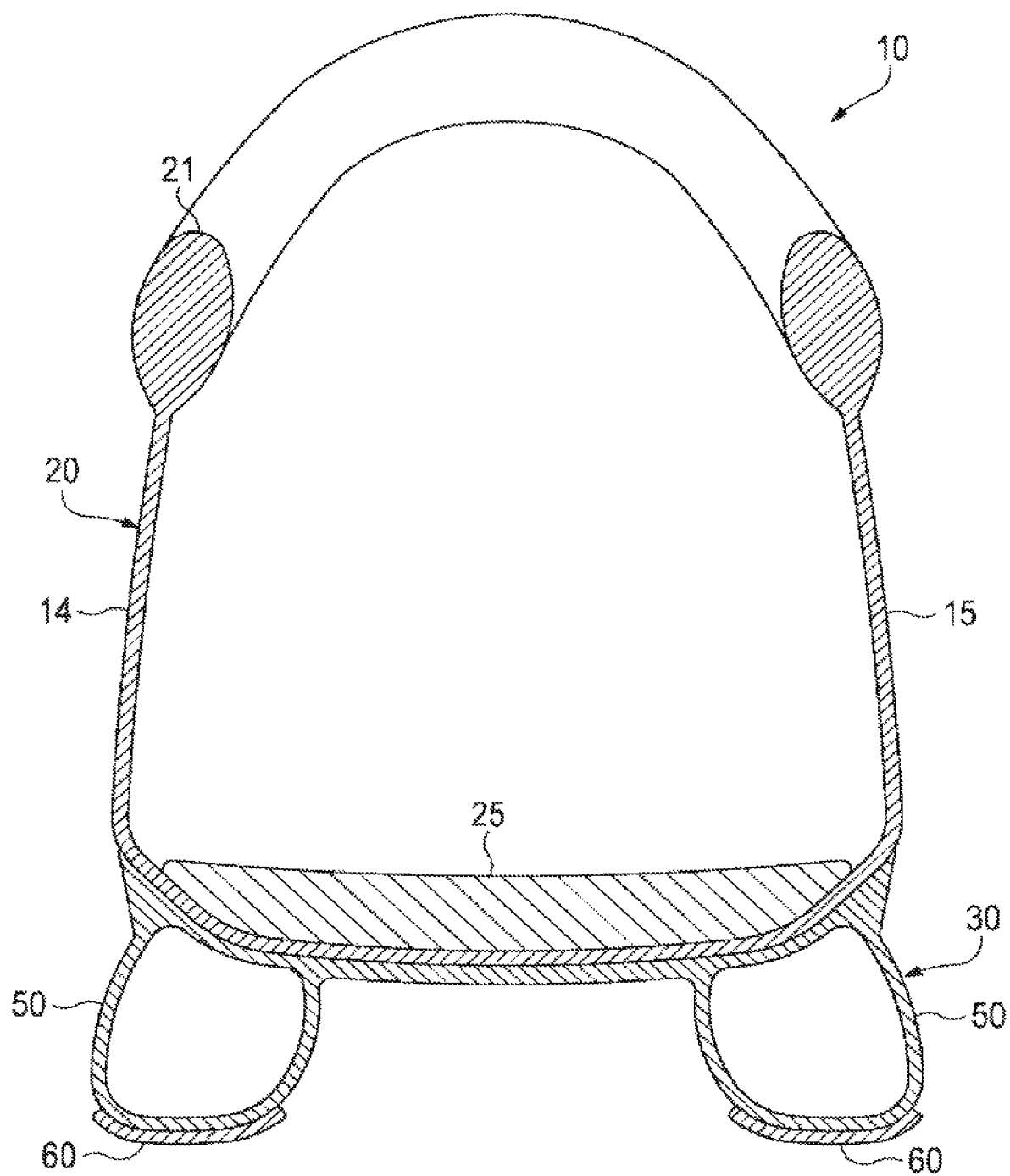
Figure 4:
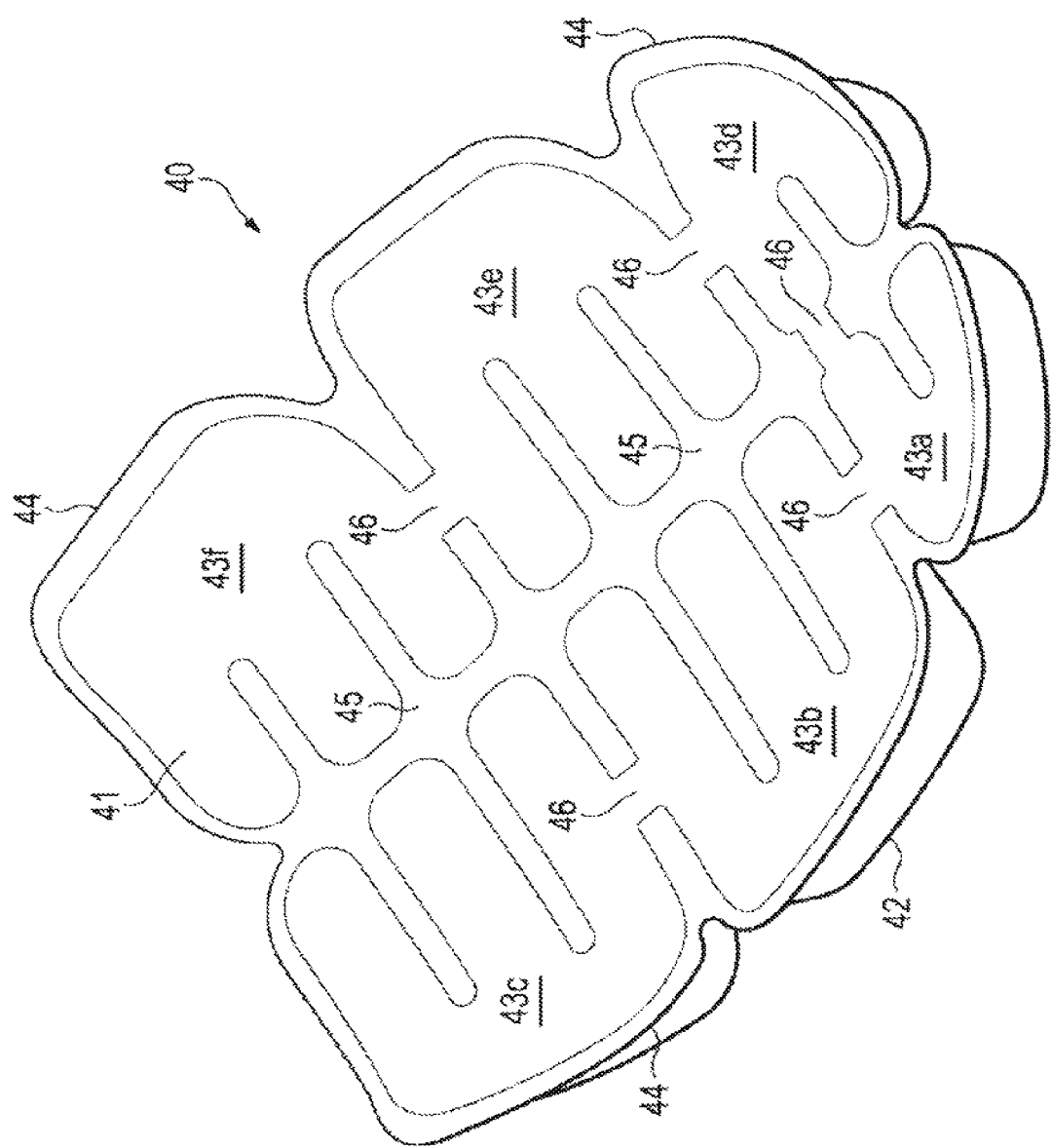
FIG. 4 is a perspective view of a forefoot component of the sole structure.

Upper 20 is depicted as having a substantially conventional configuration. A majority of upper 20 incorporates various material elements (e.g., textiles, foam, leather, and synthetic leather) that are stitched or adhesively bonded together to form an interior void for securely and comfortably receiving a foot. The material elements may be selected and located in upper 20 to selectively impart properties of durability, air-permeability, wear-resistance, flexibility, and comfort, for example. The void in upper 20 is shaped to accommodate the foot. When the foot is located within the void, therefore, upper 20 extends along a lateral side of the foot, along a medial side of the foot, over the foot, around the heel, and under the foot. An ankle opening 21 in heel region 13 provides the foot with access to the void. A lace 22 extends over a tongue 23 and through various lace apertures 24 or other lace-receiving elements in upper 20. Lace 22 and the adjustability provided by tongue 23 may be utilized in a conventional manner to modify the dimensions of ankle opening 21 and the interior void, thereby securing the foot within the interior void and facilitating entry and removal of the foot from the interior void. As depicted in FIGS. 3A and 3B, upper 20 also includes a sockliner 25 that is located within the void and positioned to extend under a lower surface of the foot to enhance the comfort of footwear 10. Further configurations of upper 20 may also include one or more of (a) a toe guard positioned in forefoot region 11 and formed of a wear-resistant material, (b) a heel counter located in heel region 13 for enhancing stability, and (c) logos, trademarks, and placards with care instructions and material information. Given that various aspects of the present discussion primarily relate to sole structure 30, upper 20 may exhibit the general configuration discussed above or the general configuration of practically any other conventional or non-conventional upper. Accordingly, the structure of upper 20 may vary significantly within the scope of the present disclosure.

The primary elements of sole structure 30 are a forefoot component 40, a heel component 50, and an outsole 60. Each of components 40 and 50 are directly secured to a lower area of upper 20 and formed from a polymer material that encloses a fluid, which may be a gas, liquid, or gel. During walking and running, for example, components 40 and 50 compress between the foot and the ground, thereby attenuating ground reaction forces. That is, components 40 and 50 are inflated and generally pressurized with the fluid to cushion the foot. Outsole 60 is secured to lower areas of components 40 and 50 and may be formed from a wear-resistant rubber material that is textured to impart traction. In some configurations, sole structure 30 may include a foam layer, for example, that extends between upper 20 and one or both of components 40 and 50, or a foam element may be located within indentations in the lower areas of components 40 and 50. In other configurations, sole structure 30 may incorporate plates, moderators, lasting elements, or motion control members that further attenuate forces, enhance stability, or influence the motions of the foot.

Forefoot Component

Forefoot component 40 is depicted separate from footwear 10 in FIGS. 4-8 and is formed from a polymer material that defines a first or upper surface 41 and an opposite second or lower surface 42. Whereas upper surface 41 is secured to upper 20, different portions of lower surface 42 are either secured to outsole 60 or exposed and visible from an exterior surface of footwear 10. As described in greater detail below, upper surface 41 and lower surface 42 are formed from polymer layers during a molding or thermoforming process. More particularly, upper surface 41 is formed from one polymer layer, and lower surface 42 is formed from another polymer layer.

Forefoot component 40 includes a plurality of chambers 43a-43f, a flange 44, a web area 45, and various conduits 46. Chambers 43a-43f enclose or contain the fluid within forefoot component 40. More particularly, chambers 43a-43f are areas of forefoot component 40 where the polymer layers forming surfaces 41 and 42 are separated or spaced from each other to form voids for enclosing the fluid within forefoot component 40. Flange 44 extends around a peripheral area of forefoot component 40 and is formed from portions of the polymer layers that are molded and joined together. Web area 45 extends through a central area of forefoot component 40 and between the various chambers 43. Like flange 44, web area 45 is formed from portions of the polymer layers that are joined together. Although adhesive bonding may be utilized in joining the polymer layers in flange 44 and web area 45, thermal bonding may also join the polymer layers during the molding or thermoforming process. Conduits 46 extend between chambers 43a-43f and form channels that place chambers 43a-43f in fluid communication. That is, the fluid within forefoot component 40 may be transferred between chambers 43a-43f by passing through conduits 46. Like chambers 43a-43f, conduits 46 are formed from separated or spaced portions of the polymer layers forming surfaces 41 and 42.

Chambers 43a-43f are the primary components of forefoot component 40 that enclose the fluid. In areas immediately adjacent to each of chambers 43a-43f, the polymer layers forming surfaces 41 and 42 are joined to each other to form a bond that seals the fluid within forefoot component 40. More particularly, flange 44 and web area 45 cooperatively bound or otherwise extend around each of chambers 43a-43f and are formed from areas of the polymer layers that are bonded to each other, thereby sealing the fluid within chambers 43. Although chambers 43a-43f effectively contain the fluid within forefoot component 40, each of chambers 43a-43f are placed in fluid communication through conduits 46. In further configurations of footwear 10, however, one or more of conduits 46 may be absent to segregate the fluid in one of chambers 43a-43f from the fluid in another one of chambers 43a-43f, and the fluids may be pressurized differently. In other configurations, forefoot component 40 may be a part of a fluid system that, for example, pumps fluid into chambers 43a-43f to tailor the pressure within forefoot component 40 to the preferences or running style of the wearer.

Upper surface 41 has a generally concave, rounded, and relatively smooth configuration that supports the foot when footwear 10 is worn. Referring to the cross-sections of FIGS. 9A-9C, for example, the rounded configuration of upper surface 41 lays on a curved plane that is cooperatively formed by chambers 43a-43f, flange 44, web area 45, and conduits 46. In contrast, lower surface 42 is more contoured, with chambers 43a-43f extending or protruding downward from flange 44 and web area 45. In effect, therefore, the portions of chambers 43a-43f that protrude downward form independent supports or cushioning elements in sole structure 30.

Undulations or other discontinuities in first surface 41, which supports the foot, that are greater than one millimeter may decrease footwear comfort. The pressure of the fluid within chambers 43a-43f tends to press outward upon the polymer layers forming surfaces 41 and 42, which causes areas of forefoot component 40 corresponding with chambers 43a-43f to bulge or protrude outward. Although first surface 41 may exhibit some undulations adjacent to chambers 43a-43f, the size of these undulations is generally limited to less than one millimeter, thereby enhancing the comfort of footwear 10.

Various features of forefoot component 40 operate cooperatively to limit the size of the undulations in first surface 41, including (a) a thickness of the polymer material forming chambers 43a-43f, (b) the pressure of the fluid within chambers 43a-43f, and (c) the width of chambers 43a-43f between spaced portions of web area 45. In general, as the thickness of the polymer material forming chambers 43a-43f increases, or as the pressure of the fluid within chambers 43a-43f decreases, the degree to which chambers 43a-43f bulge or protrude outward and form undulations decreases. For footwear applications, a polymer thickness of 0.75 millimeter (0.03 inch) and a fluid pressure of 138 kilopascals (20 pounds per square inch) provides a suitable degree of compliance, force attenuation, and other properties. Given this thickness and pressure, having a maximum width of less than 14 millimeters, and possibly less than 12 millimeters, in chambers 43a-43f limits the size of undulations in first surface 41 to less than one millimeter.

Figure 5:
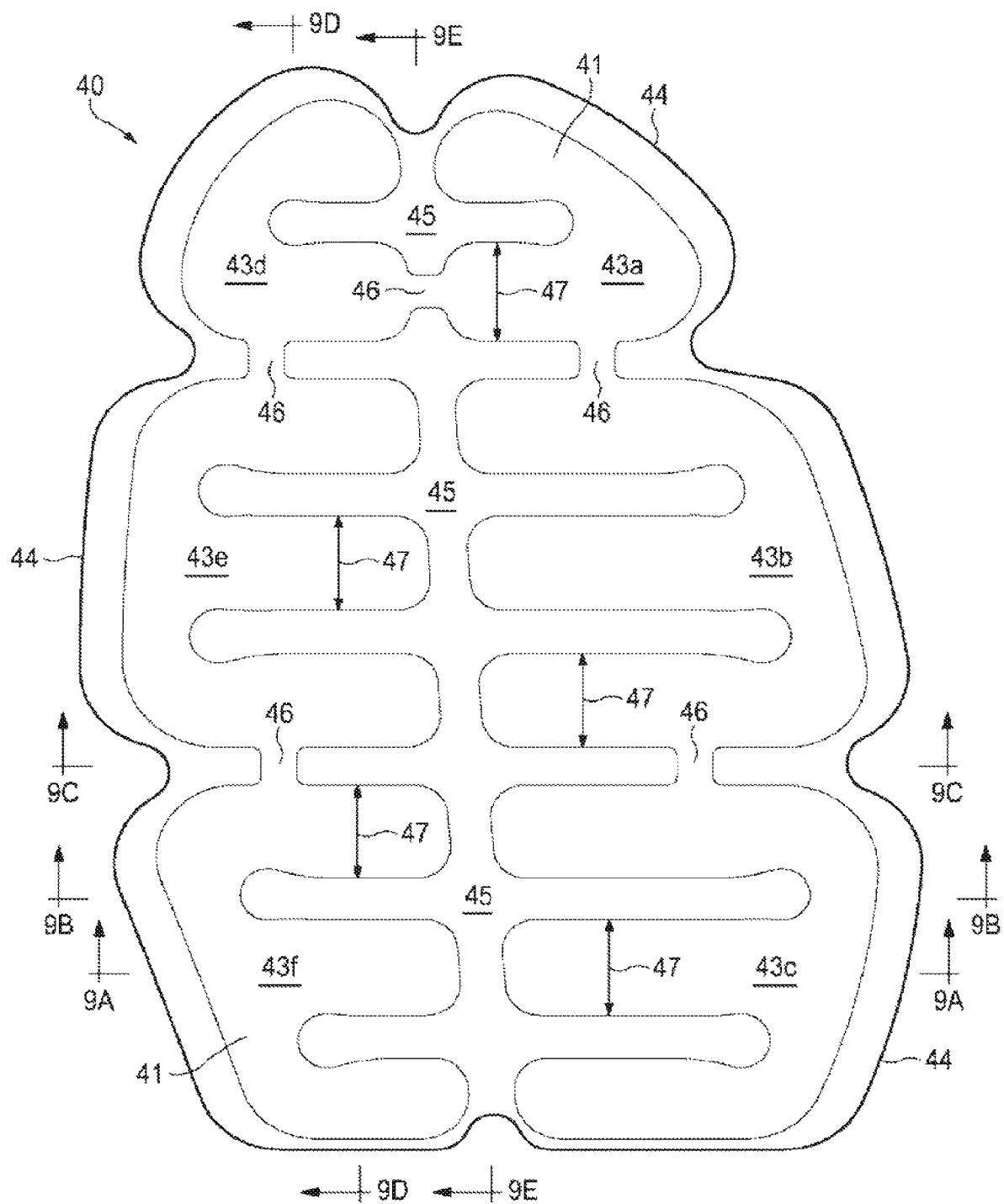
FIG. 5 is a top plan view of the forefoot component.
Figure 6:
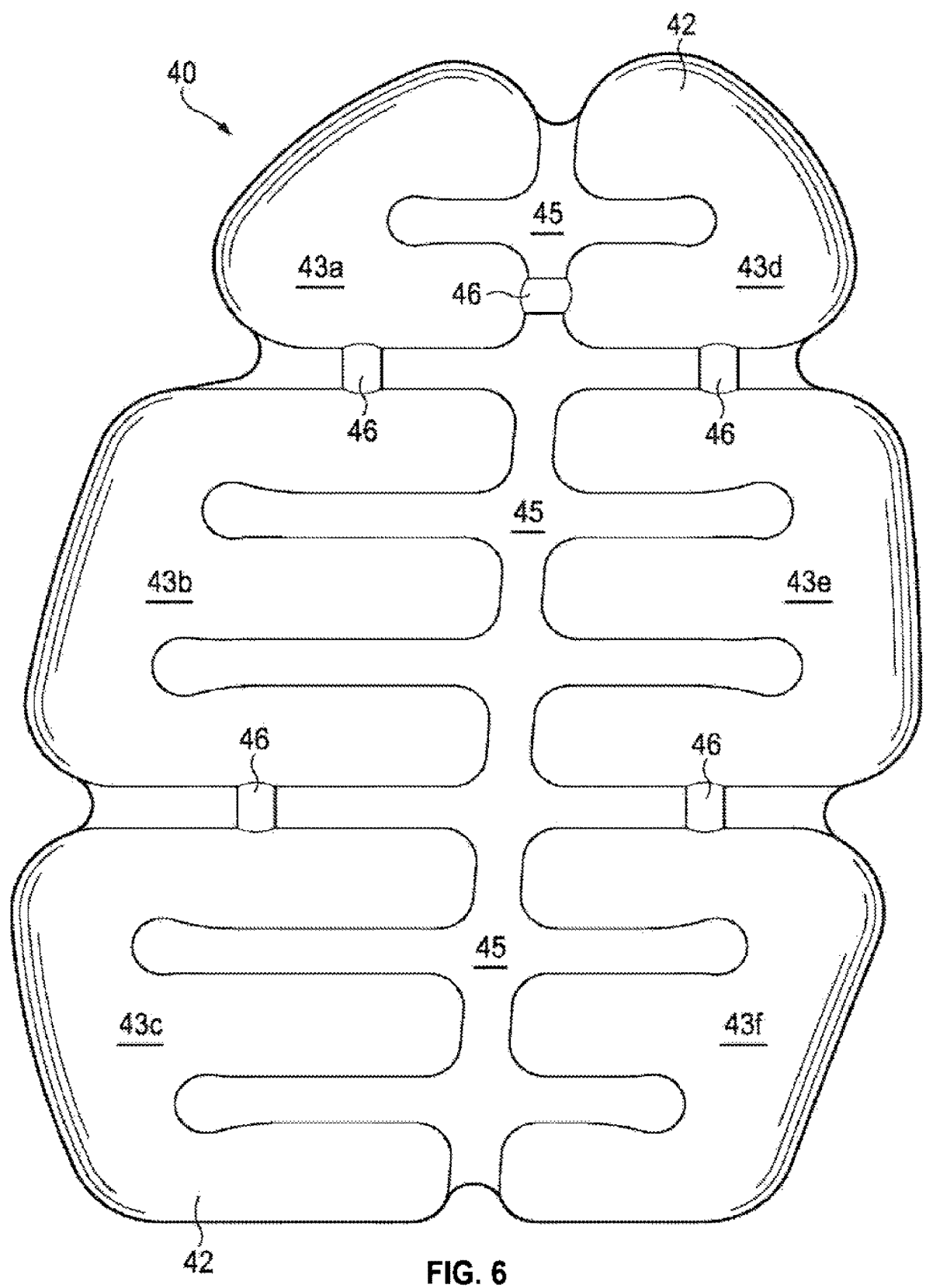
FIG. 6 is a bottom plan view of the forefoot component.

A width dimension 47 is depicted in FIGS. 5, 6, and 9D as extending (a) across various portions of chambers 43a-43f, (b) between spaced portions of web area 45, and (c) in a direction that is generally parallel to the most proximal area of first surface 41. Chambers 43a-43f have E-shaped and C-shaped configurations. Whereas some areas of chambers 43a-43f are located adjacent to flange 44, other areas of chambers 43a-43f extend inward and toward a central area of forefoot component 40. In the example of subchambers 43b and 43e, which are E-shaped, each has three parallel and generally linear segments that extend inward and are bounded on opposite sides by portions of web area 45. As such, width dimension 47 may be measured between the spaced portions of web area 45 that are located on opposite sides of the three parallel segments. In the example of subchambers 43c and 43f which are also E-shaped, each has two parallel and generally linear segments that extend inward and are bounded by web area 45. As such, width dimension 47 may be measured between the spaced portions of web area 45 that are located on opposite sides of two parallel segments. In the example of subchambers 43a and 43d, which are C-shaped, each has one generally curved segment that extends inward and is bounded by web area 45. As such, width dimension 47 may be measured between the spaced portions of web area 45 that are located on opposite sides of the segments. Note that portions of subchambers 43a-43f that are immediately adjacent to flange 44 may also have a maximum width of less than 14 millimeters, and possibly less than 12 millimeters, but may also have a maximum width greater than 14 millimeters.

In addition to E-shaped and C-shaped configurations, any of chambers 43a-43f may be structured to have F, H, I, J, K, L, M, N, S, T, U, V, W, X, and Y-shaped configurations, in addition to various other shapes, whether following letters of the alphabet or being non-regular. In general, however, one or more of chambers 43a-43f will have a shape formed from relatively narrow and elongate segments having a maximum width of less than 14 millimeters, and possibly less than 12 millimeters. Moreover, these segments will extend into a central area of forefoot component 40 and be bounded on opposite sides by portions of web area 45.

Although width dimension 47 of chambers 43a-43f may be limited to less than 14 or 12 millimeters, the height and length of the various segments forming chambers 43a-43f may vary considerably. In general and with all other factors being the same, as the volume of each of chambers 43a-43f increases, the degree of cushioning or force attenuation provided by forefoot component 40 also increases. By maximizing the heights and lengths of portions or segments in chambers 43a-43f, cushioning or force attenuation properties may also be enhanced. As an example, in some configurations of forefoot component 40, the height of chambers 43a-43f may be more than fourteen millimeters, with the height being measured in a direction that is perpendicular to the width dimension 47 and at a location of width dimension 47.

Chambers 43 are located along or adjacent to opposite sides of forefoot component 40. When incorporated into footwear 10, a first group of chambers 43a-43c are located on lateral side 14 and a second group of chambers 43d-43f are located on medial side 15. In effect, therefore, the two groups are located adjacent to sides 14 and 15, and web area 45 extends between the groups. In other configurations of forefoot component 40, however, chambers 43 may be positioned in other arrangements or locations within forefoot component 40. One or more of chambers 43 may also extend between opposite sides of forefoot component 40, rather than being positioned adjacent to one side of forefoot component 40.

Flange 44 forms a peripheral seam or bonded area that joins the polymer layers forming surfaces 41 and 42 and assists with sealing the fluid within forefoot component 40 and the voids of chambers 43a-43f In general, flange 44 has a height of at least five millimeters and extends in an outward direction from a remainder of forefoot component 40. Relative to the voids within chambers 43a-43f, flange 44 extends outward from the voids. More particularly, flange 44 extends in an upward direction from the peripheral area or an upper area of forefoot component 40. Whereas the area of flange 44 corresponding with first surface 41 faces toward and is secured to upper 20, the area of flange 44 corresponding with second surface 42 faces away from and forms a portion of an exterior surface of footwear 10. More simply, one surface of flange 44 is secured to upper 20, and the opposite surface of flange 44 faces away from upper 20. Given that flange 44 is a relatively thick and stiff portion of forefoot component 40, flange 44 may enhance the stability of footwear 10. Flange 44 may also provide a defined lasting margin during steps of the manufacturing process that involve bonding upper 20 to forefoot component 40.

Figure 9A:
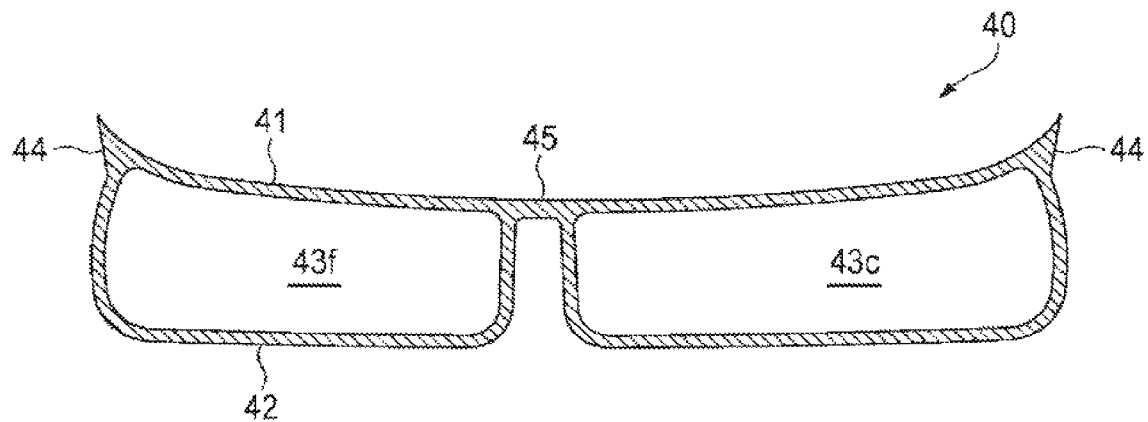
Figure 9B:
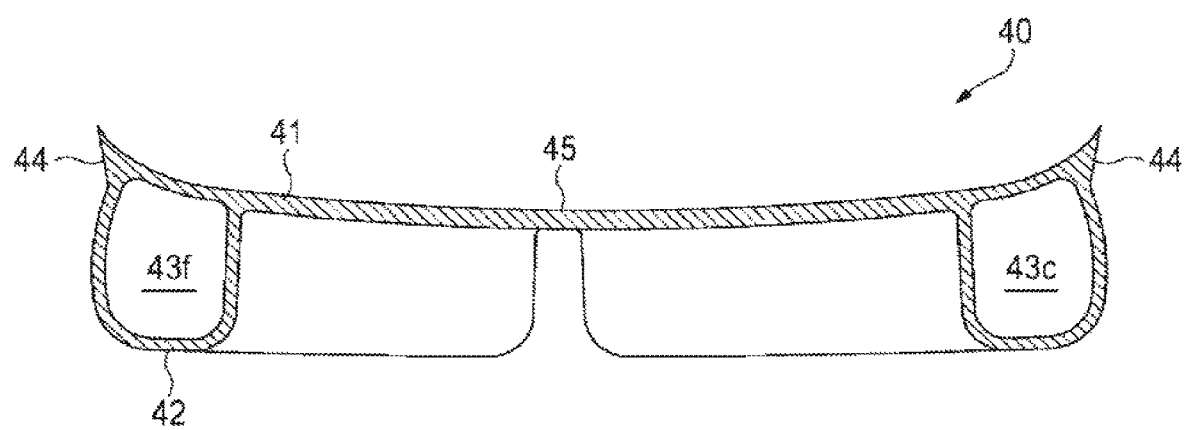

Referring to the cross-sections of FIGS. 9A and 9B, for example, flange 44 is depicted as having a tapered configuration, with the portions of flange 44 located adjacent to the voids in chambers 43a-43f having greater thickness than the portions of flange 44 that are spaced from the voids and form a distal end. In effect, therefore, flange 44 has a tapered configuration with a first thickness adjacent to the voids and a second thickness spaced away from the voids, the first thickness being greater than the second thickness. Moreover, thickness of the portions of flange 44 located adjacent to the voids (i.e., the first thickness) is greater than either of (a) the thickness of web area 45 in the central area of forefoot component 40 and (b) the sum of the thicknesses of the polymer layers forming surfaces 41 and 42. Although flange 44 is formed from the polymer layers forming surfaces 41 and 42 and web area 45, flange 44 has a greater thickness than both of the polymer layers combined. As noted above, flange 44 is a relatively thick and stiff portion of forefoot component 40. A portion of the stiffness may be due, therefore, to the greater thickness of flange 44 adjacent to chambers 43a-43f. A process for forming flange 44 to have this configuration will be discussed below.

Figure 9C:
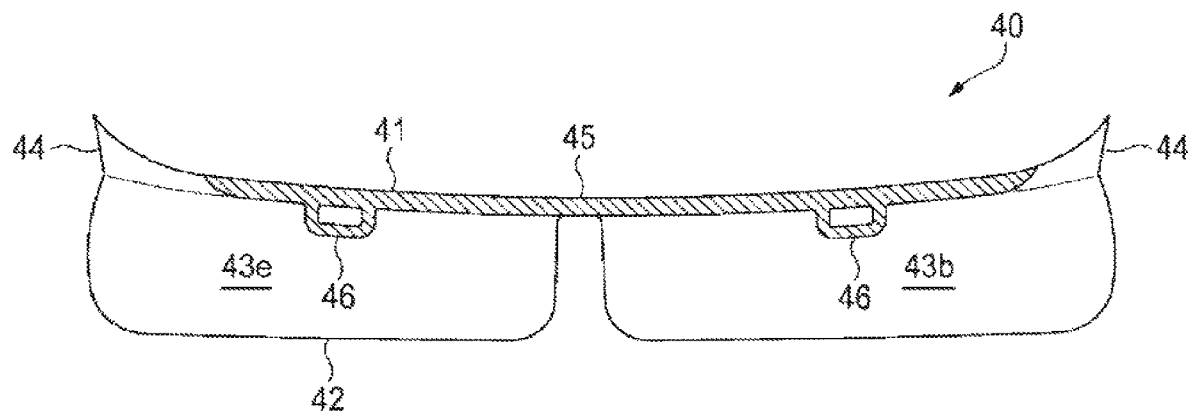

Although flange 44 is present in areas adjacent to chambers 43a-43f, flange 44 is depicted as being absent or having minimal height and thickness in areas between chambers 43a-43f, as depicted in FIGS. 9C and 9E. This configuration provides enhanced flexibility to forefoot component 40. More particularly, given that flange 44 is a relatively thick and stiff portion of forefoot component 40, areas where flange 44 are absent or minimized may have greater flexibility.

Web area 45 extends throughout a central area of forefoot component 40 to separate and interconnect the various chambers 43a-43f. In this position, web area 45 forms a bonded area that joins the polymer layers forming surfaces 41 and 42 and also assists with sealing the fluid within the voids of chambers 43a-43f. Whereas chambers 43a-43f protrude outward to form structures for receiving the fluid within forefoot component 40, web area 45 exhibits lesser thickness to provide flexibility in forefoot component 40 and permit each of chambers 43a-43f to move or deflect independently in footwear 100. As noted above, flange 44 may be absent or have minimal height and thickness in areas between chambers 43a-43f, thereby further contributing to flexibility in forefoot component 40.

Various factors may be considered when selecting materials for forefoot component 40, including each of polymer layers 41 and 42. As an example, the engineering properties of the materials (e.g., tensile strength, tear strength, flexural fatigue strength, modulus of elasticity, and abrasion resistance) may be considered. The ability of the materials to be shaped into chambers 43a-43f and bonded to form flange 44 and web area 45 during the manufacture of forefoot component 40 may also be considered. Additionally, the ability of the materials to prevent the transmission (e.g., diffusion, permeation) of the fluid contained by forefoot component 40 may be considered. Suitable materials for forefoot component 40 include a variety of thermoset and thermoplastic polymer materials. An advantage of thermoplastic polymer materials is that they may be molded (e.g., thermoformed) to impart the shapes of chambers 43a-43f and flange 44. Moreover, thermoplastic polymer materials may be thermal bonded to each other to form flange 44 and web area 45. Given these considerations, examples of polymer materials that may be utilized for forefoot component 40 include any of the following: polyurethane, urethane, polyester, polyester polyurethane, polyether, polyether polyurethane, latex, polycaprolactone, polyoxypropylene, polycarbonate macroglycol, and mixtures thereof.

Although any of the materials noted above may be utilized for forefoot component 40, various materials exhibit both diffusion-prevention and thermoplastic properties. An example of this material is disclosed in U.S. Pat. Nos. 5,713,141 and 5,952,065 to Mitchell, et al., both of which are incorporated herein by reference. Although various configurations may be utilized, this material generally includes layers of a thermoplastic polymer material and a barrier material. The thermoplastic polymer material provides the ability to form contoured shapes and thermal bonds, as well as a suitable degree of tensile strength, tear strength, flexural fatigue strength, modulus of elasticity, and abrasion resistance. The barrier material is effective in limiting the transmission of the fluid within forefoot component 40 (e.g., air, nitrogen, or sulfur-hexafluoride). As another example, forefoot component 40 may be formed from other layered materials, including a flexible microlayer membrane that has alternating layers of a gas barrier material and an elastomeric material, as disclosed in U.S. Pat. Nos. 6,082,025 and 6,127,026 to Bonk, et al., both of which are incorporated herein by reference. Additional suitable materials are disclosed in U.S. Pat. Nos. 4,183,156 and 4,219,945 to Rudy, both of which are incorporated herein by reference. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al., each of which are incorporated herein by reference.

Figure 10A:
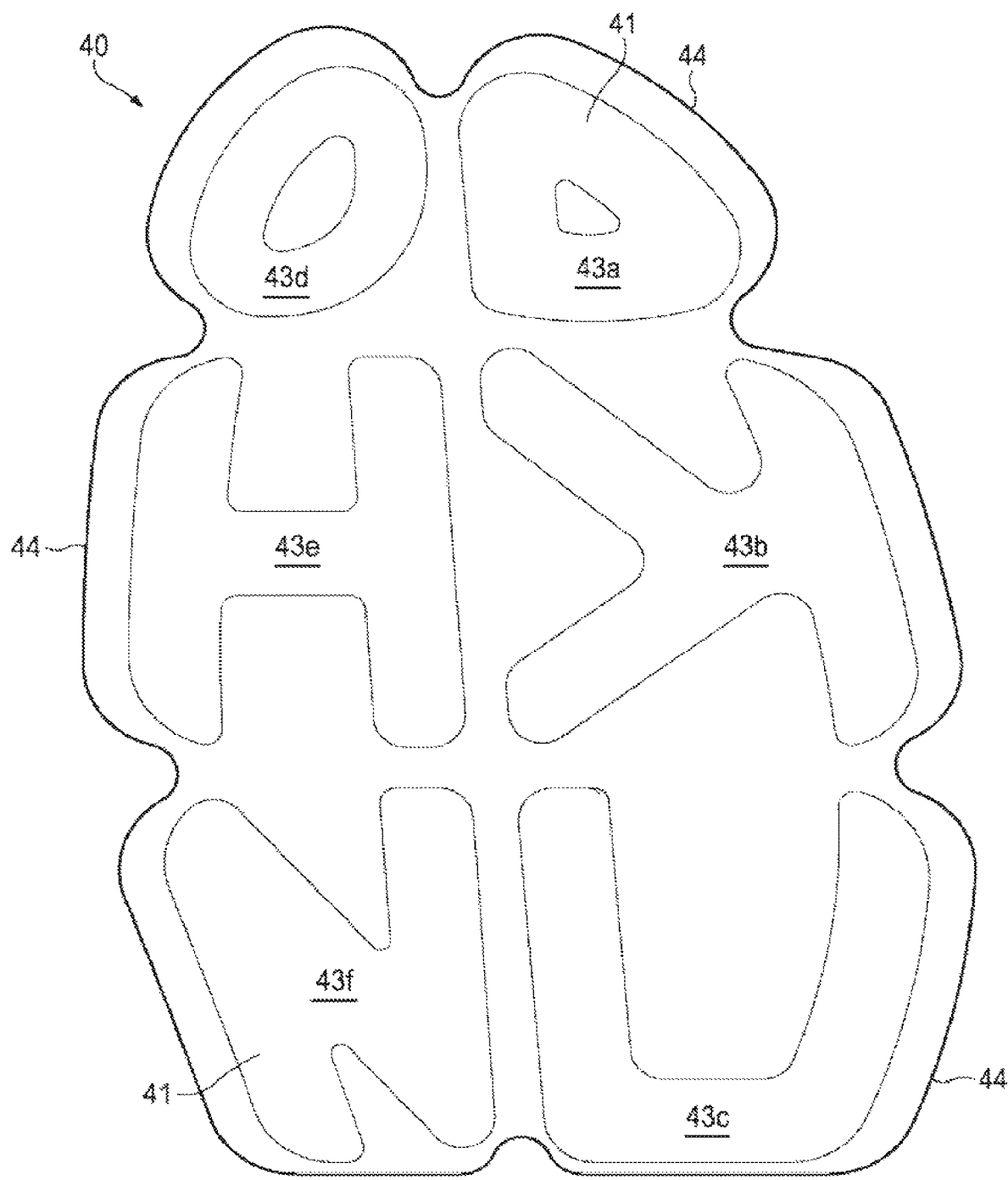
FIGS. 10A-10E are top plan views corresponding with FIG. 5 and depicting further configurations of the forefoot component.
Figure 10B:
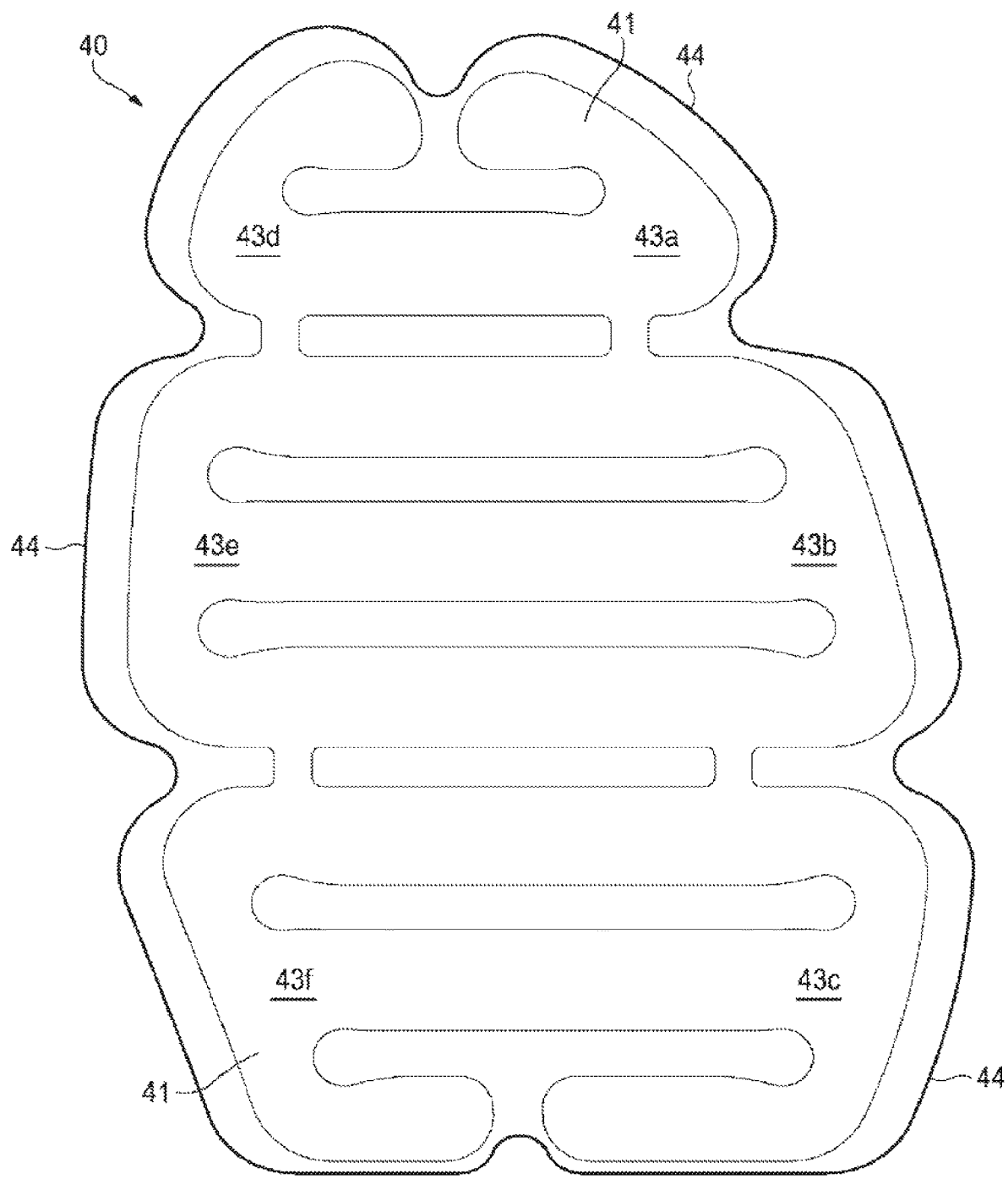
Figure 10C:
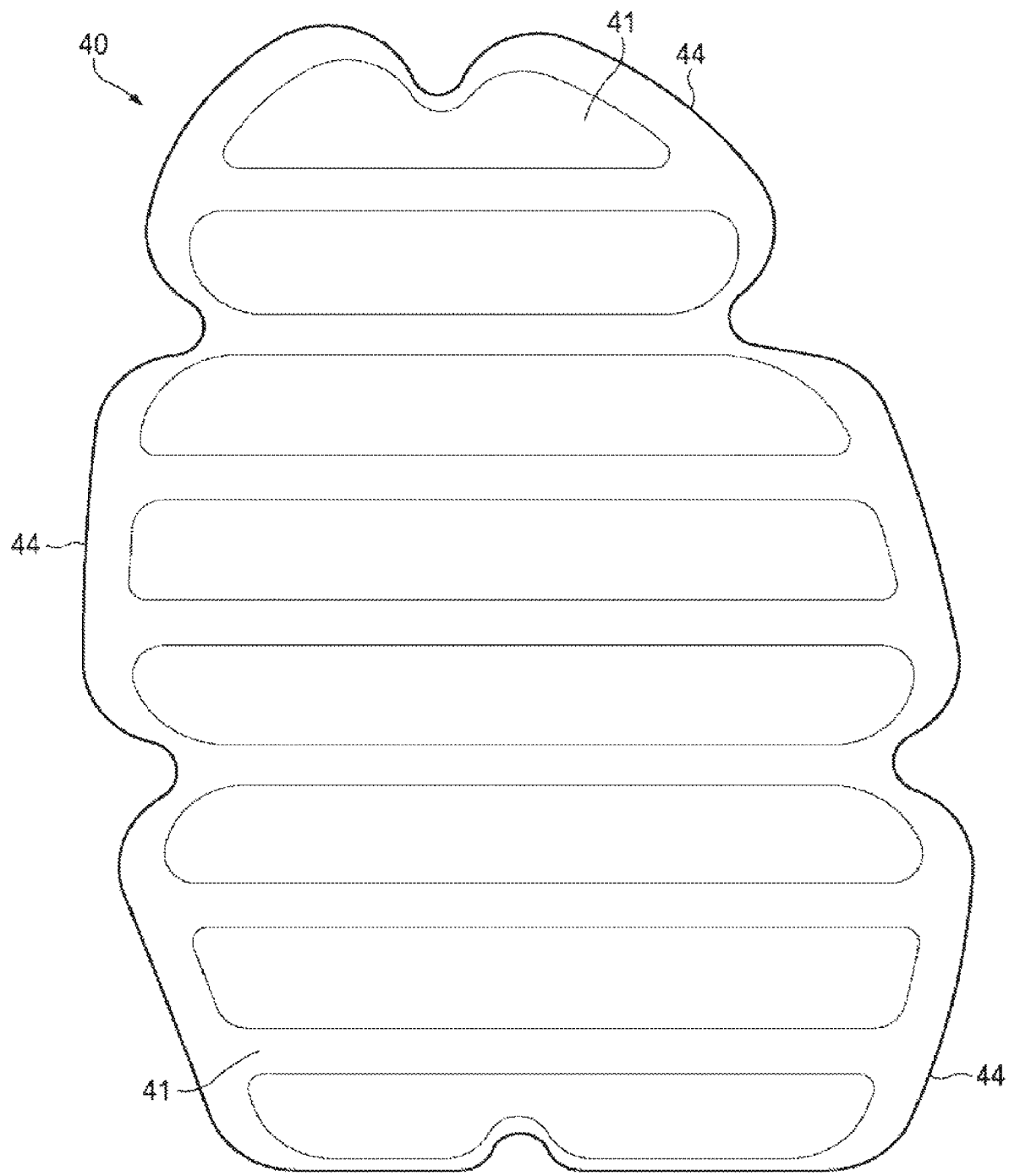
Figure 10D:
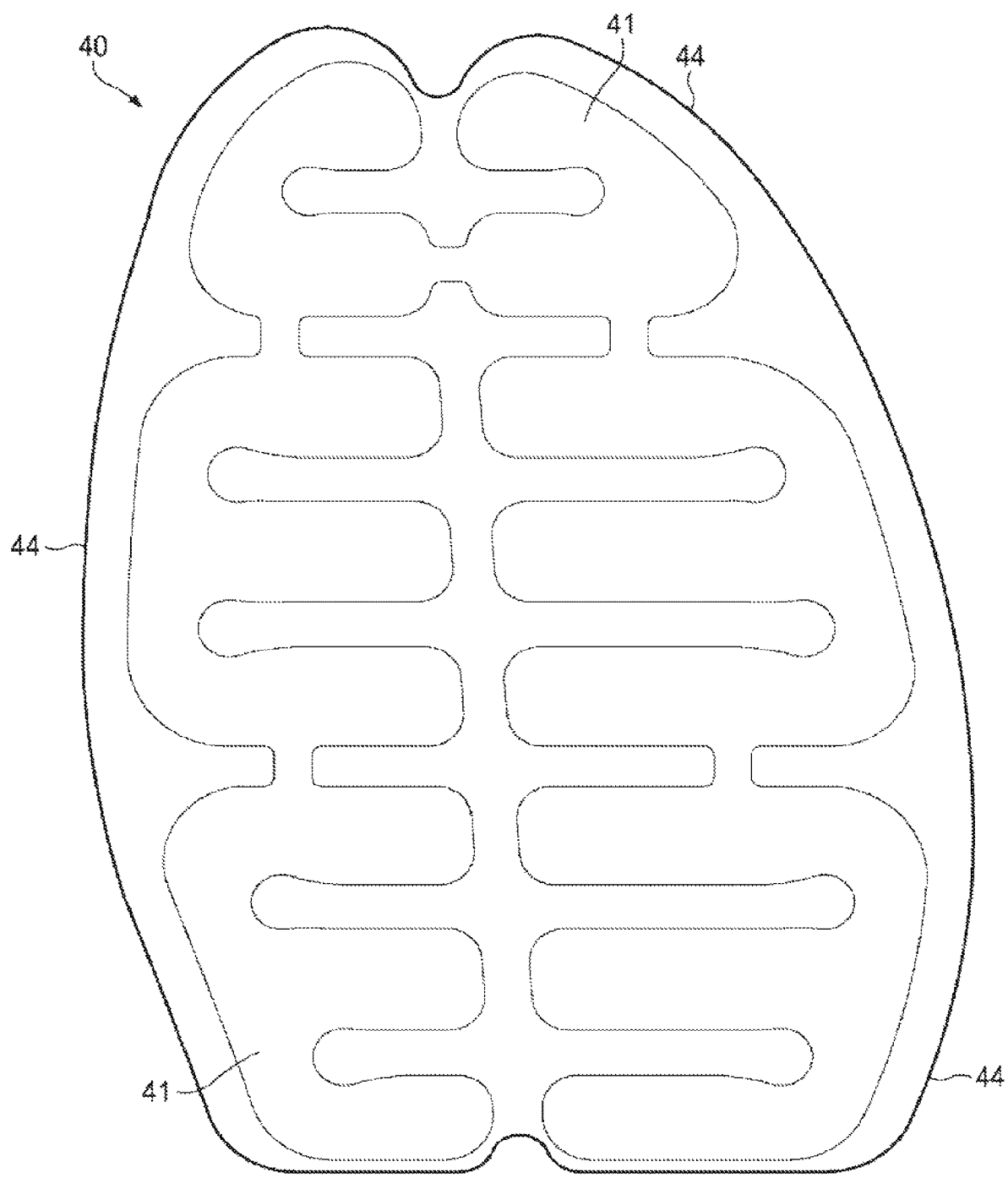
Figure 10E:
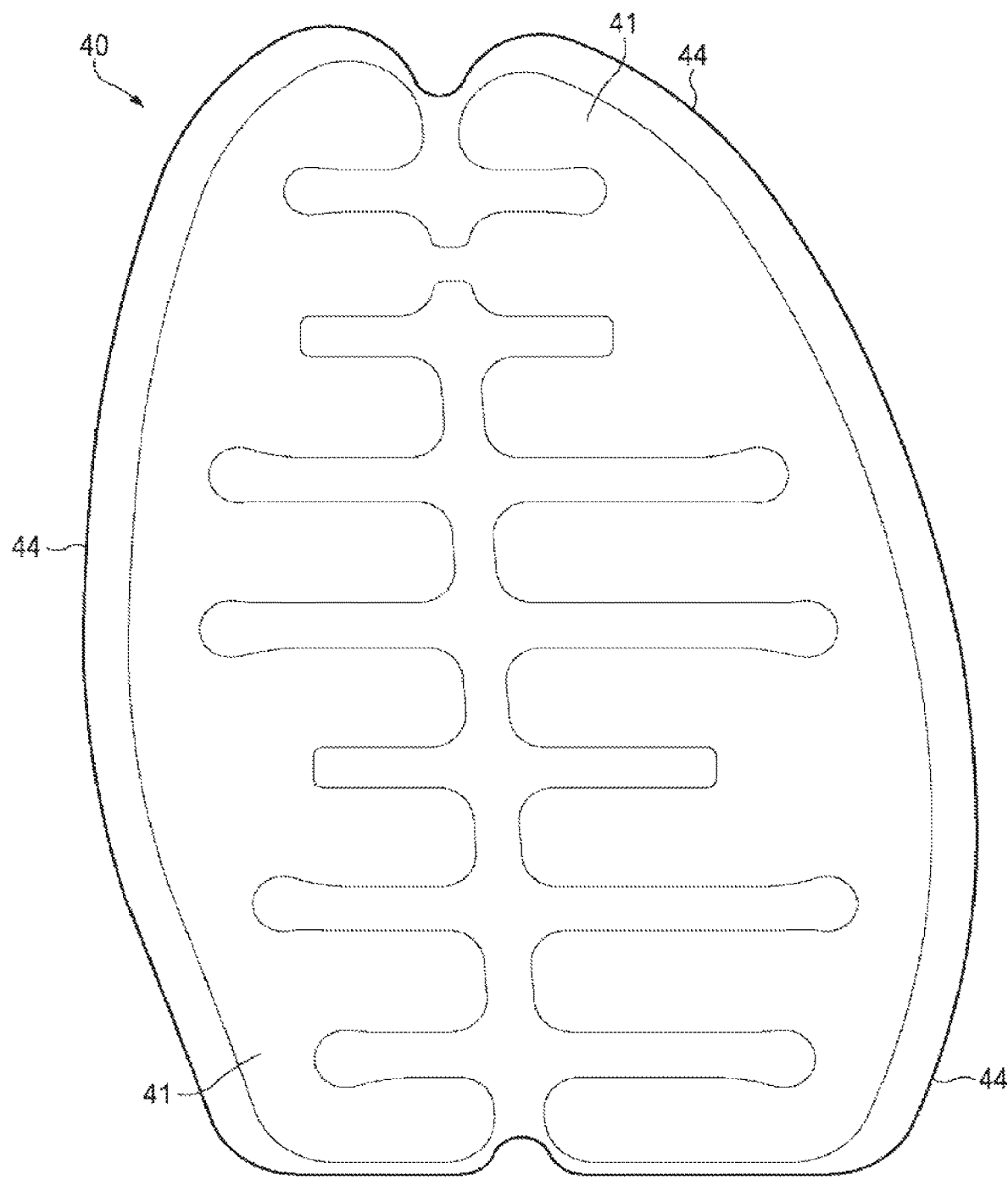

The configuration of forefoot component 40 discussed above provides one example of a suitable configuration for use in footwear 10 and other products. A variety of other configurations may also be utilized. For example, FIG. 10A depicts chambers 43a-43f as having D, K, U, 0, H, and N-shaped configurations. By varying the shapes of chambers 43a-43f, the properties of each of chambers 43a-43f and different areas of forefoot component 40 may be varied. Referring to FIG. 10B, chambers 43a-43f are connected across the central area of forefoot component 40, which may decrease longitudinal flexibility in sole structure 30 and provide additional force attenuation. A similar configuration is depicted in FIG. 10C, wherein chambers 43b, 43c, 43e, and 43f are replaced with various tubes that extend across forefoot component 40. Although flange 44 may be absent or minimal between chambers 43a-43f, FIG. 10D depicts a configuration wherein flange 44 extends continuously along opposite sides of forefoot component 40. As a similar example, FIG. 10E depicts chambers 43a-43f as being interconnected along the peripheral area of forefoot component 40, also with flange 44 extending continuously along opposite sides of forefoot component 40.

Figure 11A:
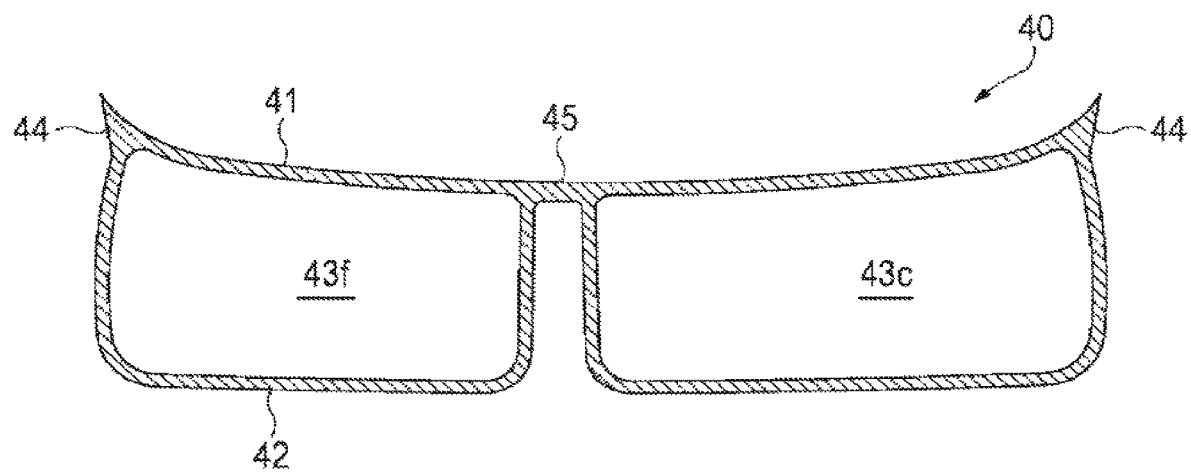
FIGS. 11A-11E are cross-sectional views corresponding with FIG. 9A and depicting further configurations of the forefoot component.
Figure 11B:
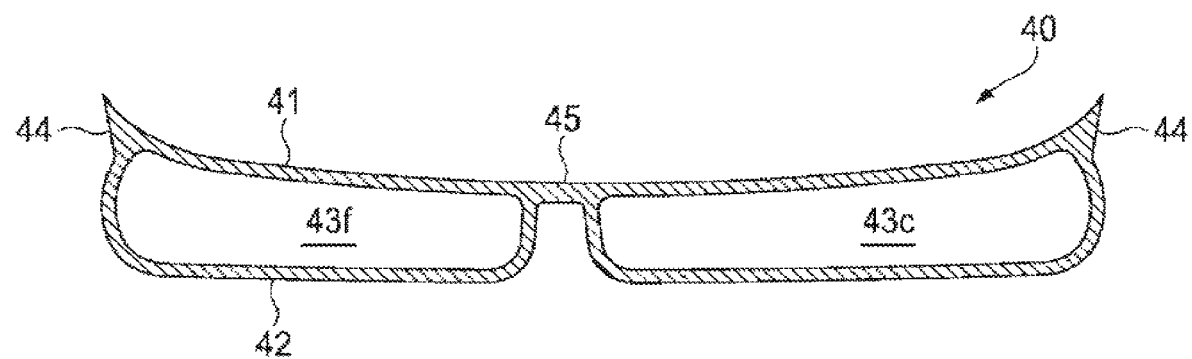
Figure 11C:
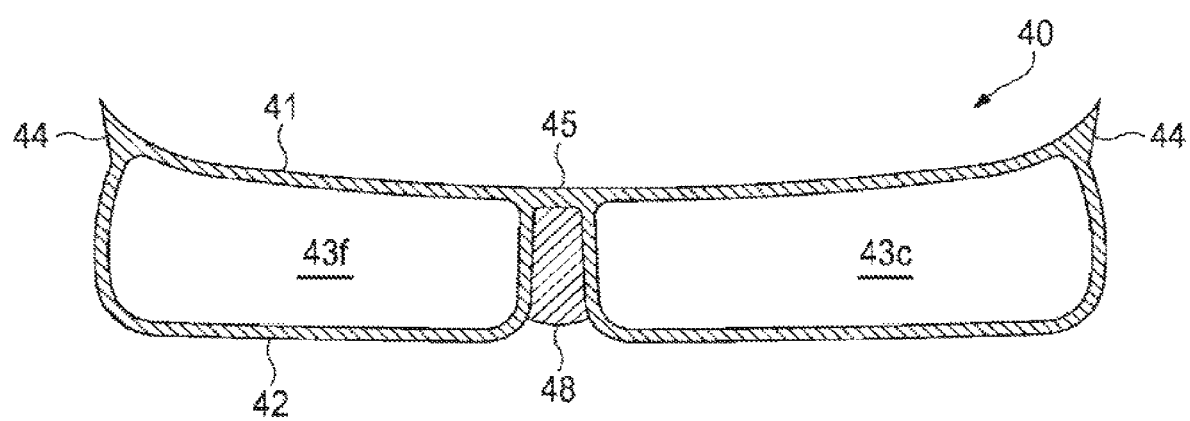
Figure 11D:
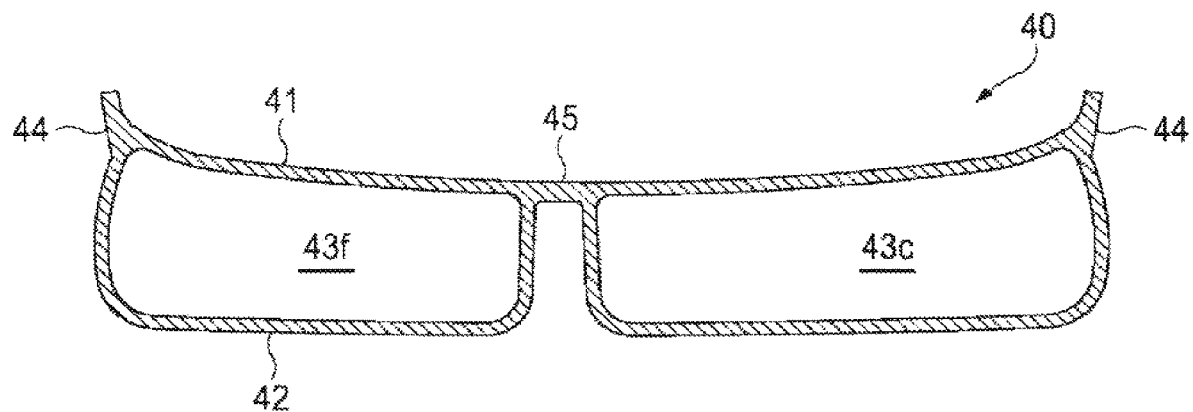
Figure 11E:
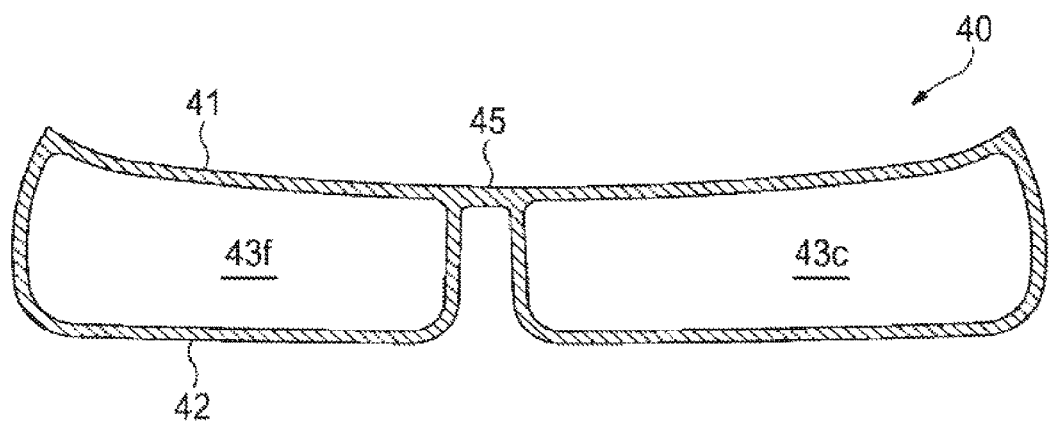
Figure 12:
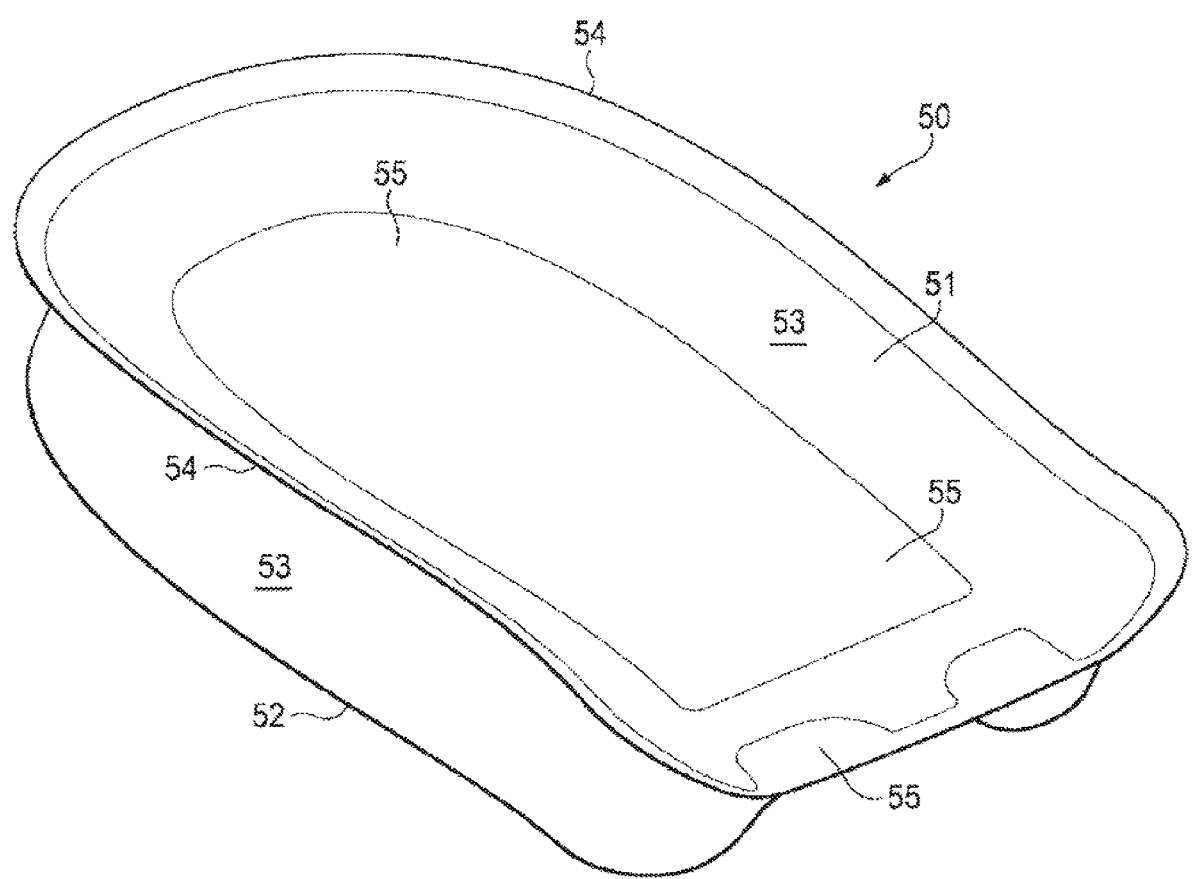
FIG. 12 is a perspective view of a heel component of the sole structure.
Figure 13:
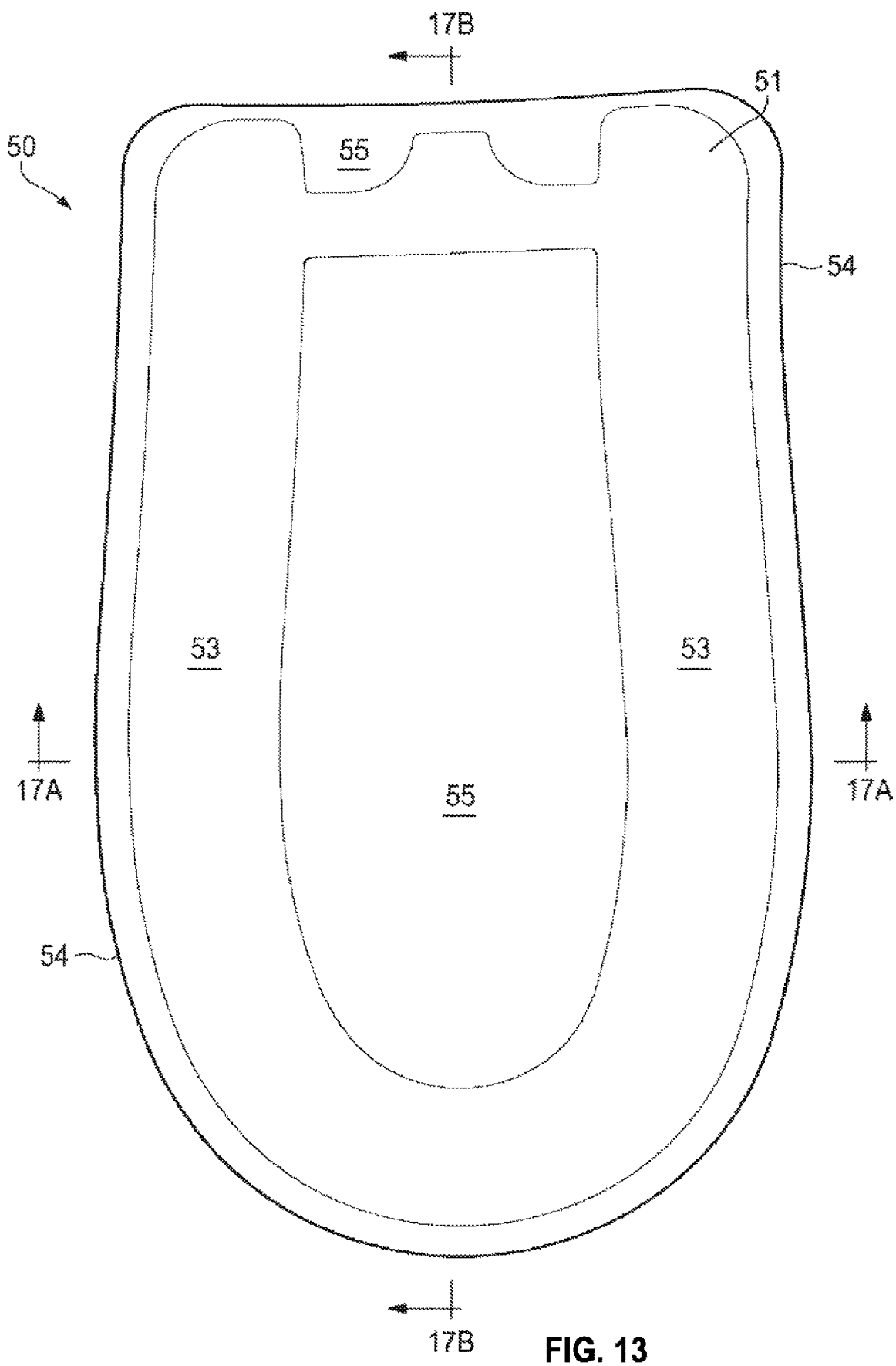
FIG. 13 is a top plan view of the heel component.
Figure 14:
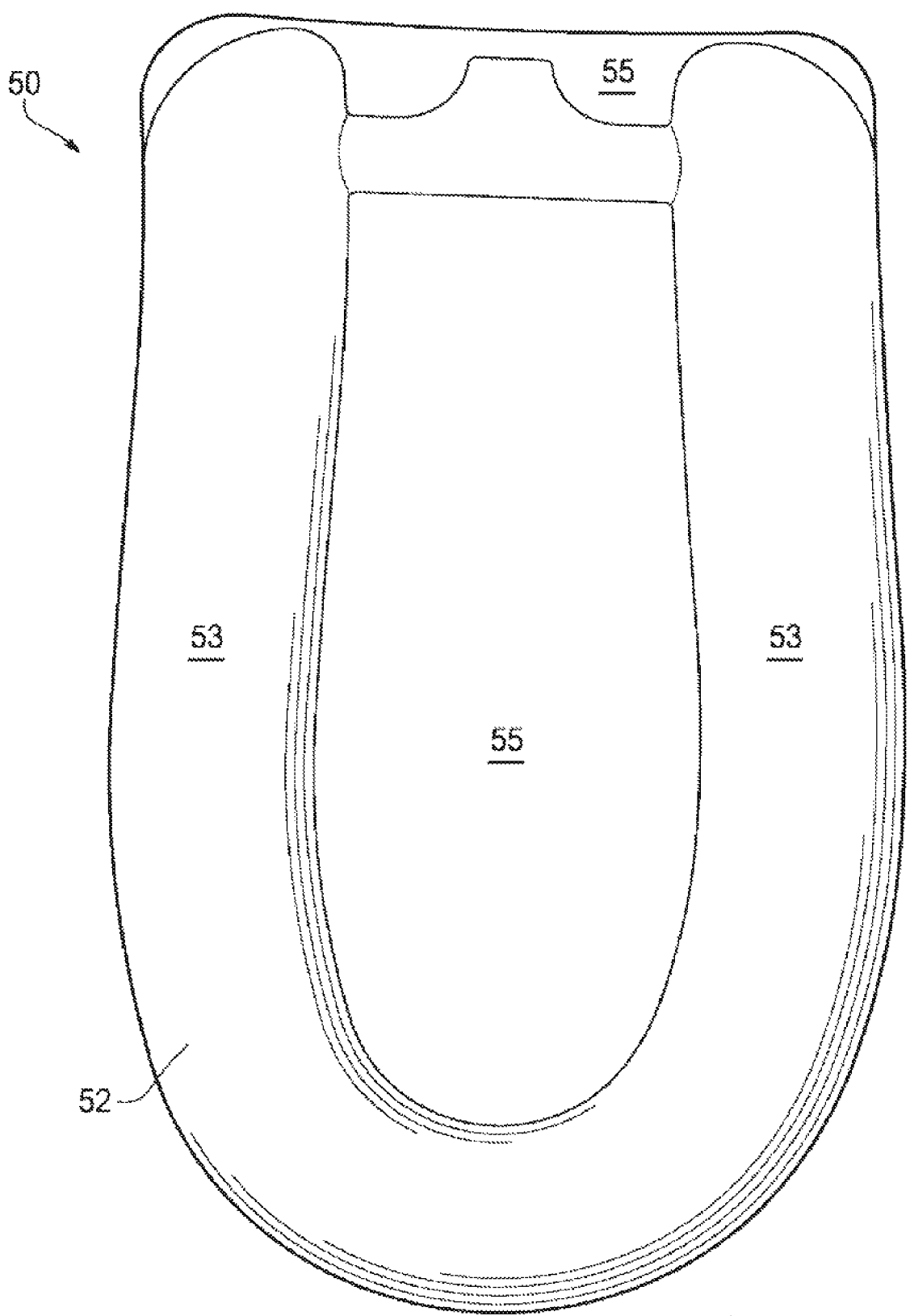
FIG. 14 is a bottom plan view of the heel component.
Figure 15:
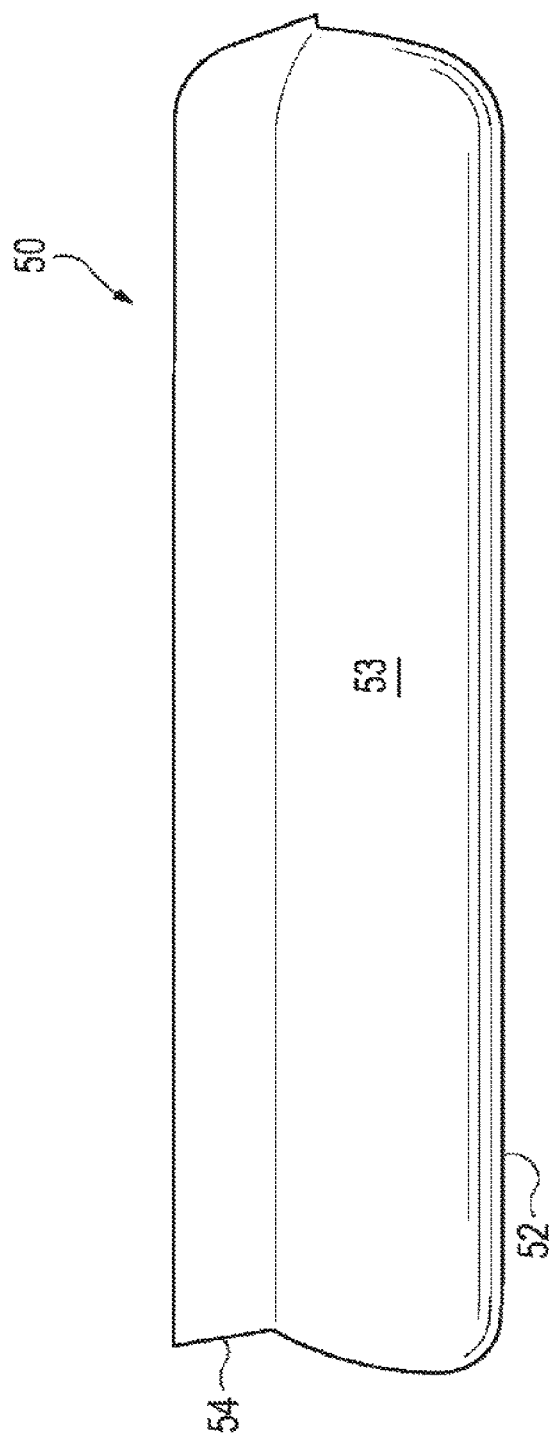
FIG. 15 is a lateral side elevational view of the heel component.
Figure 16:
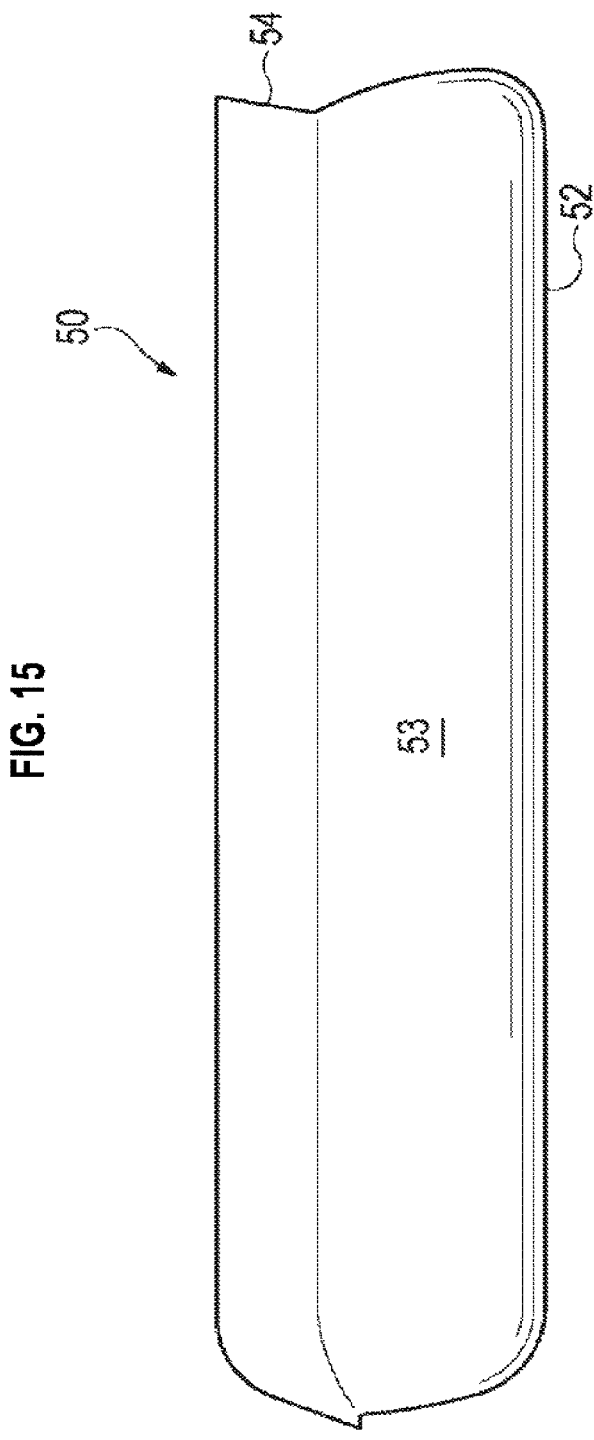
FIG. 16 is a medial side elevational view of the heel component.

In addition to the configurations discussed above, various other aspects of forefoot component 40 may vary. Referring to FIG. 11A, chambers 43c and 43f are depicted as having greater height, whereas FIG. 11B depicts a lesser height. By varying the heights of chambers 43a-43f, the cushioning or force attenuation properties may be modified. Referring to FIG. 11C, a foam element 48 is located between chambers 43c and 43f and in contact with web area 45, which may decrease longitudinal flexibility in sole structure 30 and increase cushioning properties. Aspects relating to flange 44 may also vary. Referring to FIG. 11D, flange 44 has a non-tapered and squared configuration, which may add further stiffness. In FIG. 11E, the structure flange 44 is substantially absent from forefoot component 40.

Heel Component

Heel component 50 is depicted separate from footwear 10 in FIGS. 12-16 and is formed from a polymer material that defines a first or upper surface 51 and an opposite second or lower surface 52. Whereas upper surface 51 is secured to upper 20, different portions of lower surface 52 are either secured to outsole 60 or exposed and visible from an exterior surface of footwear 10. As with forefoot component 40, upper surface 51 and lower surface 52 are formed from polymer layers during a molding or thermoforming process. More particularly, upper surface 51 is formed from one polymer layer, and lower surface 52 is formed from another polymer layer. Any of the polymer materials noted above for forefoot component 40 may also be utilized for the polymer layers forming heel component 50.

Heel component 50 includes a single chamber 53, a flange 54, and a web area 55. Chamber 53 and flange 54 each have a generally U-shaped configuration that, when incorporated into footwear 10, extends (a) along lateral side 14, (b) around a rear portion of heel region 13, and (c) along medial side 15, thereby extending around a peripheral area of heel component 50. Like each of chambers 43a-43f, chamber 53 encloses or contains the fluid within heel component 50 and is formed from separated or spaced areas of the polymer layers forming surfaces 51 and 52. Flange 54 is formed from portions of the polymer layers that are molded and joined together and protrudes outward from chamber 53. Web area 55 extends through a central area of heel component 50 and between lateral and medial portions of chamber 53. Like flange 54, web area 55 is formed from portions of the polymer layers that are joined together. Although adhesive bonding may be utilized in joining the polymer layers in flange 54 and web area 55, thermal bonding may also join the polymer layers during the molding or thermoforming process.

Chamber 53 is the primary component of heel component 50 that encloses the fluid. In areas immediately adjacent to chamber 53, the polymer layers forming surfaces 51 and 52 are joined to each other to form a bond that seals the fluid within heel component 50. More particularly, flange 54 and web area 55 cooperatively bound or otherwise extend around chamber 53 and are formed from areas of the polymer layers that are bonded to each other, thereby sealing the fluid within chamber 53. In further configurations of footwear 10, chamber 53 may be subdivided into two or more subchambers that may be pressurized differently. In other configurations, heel component 50 may be a part of a fluid system that pumps fluid into chamber 53. In still further configurations, the medial and lateral portions may be connected through a central portion of web area 55.

Figure 17A:
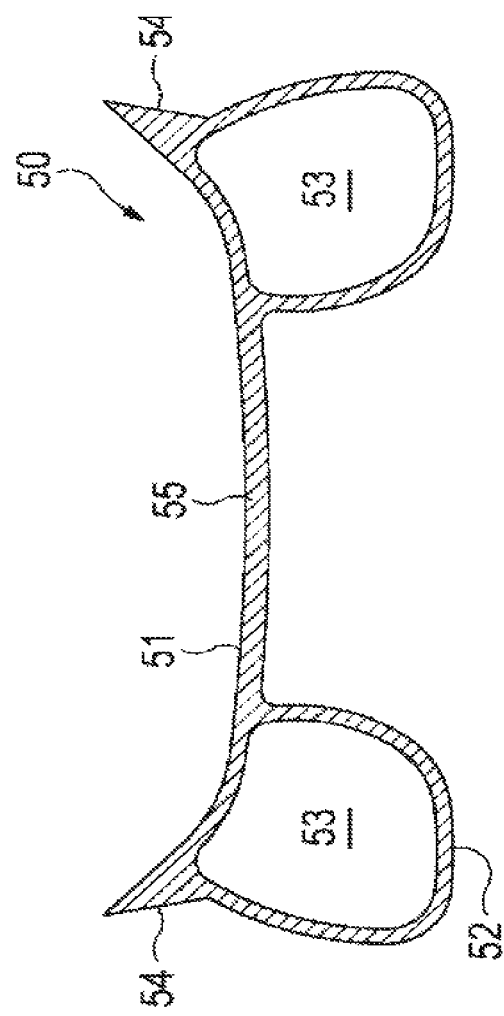
FIGS. 17A and 17B are cross-sectional views of the heel component, as defined by section lines 17A and 17B in FIG. 13.
Figure 17B:
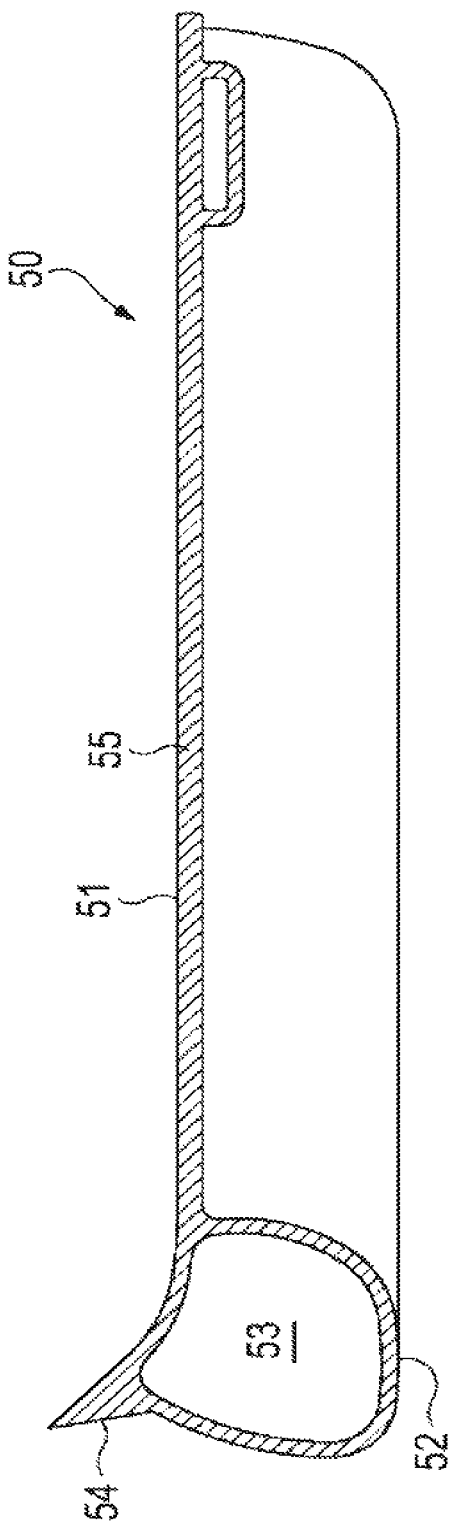

Upper surface 51 has a generally concave configuration, as depicted in FIGS. 17A and 17B, that supports the foot when footwear 10 is worn. As such, the foot effectively rests within the U-shaped configurations of chamber 53 and flange 54. This configuration may provide stability to footwear 10 and ensure that the foot remains properly positioned relative to heel component 50 and other portions of sole structure 30.

Flange 54 forms a peripheral seam or bonded area that joins the polymer layers forming surfaces 51 and 52 and assists with sealing the fluid within heel component 50. In general, flange 54 has a height of at least five millimeters and extends in an outward direction from a remainder of heel component 50. More particularly, flange 54 extends in an upward direction from the peripheral area or an upper area of heel component 50. Whereas the area of flange 54 corresponding with first surface 51 faces toward and is secured to upper 20, the area of flange 54 corresponding with second surface 52 faces away from and forms a portion of an exterior surface of footwear 10. More simply, one surface of flange 54 is secured to upper 20, and the opposite surface of flange 54 faces away from upper 20. Given that flange 54 is a relatively thick and stiff portion of heel component 50, flange 54 may enhance the stability of footwear 10. As with flange 44, flange 54 may provide a defined lasting margin during steps of the manufacturing process that involve bonding upper 20 to heel component 50.

Referring to the cross-sections of FIGS. 17A and 17B, for example, flange 54 is depicted as having a tapered configuration, with the portions of flange 54 located adjacent to chamber 53 having greater thickness than the portions of flange 54 that are spaced from chamber 53. In effect, therefore, flange 54 has a tapered configuration with a first thickness adjacent to the void in chamber 53 and a second thickness spaced away from the void, the first thickness being greater than the second thickness. Moreover, the thickness of the portions of flange 54 located adjacent to the void (i.e., the first thickness) is greater than either of (a) the thickness of web area 45 in the central area of heel component 50 and (b) the sum of the thicknesses of the polymer layers forming surfaces 51 and 52. Although flange 54 is formed from the polymer layers forming surfaces 51 and 52 and web area 55, flange 54 has a greater thickness than both of the polymer layers combined. As noted above, flange 54 is a relatively thick and stiff portion of heel component 50. A portion of the stiffness may be due, therefore, to the greater thickness of flange 54 adjacent to chamber 53.

Web area 55 extends throughout a central area of heel component 50. In this position, web area 55 forms a bonded area that joins the polymer layers forming surfaces 51 and 52 and also assists with sealing the fluid within chamber 53. Whereas chamber 53 protrudes outward to form structures for receiving the fluid within heel component 50, web area 55 exhibits lesser thickness and may provide cushioning or force attenuation through deflecting downward, similar to a trampoline.

Figure 18A:
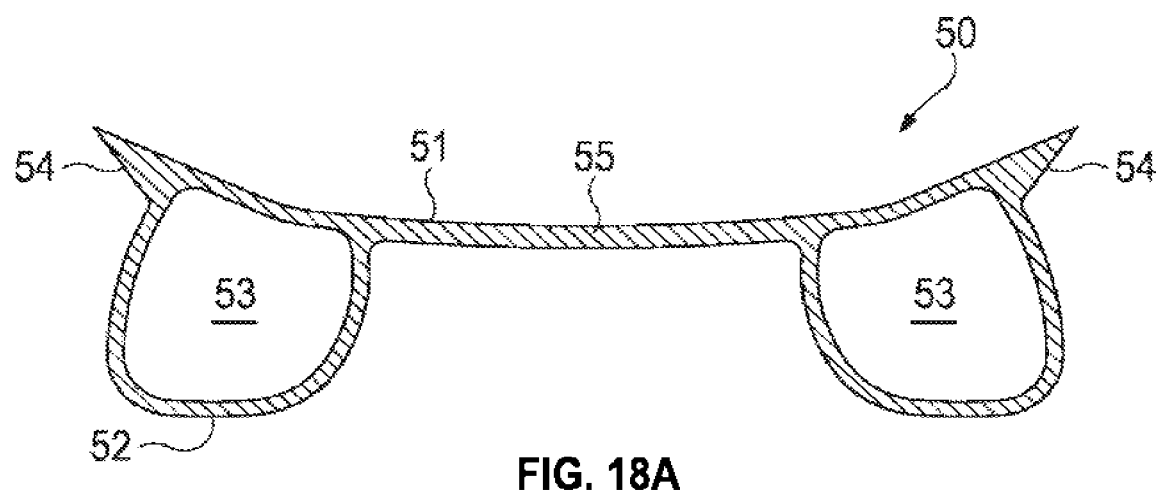
FIGS. 18A-18C are cross-sectional views corresponding with FIG. 17A and depicting further configurations of the heel component.
Figure 18B:
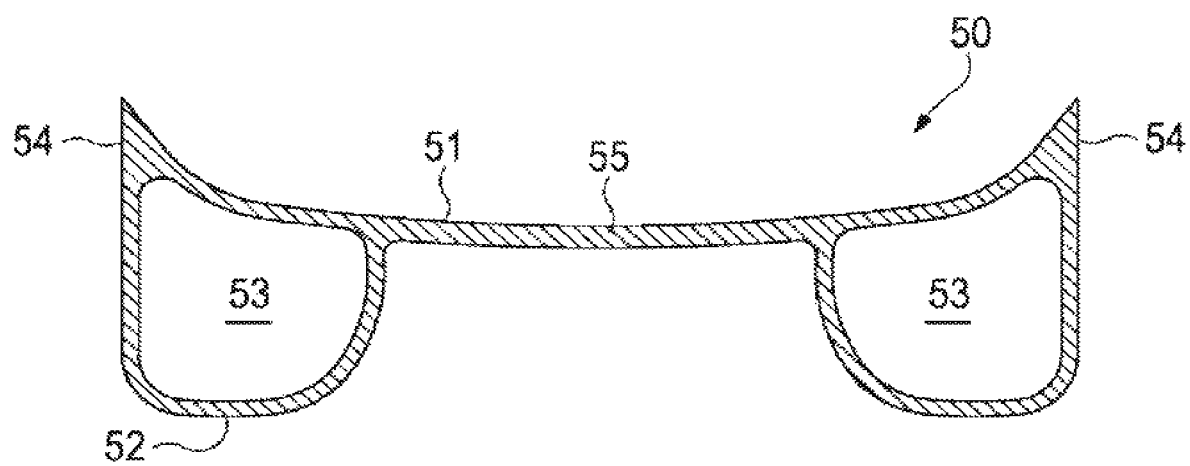
Figure 18C:
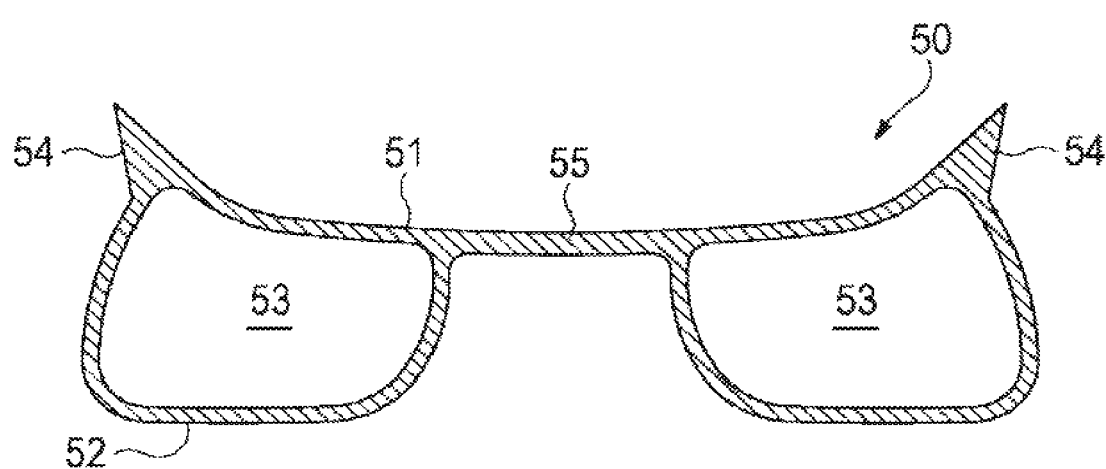

The configuration of heel component 50 discussed above provides one example of a suitable configuration for use in footwear 10 and other products. A variety of other configurations may also be utilized. For example, flange 54 angles outwardly in FIG. 18A, rather than having a vertical orientation. In this configuration, flange 54 may support edges of the foot, rather than extending along sides of the foot. Referring to FIG. 18B, chamber 53 bulges outward to a lesser degree, which locates flange 54 at the immediate periphery of heel component 50 and forms vertical sides for heel component 50. As another example, the width of chamber 53 is increased in FIG. 18C, which may modify the cushioning or force attenuation properties of heel component 50. In other configurations, flange 54 may have a squared aspect or be absent, similar to FIGS. 11D and 11E.

Although the area between opposite sides of chamber 53 and under web area 55 may be open, foam elements or other components may be located in this area. Referring to FIG. 19A, for example, a foam element 56 is located under and in contact with web area 55. Among other aspects, foam element 56 may affect the flexibility or force attenuation properties of heel component 50. Moreover, the shape and location of foam element 56 may also affect properties of heel component 50. Referring to FIG. 19B, foam element 56 has a tapered configuration, which may alter properties between forward and rearward areas of heel component 50. Similarly, foam element 56 is tapered and spaced from web area 55 in FIG. 19C. Accordingly, heel component 50 may vary in many aspects.

Manufacturing Process for Forefoot Component

Figure 20:
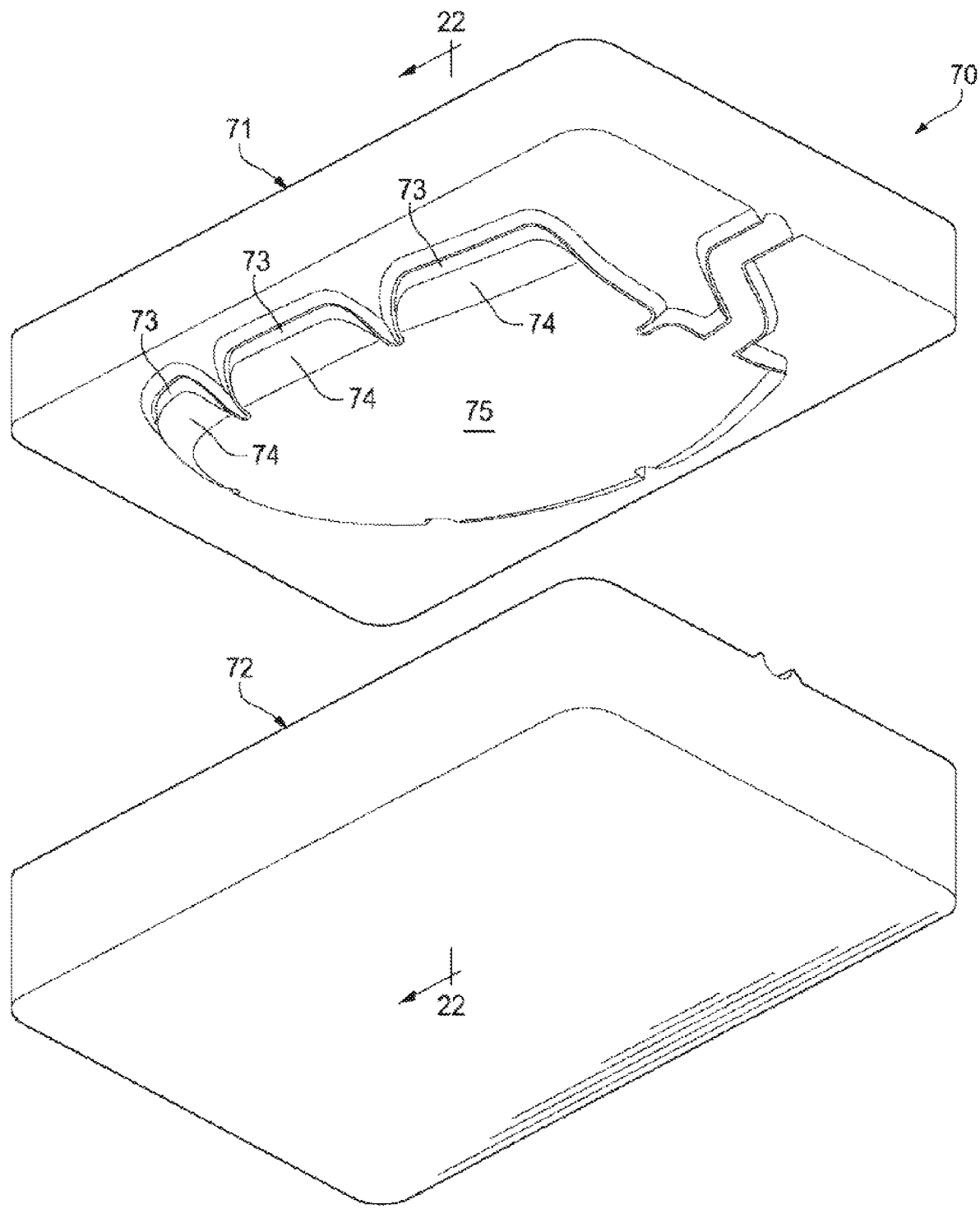
FIGS. 20 and 21 are perspective views of a forefoot component mold.
Figure 21:
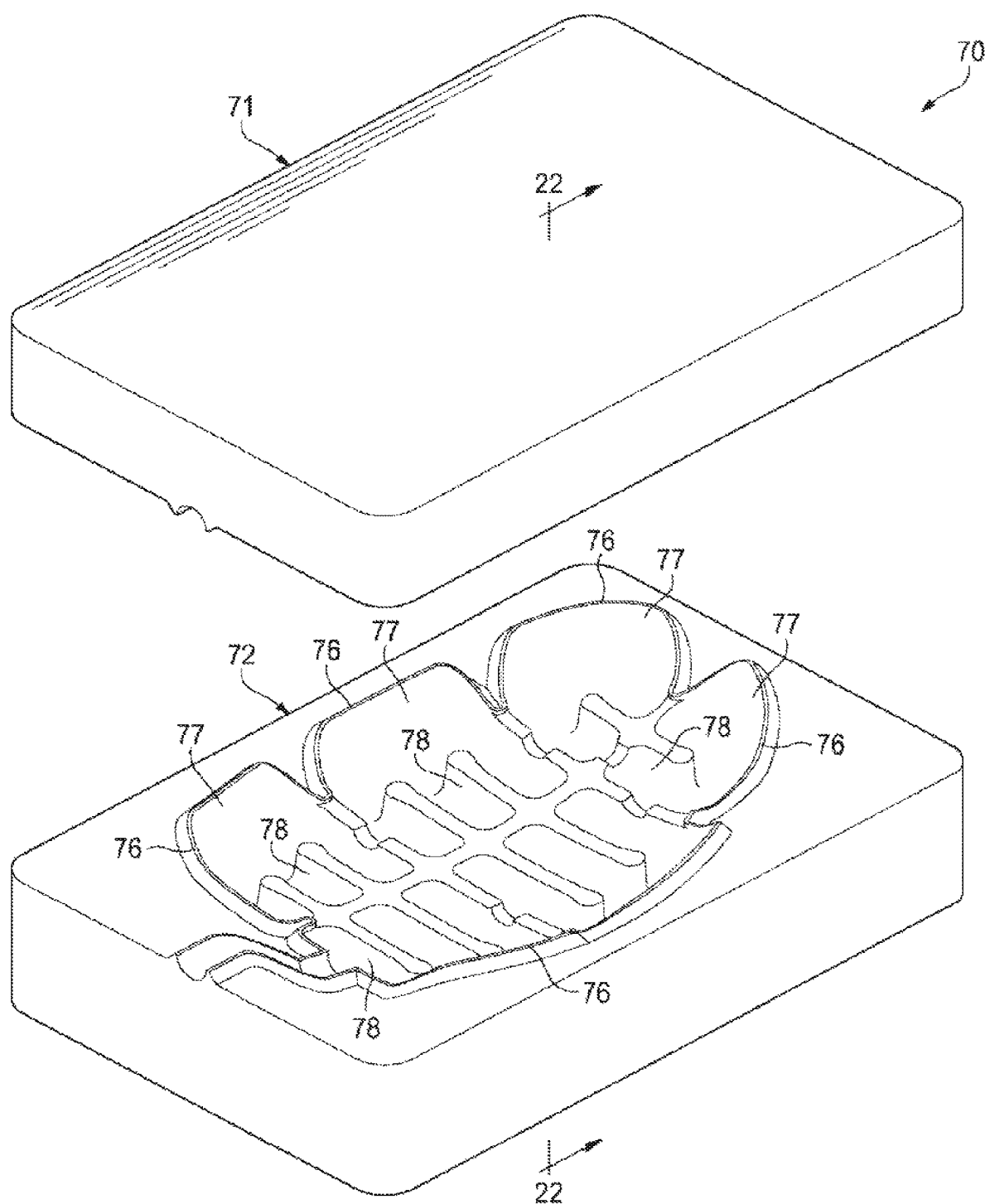

Although a variety of manufacturing processes may be utilized to form forefoot component 40, an example of a suitable process will now be discussed. With reference to FIGS. 20 and 21, a mold 70 that may be utilized in the manufacturing process is depicted as including a first mold portion 71 and a second mold portion 72. As discussed below in reference to FIGS. 22A-22E, mold 70 is utilized to form forefoot component 40 from a first polymer layer 81 and a second polymer layer 82, which are the polymer layers respectively forming first surface 41 and second surface 42. More particularly, mold 70 facilitates the manufacturing process by (a) shaping polymer layers 81 and 82 in areas corresponding with chambers 43a-43f, flange 44, and conduits 46 and (b) joining polymer layers 81 and 82 in areas corresponding with flange 44 and web area 45.

Figure 22A:
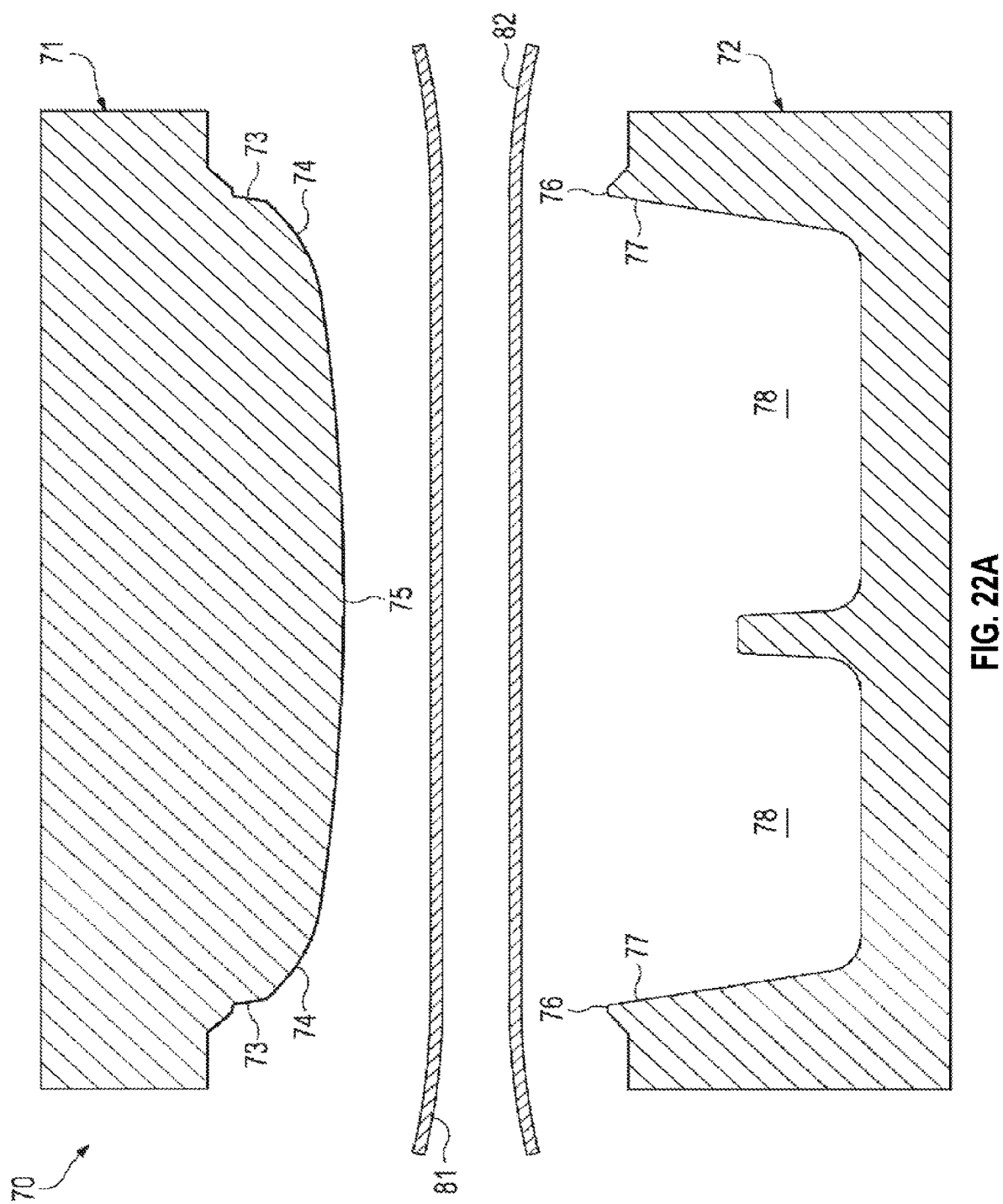

Various surfaces or other areas of mold 70 will now be defined for use in discussion of the manufacturing process. Referring to FIGS. 20 and 22A, first mold portion 71 includes a pinch surface 73, a first seam-forming surface 74, and a compression surface 75. Surfaces 73 and 74 are angled relative to each other, with pinch surface 73 being more vertical than first seam-forming surface 74. Referring to FIGS. 21 and 22A, second mold portion 72 includes a pinch edge 76 and a second seam-forming surface 77. Whereas pinch edge 76 is a relatively sharp corner or angled area in second mold portion 72, second seam-forming surface 77 extends downward and is generally, although not necessarily, parallel to pinch surface 73. A void within mold 70 and between mold portions 71 and 72 has a shape of forefoot component 40, prior to pressurization, and forms various features of forefoot component 40. A portion of this void is identified as a depression 78 in second mold portion 72.

Each of polymer layers 81 and 82 are initially located between each of mold portions 71 and 72, which are in a spaced or open configuration, as depicted in FIG. 22A. In this position, first polymer layer 81 is positioned adjacent or closer to first mold portion 71, and second polymer layer 82 is positioned adjacent or closer to second mold portion 72. A shuttle frame or other device may be utilized to properly position polymer layers 81 and 82. As part of the manufacturing process, one or both of polymer layers 81 and 82 are heated to a temperature that facilitates shaping and bonding. As an example, various radiant heaters or other devices may be utilized to heat polymer layers 81 and 82, possibly prior to being located between mold portions 71 and 72. As another example, mold 70 may be heated such that contact between mold 70 and polymer layers 81 and 82 at a later portion of the manufacturing process raises the temperature to a level that facilitates shaping and bonding.

Figure 22B:
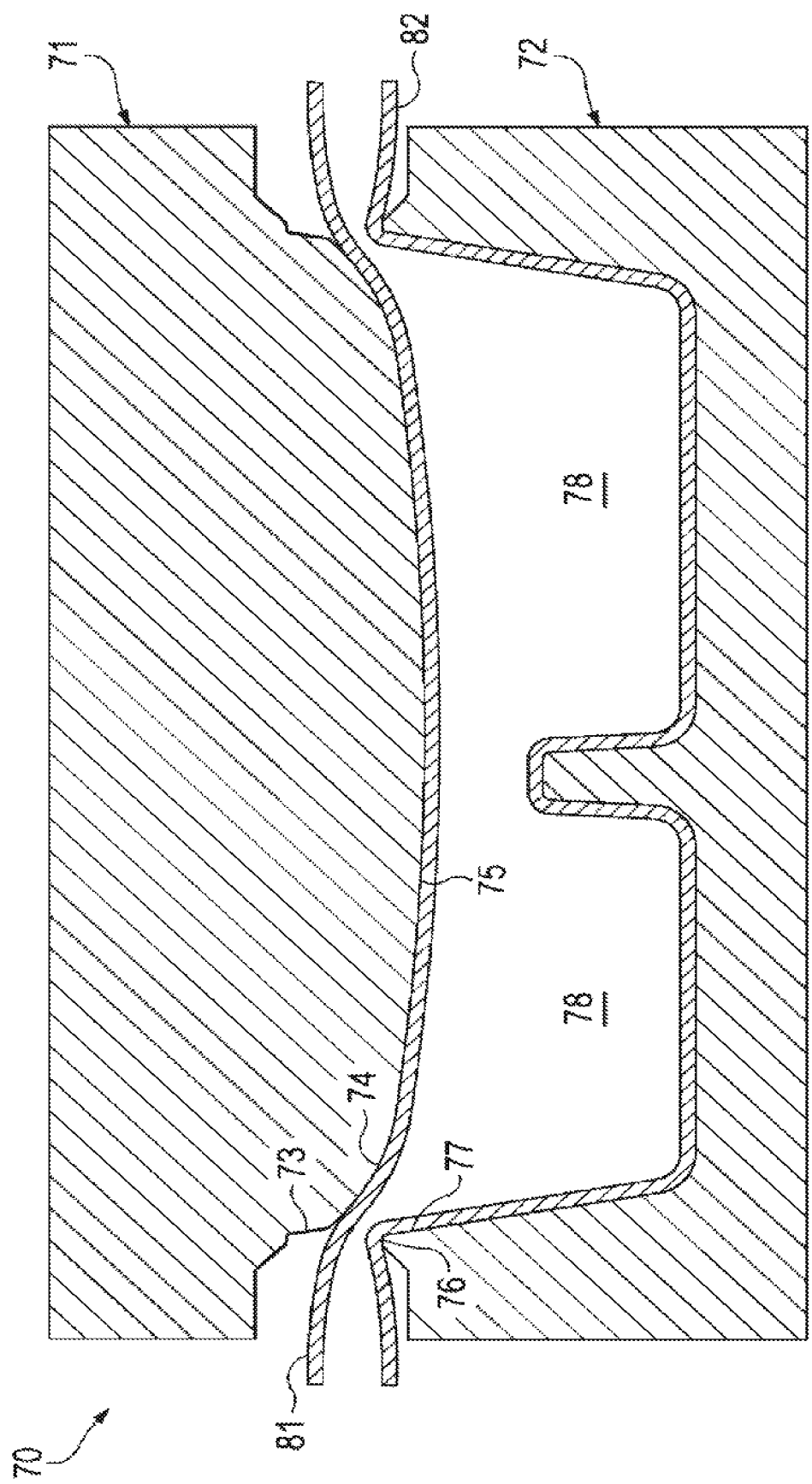

Once polymer layers 81 and 82 are properly positioned, mold portions 71 and 72 translate or otherwise move toward each other and begin to close upon polymer layers 81 and 82, as depicted in FIG. 22B. As mold portions 71 and 72 move toward each other, various techniques may be utilized to draw polymer layers 81 and 82 against surfaces of mold portions 71 and 72, thereby beginning the process of shaping polymer layers 81 and 82. For example, air may be partially evacuated from the areas between (a) first mold portion 71 and first polymer layer 81 and (b) second mold portion 72 and second polymer layer 82. More particularly, air may be withdrawn through various vacuum ports in mold portions 71 and 72. By removing air, polymer layers 81 and 82 are drawn into contact with the surfaces of mold portions 71 and 72. As another example, air may be injected into the area between polymer layers 81 and 82, thereby elevating the pressure between polymer layers 81 and 82. During a preparatory stage of this process, an injection needle may be located between polymer layers 81 and 82, and a gas may then be ejected from the injection needle such that polymer layers 81 and 82 engage the surfaces of mold 70. Each of these techniques may be used together or independently.

As mold portions 71 and 72 continue to move toward each other, polymer layers 81 and 82 are pinched between mold portions 71 and 72, as depicted in FIG. 22C. More particularly, polymer layers 81 and 82 are compressed between pinch surface 73 and pinch edge 76. In addition to beginning the process of separating excess portions of polymer layers 81 and 82 from portions that form forefoot component 40, the pinching of polymer layers 81 and 82 begins the process of bonding or joining layers 81 and 82 in the area of flange 44.

Figure 22D:
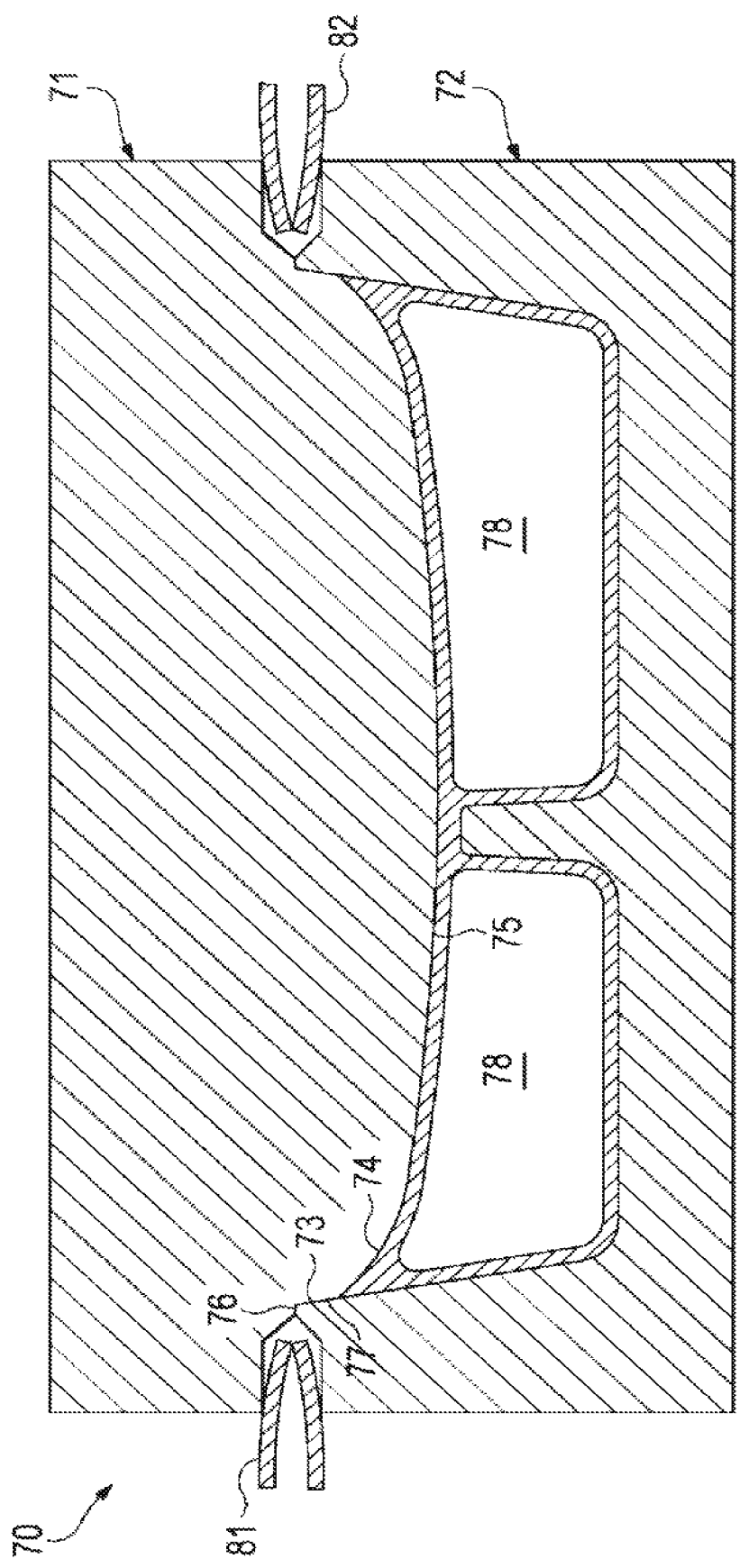

Following the pinching of polymer layers 81 and 82, mold portions 71 and 72 proceed with moving toward each other and into a closed configuration, as depicted in FIG. 22D. In the period between FIGS. 22C and 22D, pinch surface 73 contacts and slides against a portion of second seam-forming surface 77. The contact between pinch surface 73 and second seam-forming surface 77 effectively severs excess portions of polymer layers 81 and 82 from portions that form forefoot component 40. In addition, the sliding movement pushes portions of the material forming polymer layers 81 and 82 downward and further into depression 78. Moreover, the material forming polymer layers 81 and 82 compacts or otherwise collects in the area between seam-forming surfaces 74 and 77. Given that seam-forming surfaces 74 and 77 are angled relative to each other, the compacted polymer material forms a generally triangular or tapered structure, which results in flange 44. In addition to forming flange 44, polymer layers 81 and 82 are (a) shaped to form chambers 43a-43f and (b) compressed and joined to form web area 45.

At the stage of the process depicted in FIG. 22D, a void within mold 70, which is located between compression surface 75 and depression 78, effectively has the shape of forefoot component 40 prior to inflation or pressurization. Moreover, a peripheral portion of the void includes an area that forms flange 44 between seam-forming surfaces 74 and 77. The non-parallel configuration between seam-forming surfaces 74 and 77 results in a tapered space where the polymer material collects to form flange 44. A distance across the space between seam-forming surfaces 74 and 77 is greater adjacent to a portion of the void that forms chambers 43a-43f than in the area where seam-forming surfaces 74 and 77 meet, which is spaced from the portion of the void that forms chambers 43a-43f. Although the configuration of the tapered space between seam-forming surfaces 74 and 77 may vary, an angle formed between seam-forming surfaces 74 and 77 may be in a range of twenty and forty-five degrees.

As discussed above, the material forming polymer layers 81 and 82 compacts or otherwise collects in the area between seam-forming surfaces 74 and 77. This compaction effectively thickens one or both of polymer layers 81 and 82. That is, whereas polymer layers 81 and 82 have a first thickness at the stage depicted in FIG. 22A, one or both of polymer layers 81 and 82 within flange 44 may have a second, greater thickness at the stage depicted in FIG. 22D. The compaction that occurs as pinch surface 73 contacts and slides against a portion of second seam-forming surface 77 increases the thickness of the polymer material forming one or both of polymer layers 81 and 82.

Figure 22E:
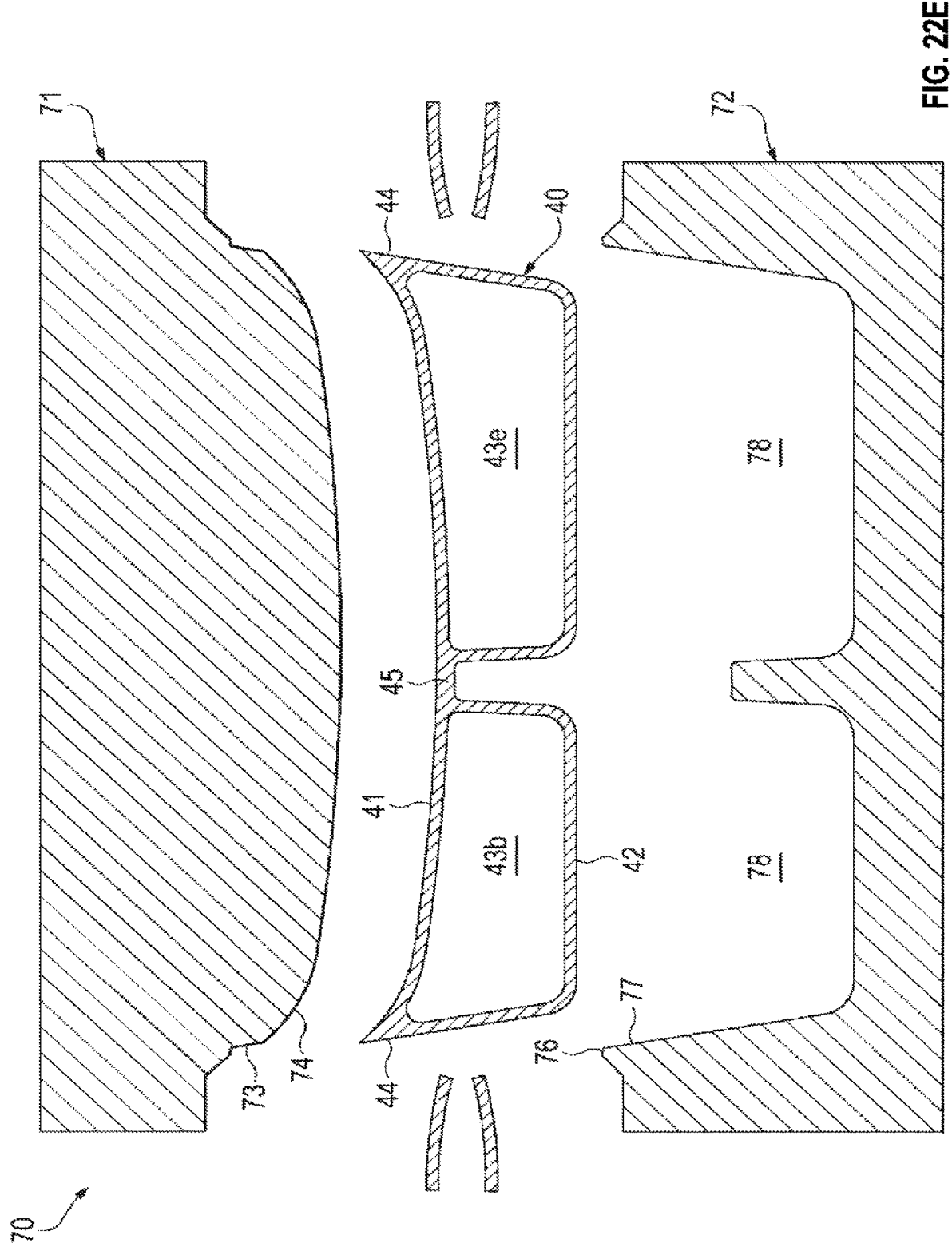

When forming forefoot component 40 is complete, mold 70 is opened and forefoot component 40 is removed and permitted to cool, as depicted in FIG. 22E. A fluid may then be injected into forefoot component 40 to pressurize chambers 43a-43f, thereby completing the manufacture of forefoot component 40. As a final step in the process, forefoot component 40 may be incorporated into sole structure 30 of footwear 10.

Manufacturing Process for Heel Component

Figure 23:
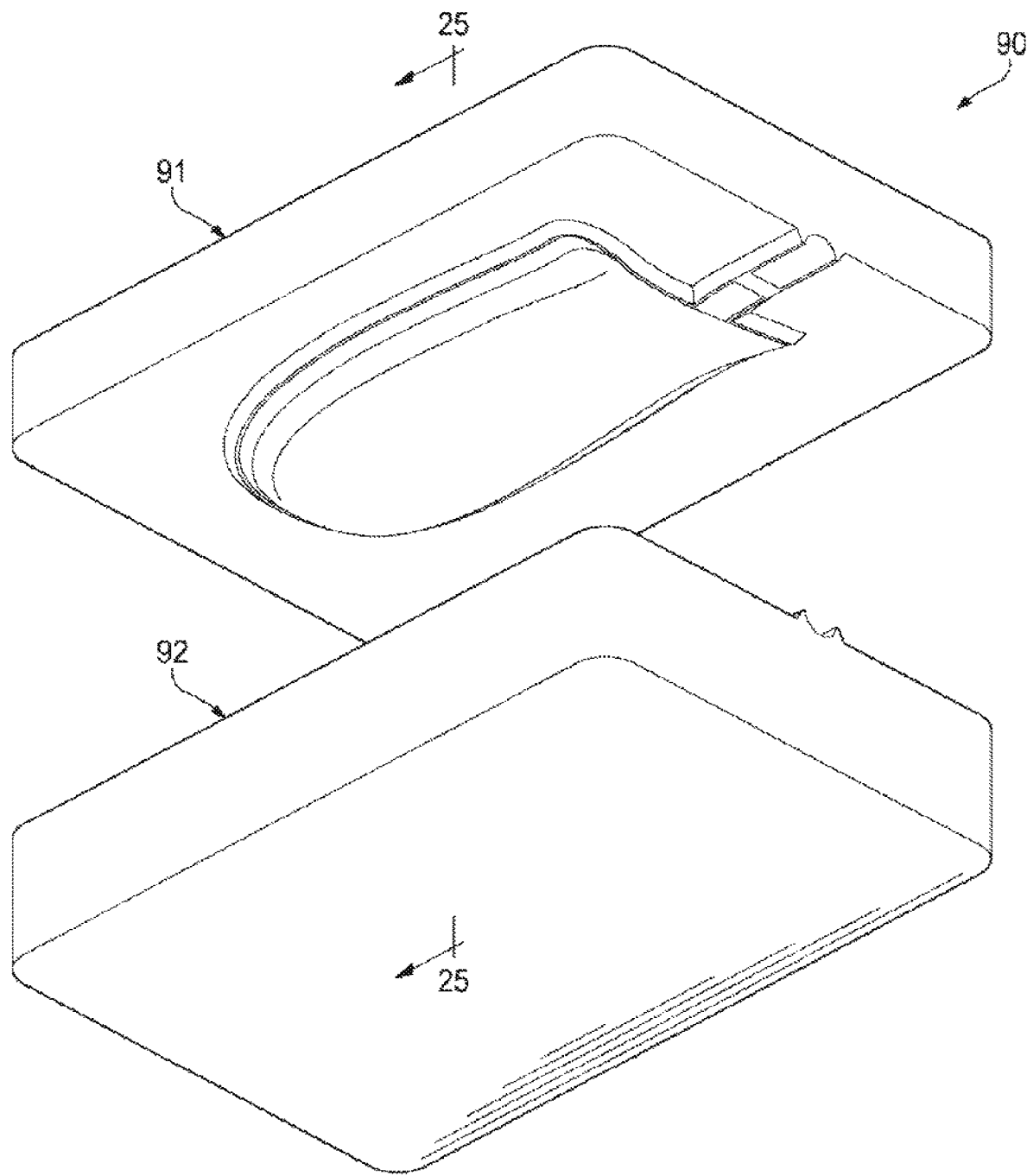
FIGS. 23 and 24 are perspective views of a heel component mold.
Figure 24:
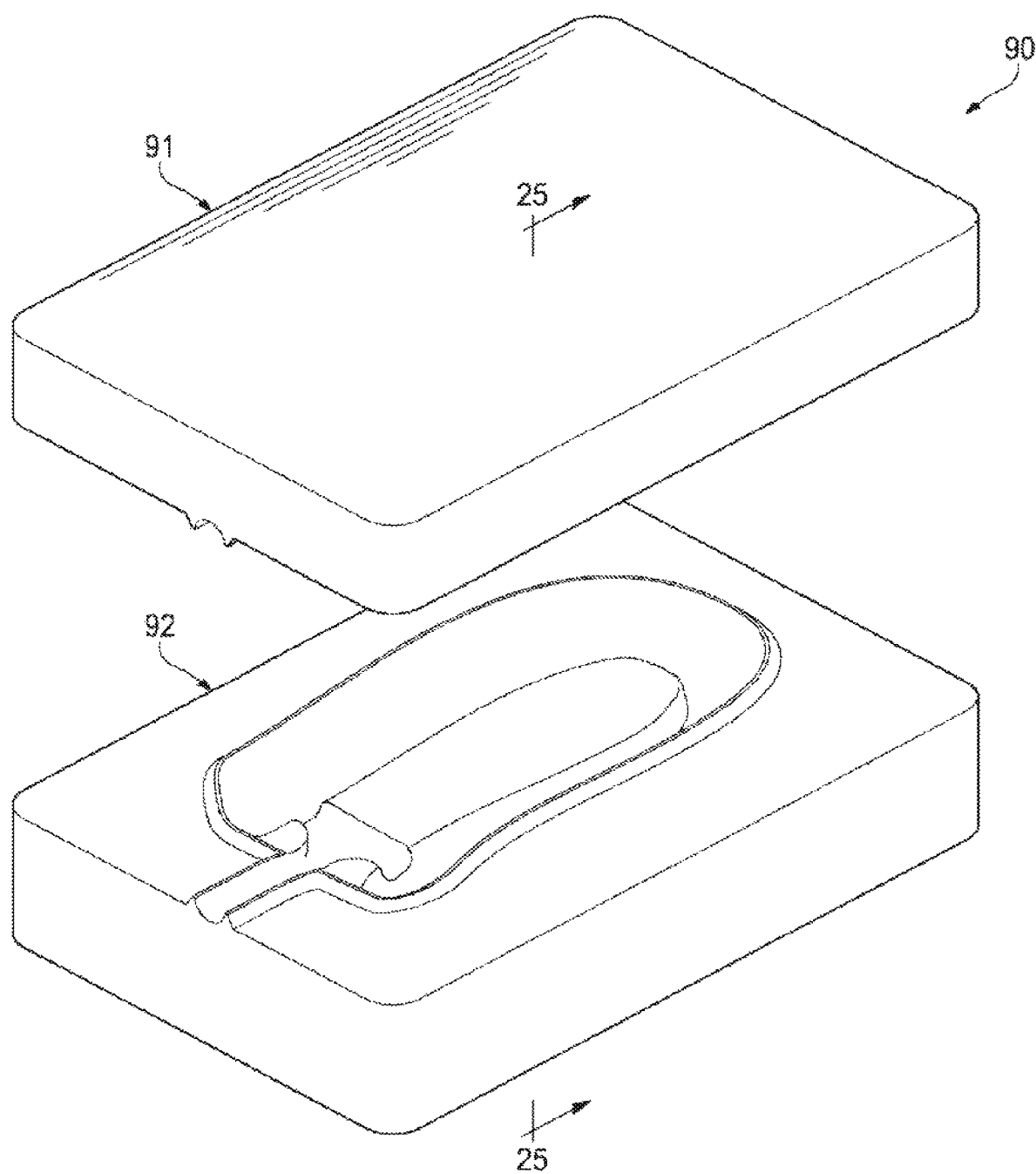

Although a variety of manufacturing processes may be utilized, heel component 50 may be formed through a process that is generally similar to the process discussed above for forefoot component 40. With reference to FIGS. 23 and 24, a mold 90 that may be utilized in the manufacturing process is depicted as including a first mold portion 91 and a second mold portion 92. As discussed below in reference to FIGS. 25A-25D, mold 90 is utilized to form heel component 50 from additional elements of first polymer layer 81 and second polymer layer 82, which are the polymer layers respectively forming first surface 51 and second surface 52. More particularly, mold 90 facilitates the manufacturing process by (a) shaping polymer layers 81 and 82 in areas corresponding with chamber 53 and flange 54 and (b) joining polymer layers 81 and 82 in areas corresponding with flange 54 and web area 55. In addition, mold 90 facilitates the bonding of outsole 60 to heel component 50.

Figure 25B:
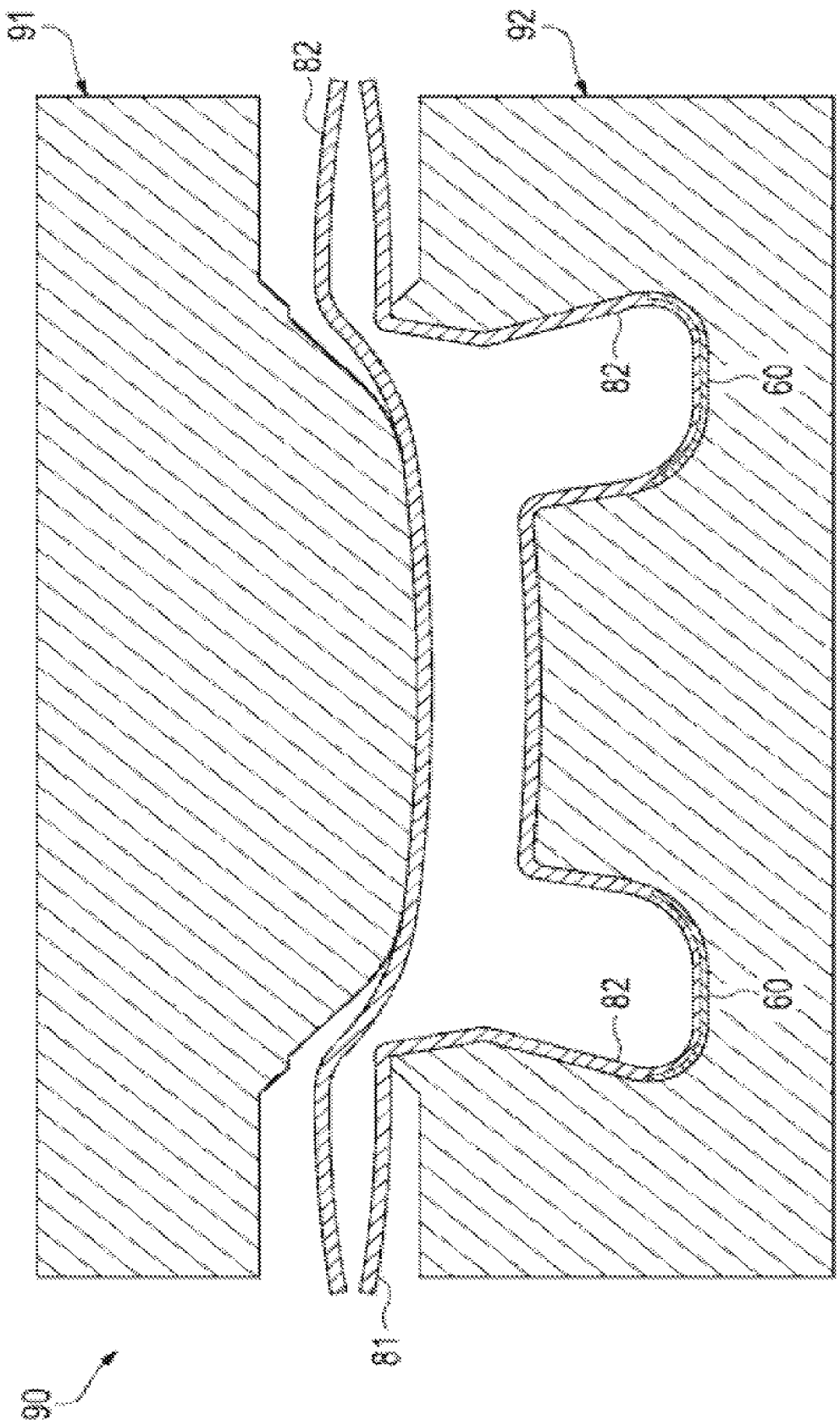

Each of polymer layers 81 and 82 are initially located between each of mold portions 91 and 92, as depicted in FIG. 25A. In addition, one or more elements that form outsole 60 are also located relative to mold 90. Once polymer layers 81 and 82 are properly positioned and the elements of outsole 60 are located within depressions in second mold portion 91, mold portions 91 and 92 translate or otherwise move toward each other and begin to close upon polymer layers 81 and 82, as depicted in FIG. 25B. As discussed above, air may be partially evacuated from the areas between (a) first mold portion 91 and first polymer layer 81 and (b) second mold portion 92 and second polymer layer 82. Additionally, air may be injected into the area between polymer layers 81 and 82. Using one or both of these techniques, polymer layers 81 and 82 are induced to engage the surfaces of mold 90. Additionally, polymer layers 81 and 82 also lay against outsole 60. In effect, therefore, polymer layers 81 and 82 are shaped against surfaces of mold 90 and outsole 60.

Figure 25C:
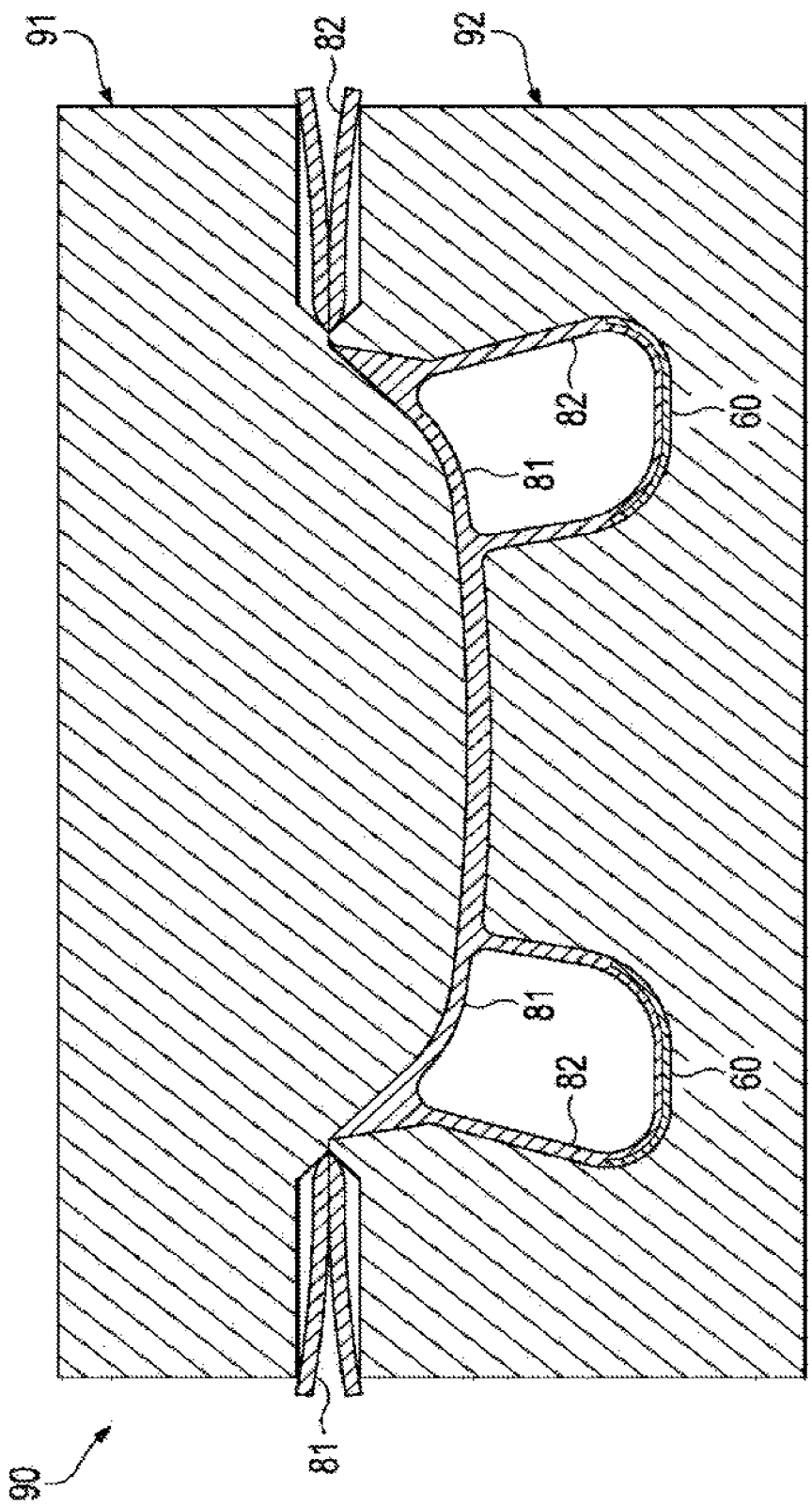

As mold portions 91 and 92 continue to move toward each other, polymer layers 81 and 82 are compressed between mold portions 91 and 92, as depicted in FIG. 25C. More particularly, polymer layers 81 and 82 are compressed to form flange 54 and web area 55. Polymer layer 82 also bonds with outsole 60. In some configurations, outsole 60 may be thermal bonded to heel component 50 during the manufacturing process. For example, when each of polymer layer 82 and outsole 60 are formed from similar or compatible polymer materials, or when outsole 60 is at least partially formed from the polymer material of chamber 53, heating of the components may induce thermal bonding between the components.

Figure 25D:
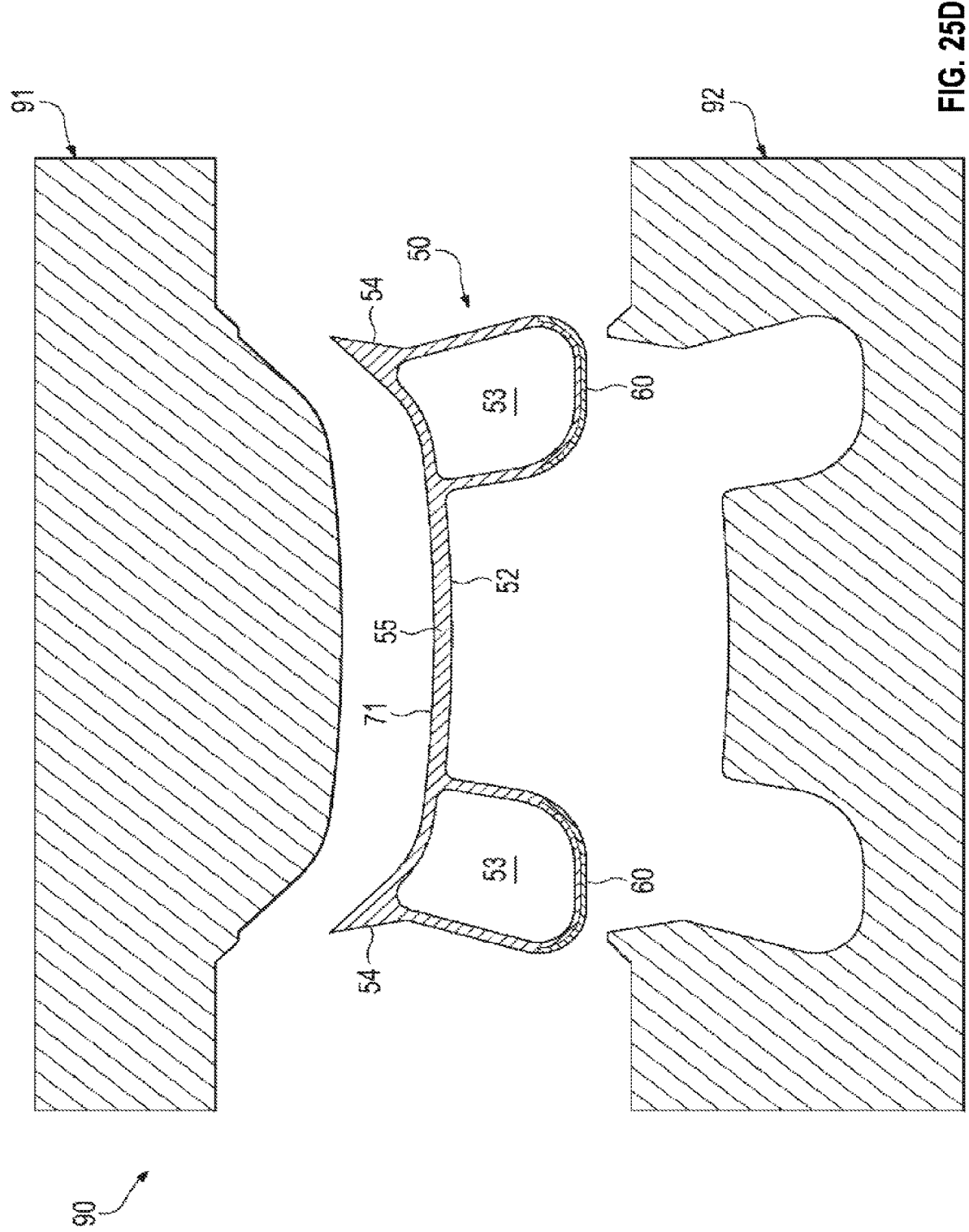

When forming heel component 50 is complete, mold 90 is opened and heel component 50 is removed and permitted to cool, as depicted in FIG. 25D. A fluid may then be injected into heel component 50 to pressurize chamber 53, thereby completing the manufacture of heel component 50. As a final step in the process, heel component 50 may be incorporated into sole structure 30 of footwear 10.

As polymer layers 81 and 82 are drawn into mold 90, particularly the larger depressions in second mold portion 91, polymer layers 81 and 82 stretch to conform with the contours of mold 90. When polymer layers 81 and 82 stretch, they also thin or otherwise decrease in thickness. Accordingly, the initial thicknesses of polymer layers 81 and 82 may be greater than the resulting thicknesses after the manufacturing process.

Figure 26A:
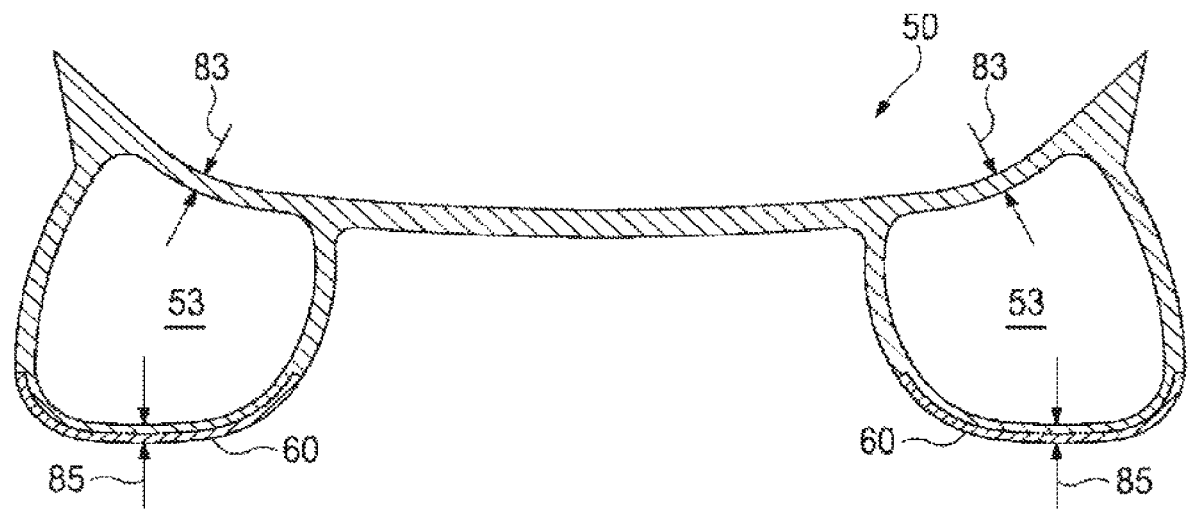
FIG. 26A is a cross-sectional view corresponding with FIG. 17A and depicting another configuration of the heel component.
Figure 26B:
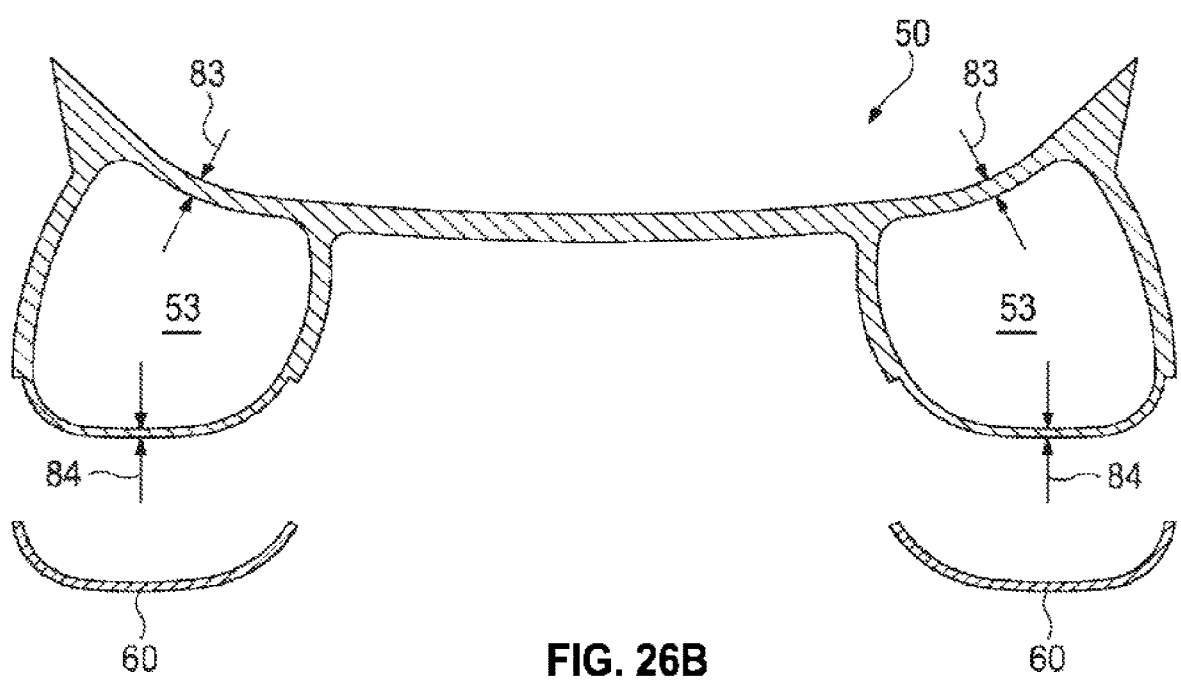
FIG. 26B is an exploded cross-sectional view of the configuration from FIG. 26A.

Referring to FIGS. 26A and 26B, various thickness dimensions 83, 84, and 85 are defined. Thickness dimension 83 is measured in an upper area of chamber 53 and between an exterior surface of chamber 53 and an interior surface of chamber 53, which defines the void. Thickness dimension 84 is measured in a lower area of chamber 53 and between the exterior and interior surfaces of chamber 53. Thickness dimension 85 is measured in the same place as thickness dimension 84 and between an outer surface of outsole 60 and the interior surface of chamber 53.

For footwear applications, as noted above, a polymer thickness of 0.75 millimeter (0.03 inch) and a fluid pressure of 138 kilopascals (20 pounds per square inch) provides a suitable degree of compliance, force attenuation, and other properties. Polymer thicknesses of less than 0.75 millimeter may rupture or otherwise fail prematurely or after repeated use. The manufacturing processes for many chambers are designed, therefore, to ensure that the polymer thickness remains at or above 0.75 millimeter. In the manufacturing process for heel component 50, however, the relatively deep depressions in second mold portion 92 may result in thinning of second polymer layer 82 that is below the 0.75 millimeter threshold. That is, second polymer layer 82 may thin to a degree that makes heel component susceptible to rupturing. The bonding of outsole 60 to heel component 50, however, effectively thickens and reinforces the lower area of heel component 50.

Given the above discussion, thickness dimension 83 may be approximately 0.75 millimeter and thickness dimension 84 may be less than 0.75 millimeter, and possibly less than 0.50 millimeter (0.02 inch) or more than fifty percent less than thickness dimension 83. The addition of outsole 60 increases the thickness in the lower area of heel component 50, and generally increases the thickness to more than 0.75 millimeter. As such, thickness dimension 83 may be (a) more than thickness dimension 84 and (b) less than thickness dimension 85. Moreover, designing heel component 50 such that thickness dimension 85 is greater than thickness dimension 83 ensures that outsole 60 may wear from contact with the ground.

In addition to providing a wear surface in footwear 10, outsole 60 may enhance various properties of sole structure 30. The thickness, flexibility, and stretch of outsole 60, for example, may be varied or selected to modify or otherwise tune the cushioning response, flexibility, compressibility, and other properties of sole structure 30. Ribs, apertures, or other features of outsole 60 may also affect the resulting properties of sole structure 30. Outsole 60 may also incorporate tread elements (e.g., protrusions, ridges) that imparts traction. Regarding aesthetics, outsole 60 may be colored, clear, or patterned to enhance the visual appeal of footwear 100. In some configurations, outsole 60 may be replaced by a plate or other structural element in the manufacturing process discussed above. In addition to modifying the properties of sole structure 30, a plate may have features that assist with securing an outsole or other element to heel component 50.

Figure 27:
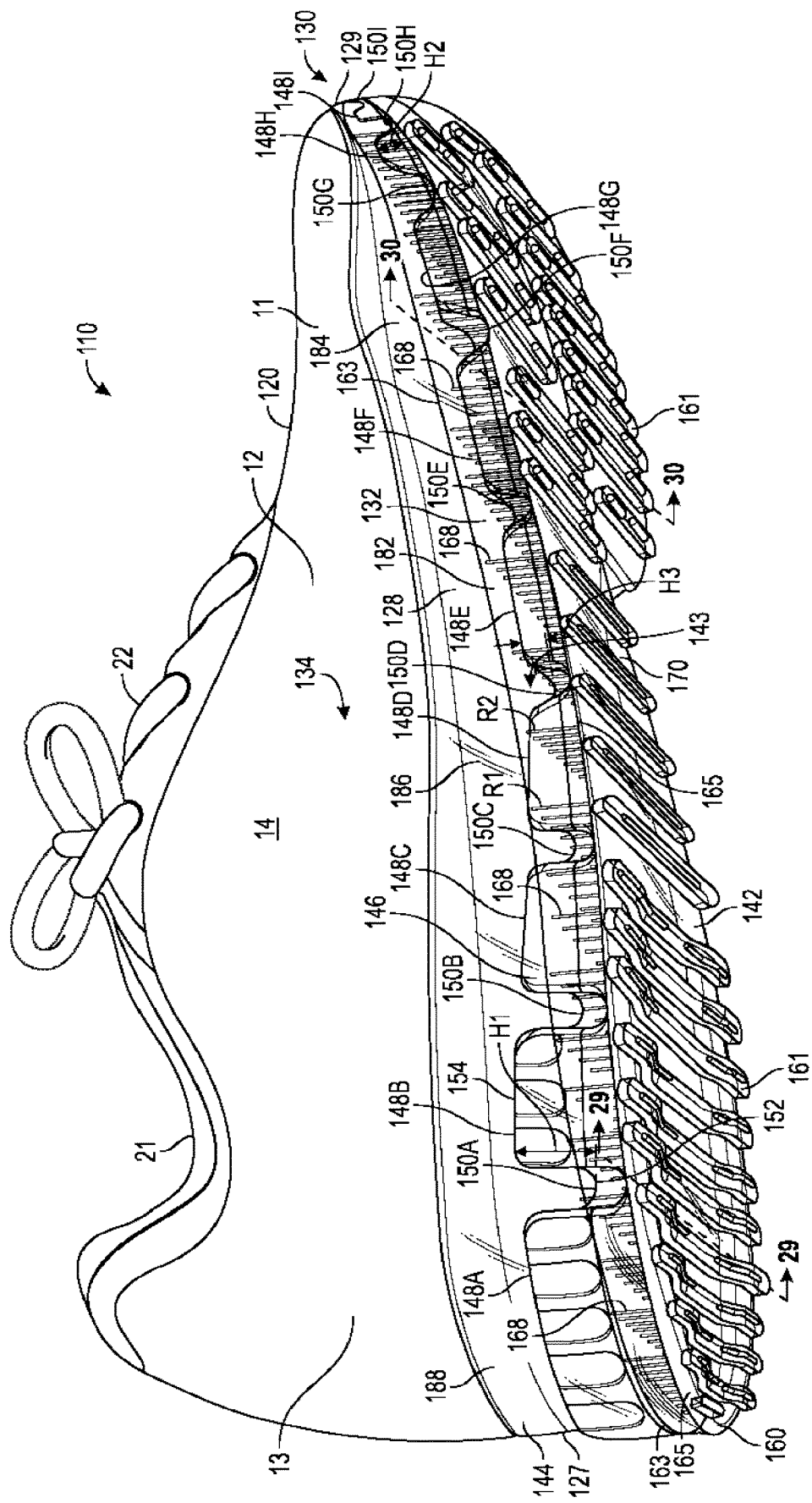
FIG. 27 is a schematic perspective illustration of another configuration of an article of footwear and showing a lateral side and a bottom.
Figure 28:
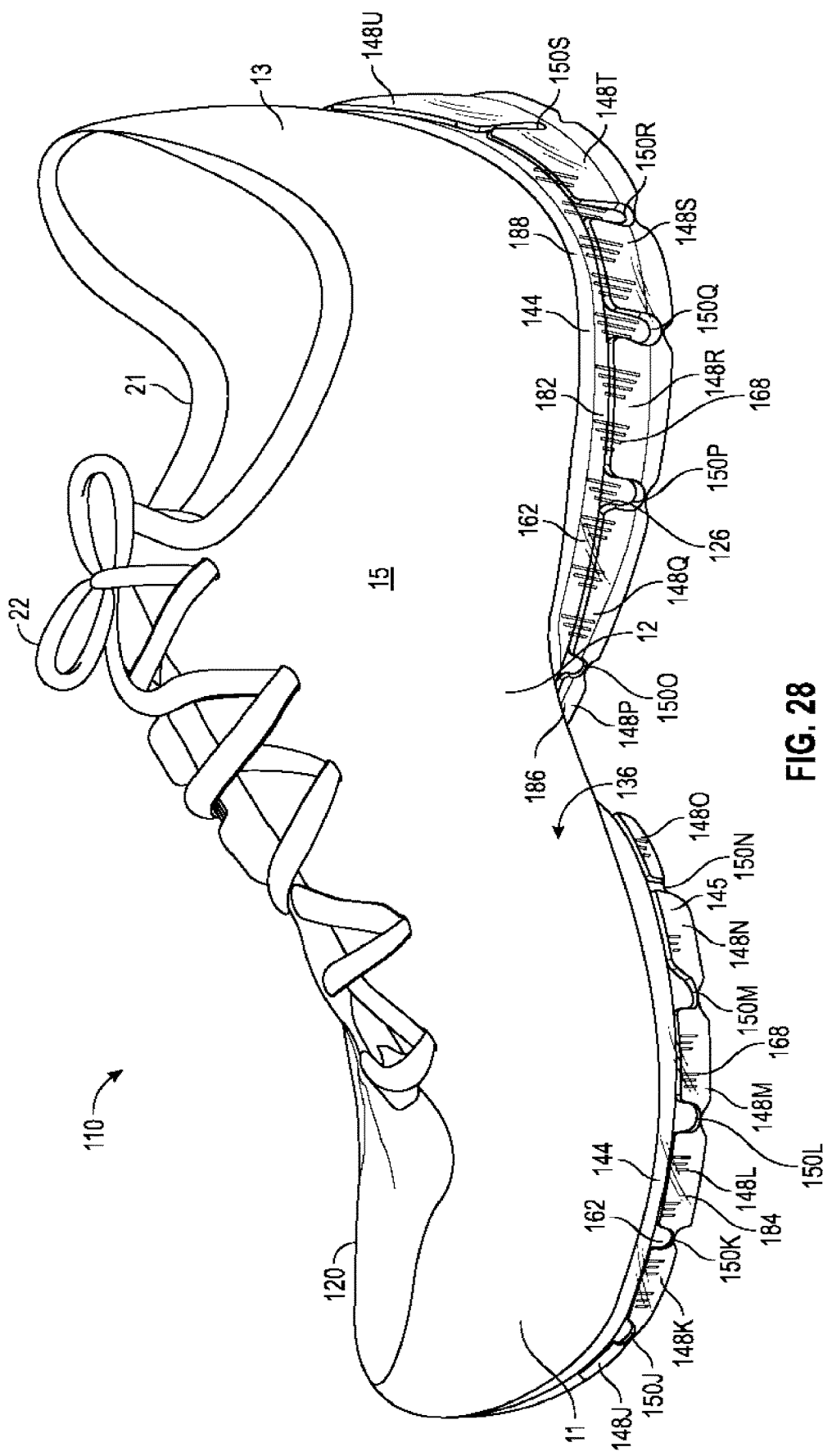
FIG. 28 is a schematic perspective illustration of the article of footwear of FIG. 27 and showing a medial side.
Figure 29:
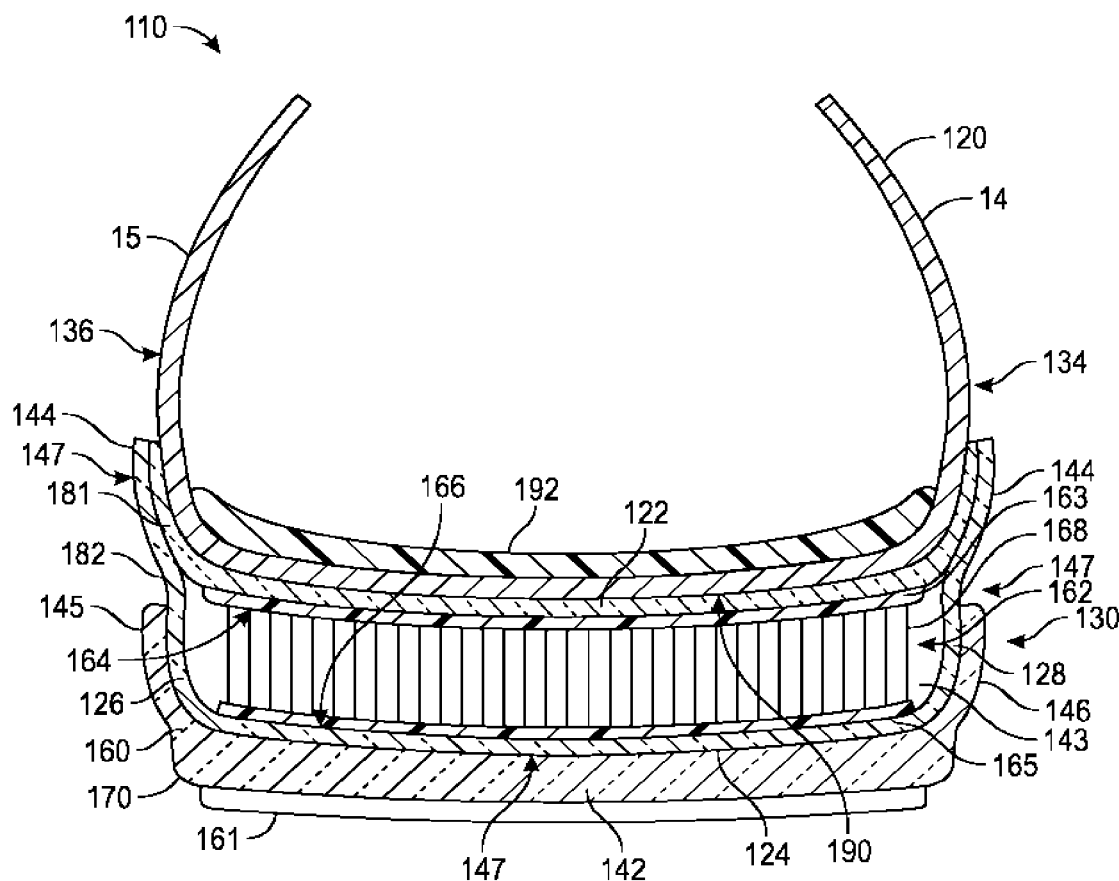
FIG. 29 is a schematic cross-sectional illustration of the article of footwear of FIG. 27 taken at lines 29-29 in FIG. 27.

FIG. 27 shows another configuration of an article of footwear 110. Features of the article of footwear 110 that are the same as those shown and described with respect to article of footwear 10 are indicated with like reference numbers. The article of footwear 110 has a sole structure 130 that includes a cushioning component 132 defining an enclosed, fluid-filled chamber 143. As best shown in FIG. 29, the sole structure 130 also includes a unitary outsole 160 bonded to a bottom wall 124 and to side walls 126, 128 of the cushioning component 132 such that the outsole 160 wraps substantially up the side walls 124, 126. The outsole 160 is also bonded to a rear wall 127 and a front wall 129 of the cushioning component 132, as indicated in FIG. 27. As shown in FIGS. 27-31, the outsole 160 includes integral tread portions 161 that can be injection molded integrally with a body portion 170 of the unitary outsole 160. Alternatively, the tread portions 161 can be positioned in a mold assembly adjacent the body portion 170 and can thermally bond to the body portion 170 during molding of the cushioning component 132. The tread portions 161 may have a variety of different shapes and patterns.

The cushioning component 132 may be formed from a polymer material, such as any of the polymer materials described with respect to the article of footwear 10. For example, in the embodiment of FIG. 27, the cushioning component 132 includes a first polymer sheet 181 and a second polymer sheet 182, which may also be referred to as an upper polymer sheet and a lower polymer sheet, respectively. The second polymer sheet 182 is bonded to the first polymer sheet 181 so that the first and second polymer sheets form a peripheral flange 144 and define the fluid-filled chamber 143. More specifically, with reference to FIG. 29, the first polymer sheet 181 forms a top wall 122 of the cushioning component 132. The second polymer sheet 182 forms a bottom wall 124, a medial side wall 126 and a lateral side wall 128 of the cushioning component 132.

The first and second polymer sheets 181, 182 may be molded by thermoforming, as described herein, so that the peripheral flange 144 is nearer the top wall 122 than the bottom wall 124 as shown in FIG. 29. This allows the flange 144 of the cushioning component 132 to bond to and cup the upper 120 by extending along lateral and medial surfaces 134, 136 of the upper 120 as shown in FIGS. 27-30 and as further discussed herein. In the embodiment shown, the cushioning component 132 includes a forefoot portion 184, a midfoot portion 186, and a heel portion 188 corresponding with the forefoot portion 11, the midfoot portion 12, and the heel portion 13 of the article of footwear 110, and the chamber 143 formed by the cushioning component 132 extends under the upper 120 at the forefoot portion 11, the midfoot portion 12, and the heel portion 13 of the article of footwear 110. The cushioning component 132 may thus be referred to as a full length cushioning component.

In one embodiment, the first and second polymer sheets 181, 182 are multi-layer polymer sheets including thermoplastic polyurethane layers alternating with barrier layers that comprise a copolymer of ethylene and vinyl alcohol (EVOH) impermeable to fluid contained in the chamber 143. The fluid may be air, nitrogen, or another gas used to inflate the chamber 143.

Figure 30:
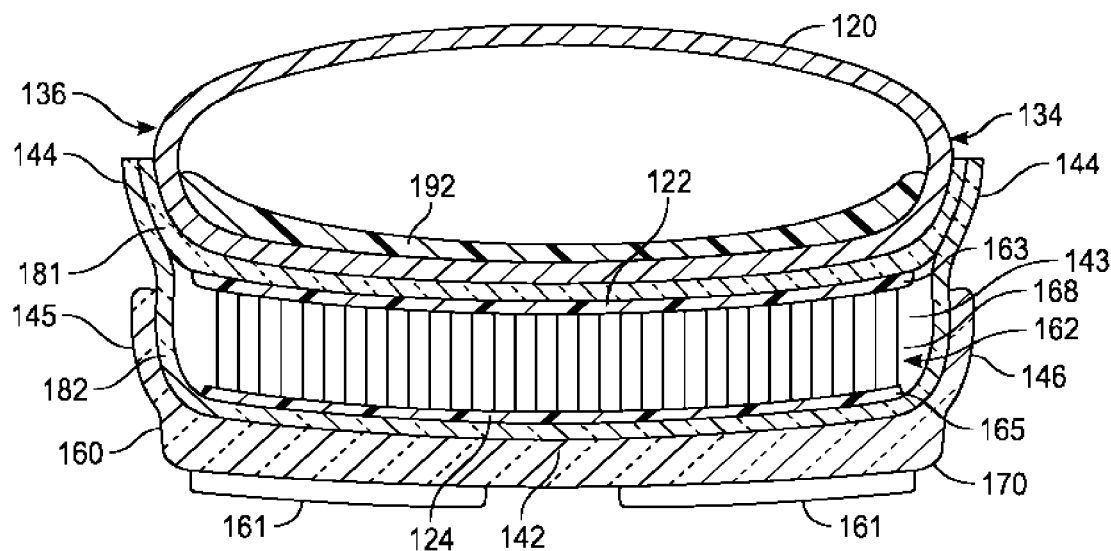
FIG. 30 is a schematic cross-sectional illustration of the article of footwear of FIG. 27 taken at lines 30-30 in FIG. 27.

As best shown in FIGS. 29 and 30, the cushioning component 132 may include a tether element 162 within the chamber 143. The tether element 162 includes a first plate 163 bonded to an inner surface 164 of the top wall 122. The tether element 162 further includes a second plate 165 bonded to an inner surface 166 of the bottom wall 124. The plates 163, 165 may be a thermoplastic material that thermally bonds to the first and second polymer sheets 181, 182 during thermoforming of the polymer sheets 181, 182, as discussed with respect to FIG. 32. As shown in FIG. 27 the plates 163, 165 extend through the entire cushioning component 132, in the forefoot portion 184, the midfoot portion 186, and the heel portion 188. In other embodiments, the plates 163, 165 may extend in only one or only two of the forefoot portion 184, the midfoot portion 186, and the heel portion 188, or multiple tether elements can be secured to the first and second polymer sheets 181, 182 within the chamber 143.

The cushioning component 132 also includes a plurality of tethers 168 secured to the first plate 163 and to the second plate 165 and extending in the fluid-filled chamber 143 between the first plate 163 and the second plate 165. The tethers 168 are placed in tension by fluid in the chamber 143, and, because they are secured to the plates 163, 165, act to control the shape of the cushioning component 132 when the chamber 143 is filled with pressurized fluid. The tethers 168 may be any of a variety of different configurations including single strands of textile tensile members secured at each end to plates 163, 165, or repeatedly passing through one or both plates 163, 165. Various configurations of tethers are shown and described in U.S. Pat. No. 8,479,412, which is hereby incorporated by reference in its entirety.

Multiple rows of tethers 168 are present and extend across a width of the plates 163, 165 between the lateral side 14 and the medial side 15 of the article of footwear 110. FIG. 27 shows multiple rows of tethers 168 extending laterally and positioned in the forefoot region 11, the midfoot region 12, and the heel region 13. Each tether 168 shown in the cross-section of FIG. 29 is in one row, and each tether 168 shown in the cross-section of FIG. 29 is in a different row than the row shown in FIG. 29.

The outsole 160 has a bottom portion 142, a medial side portion 145, and a lateral side portion 146. As shown in FIG. 27, the bottom portion 142 is bonded to an outer surface 147 of the second polymer sheet 182 at the bottom wall 124 of the cushioning component 132. The bottom portion 142 of the outsole 160 is coextensive with the bottom wall 124 of the cushioning component 132. The medial side portion 145 of the outsole 160 is bonded to the outer surface 147 of the second polymer sheet 182 at the medial side wall 126 of the cushioning component 132, and the lateral side portion 146 of the outsole 160 is bonded to the outer surface 147 of the second polymer sheet 182 at the lateral side wall 128 of the cushioning component 132.

One or both of the side portions 145, 146 of the outsole 160 may include one or more peaks and one or more valleys. For example, at least one of the lateral side portion 146 and the medial side portion 145 may form at least one peak disposed between the midfoot portion 186 and the heel portion 188, and at least one valley disposed rearward of the at least one peak. In the embodiment shown, the peaks may be referred to as spaced fingers and the valleys may be referred to as notches defined by the spaced fingers. In particular, a peak that has a height greater than its width may be referred to as a finger, and a valley that has a depth greater than its width may be referred to as a notch. For example, with reference to FIG. 27, the lateral side portion 146 includes a plurality of spaced peaks 148A, 148B, 148C, 148D, 148E, 148F, 148G, 148H, 148I and valleys 150A, 150B, 150C, 150D, 150E, 150F, 150G, 150H, 150I between adjacent ones of the peaks 148A, 148B, 148C, 148D, 148E, 148F, 148G, 148H, 148I. Similarly, FIG. 28 shows that the medial side portion 145 of the outsole 160 includes a plurality of spaced peaks 148J, 148K, 148L, 148M, 148N, 148O, 148P, 148Q, 148R, 148S, 148T, and 148U and valleys 150J, 150K, 150L, 150M, 150N, 150O, 150P, 150Q, 150R, and 150S between adjacent ones of the peaks 148J, 148K, 148L, 148M, 148N, 148O, 148P, 148Q, 148R, 148S, 148T, and 148U. Additional peaks and valleys may be included between peaks 148O and 148P at a portion of the outsole 160 covered by the upper 120 in the view of FIG. 28.

FIGS. 27 and 28 show that the peaks 148A, 148B, 148C, 148D, 148E, 148F, 148G, 148H, 148I, 148J, 148K, 148L, 148M, 148N, 148O, 148P, 148Q, 148R, 148S, 148T, and 148U are at least partially aligned with the tether element 162. The peaks 148A, 148B, 148C, 148D, 148E, 148F, 148G, 148H, 148I, 148J, 148K, 148L, 148M, 148N, 148O, 148P, 148Q, 148R, 148S, 148T, and 148U are positioned along the forefoot portion 184, the midfoot portion 186 and the heel portion 188 of the cushioning component 132, and the tether element 162 extends in each of these portions. At least some of the peaks 148A, 148B, 148C, 148D, 148E, 148F, 148G, 148H, 148I, 148J, 148K, 148L, 148M, 148N, 148O, 148P, 148Q, 148R, 148S, 148T, and 148U are also aligned with one or more rows of the tethers 168. A peak is aligned with a row of tethers 168 when it is positioned laterally adjacent the row. For example, FIG. 27 shows peak 148D laterally aligned with two different rows R1, R2 of the tethers 168. The valleys 150C, 150D, on the other hand, may be aligned with spaces between the rows of tethers 168. The positioning of the peaks and the valleys relative to the rows of tethers 168 can provide support to and flexibility of the cushioning component 132, respectively. There may be fewer or more peaks and valleys than shown in the embodiment of FIGS. 27 and 28, and the peaks and valleys may have different shapes than shown. For example, the peaks may be wider than shown, each extending further forward and rearward along the medial or lateral side portion 145 or 146. In some embodiments, there may be only one peak. The single peak may be positioned at or rearward of the midfoot portion 186, and a valley may be rearward of the single peak.

The spaced peaks 148A, 148B, 148C, 148D, 148E, 148F, 148G, 148H, 148I, 148J, 148K, 148L, 148M, 148N, 148O, 148P, 148Q, 148R, 148S, 148T, and 148U are configured to vary in height. In the embodiment shown in FIG. 27, a first one of the peaks 148B is at the heel portion 188 and has a first height H1. The height of each peak may be measured from a baseline at a lowest extend of an adjacent valley, to an upper edge of the peak 148B. For example, as shown in FIG. 27, the height H1 of peak 148B is from the baseline 152 at the lowest extent of valley 150A to the upper edge 154. A second one of the peaks 148H is at the forefoot portion 184 and has a second height H2 less than the first height H1. Generally, peaks in the heel portion 188 have a greater height than peaks in the forefoot portion. The peaks in the midfoot portion 186 have heights less than the heights of the peaks in the heel portion. Optionally, the peaks in the midfoot portion 186 can have a height less than the height of the peaks in the forefoot portion 184. For example, a third one of the peaks 148E is at the midfoot portion 186 and has a third height H3 less than the second height H2.

In the embodiment of FIGS. 27-30 the entire outsole 160 is substantially transparent, and may be a substantially transparent thermoplastic polyurethane material. The polymer sheets 181, 182 can also be substantially transparent. This allows the tethers 168 to be viewed through the outsole 160 and the second sheet 182. The tethers 168 can be viewed through both the peaks and the valleys. Those skilled in the art will readily understand a variety of methods to determine transparency of an object, such as by a test of luminous transmittance and haze. For example, the luminous transmittance and haze of the cushioning component 132 and of the outsole 160 can be determined according to American Society for Testing and Materials (ASTM) Standard D1003-00, Standard Test Method for Haze and Luminous Transmittance of Transparent Plastics.

Figure 31:
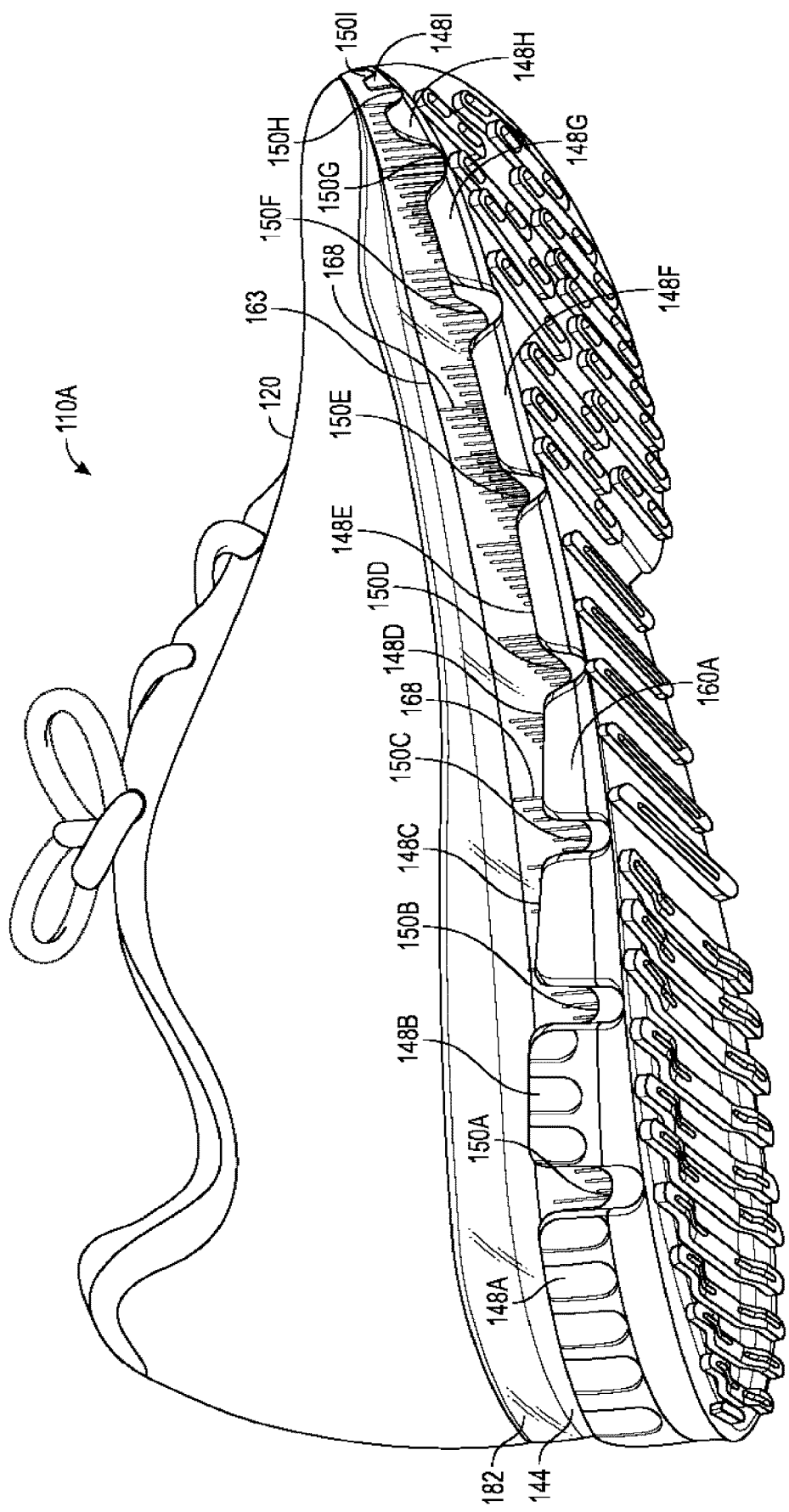
FIG. 31 is a schematic perspective illustration of another configuration of an article of footwear.

FIG. 31 shows an alternative embodiment of an article of footwear 110A alike in all aspects to the article of footwear 110, except that an outsole 160A is used that is not substantially transparent. For example, the outsole 160A can be an opaque material, such as a durable rubber material. In such an embodiment, the tethers 168 can be viewed through the second sheet 182 at the valleys of the outsole 160A, but not through the peaks of the outsole 160A, as illustrated with respect to peaks 148A-148I and valleys 150A-150I.

With reference to FIG. 29, the cushioning component 132 is secured to the upper 120 so that a bottom surface 190 of the upper 120 is secured to and supported on the top wall 122 of the cushioning component 132, and the peripheral flange 144 is bonded to the lateral surface 134 and the medial surface 136 of the upper 120. In an embodiment in which an additional footwear component, such as additional midsole layer, is positioned between the cushioning component 132 and the upper 120, the flange 144 could bond to and cup the additional footwear component in addition to or instead of the upper 120, depending upon how far upward the flange 144 extends.

Figure 32:
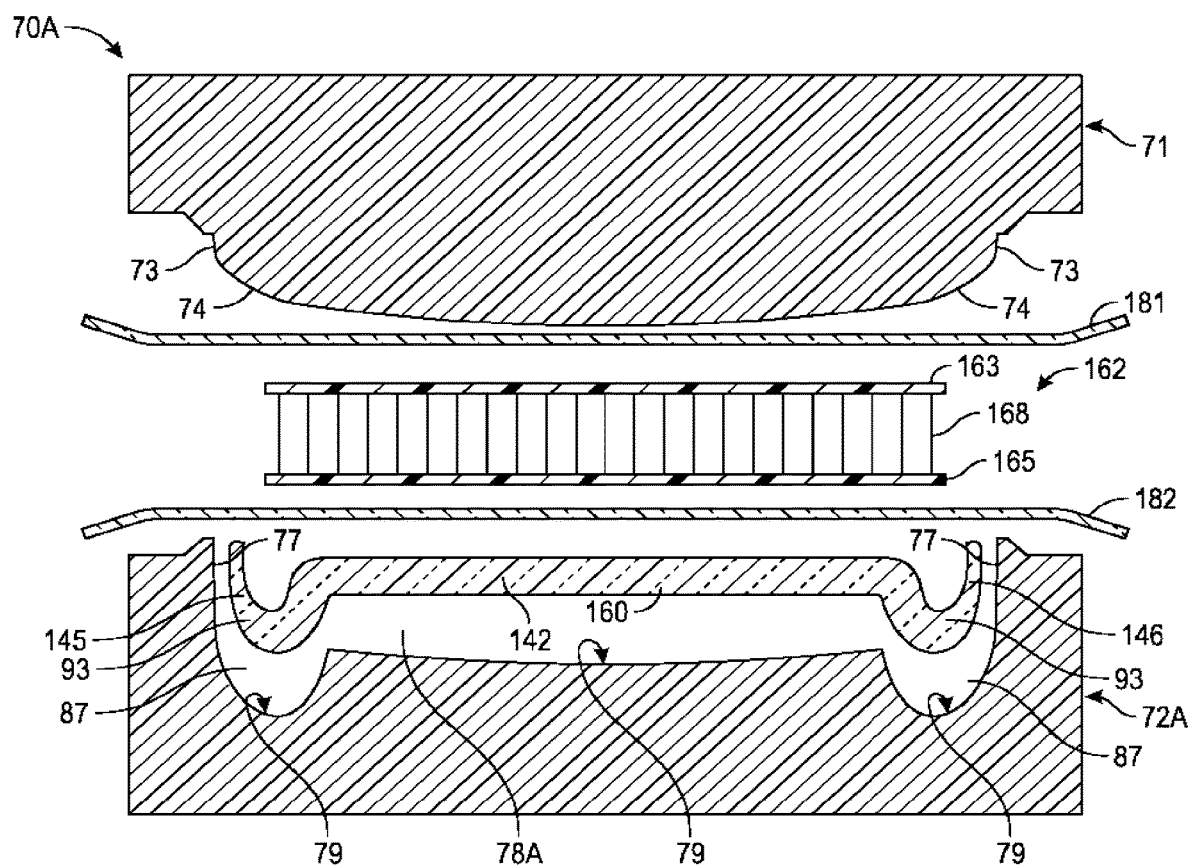
FIG. 32 is a schematic illustration in exploded cross-sectional view of a sole structure of the article of footwear of FIG. 27 and a mold assembly for a manufacturing process.

FIG. 32 shows a mold assembly 70A that can be used to manufacture the cushioning component 132. Features of the mold assembly 70A that are the same as those described with respect to mold 70 are indicated with like reference numbers. The mold assembly 70A is substantially identical to the mold 70 of FIG. 22A except that a second mold portion 72A is used that has an inner surface 79 shaped with relatively deep side grooves or depressions 87, also referred to as accumulator portions, and a shallower central depression 78A. The outsole 160 is preformed in the shape shown in FIG. 32 that generally corresponds to the inner surface 79, with protrusions 93 at the intersection of the bottom portion 142 and the side portions 145, 146. The preformed shape of the outsole 160 with the protrusions 93 and the inner surface 79 of the mold portion 72A shown in FIG. 32 enables the plates 163, 165 to be compressed against and thermally bond to the first and second polymer sheets 181, 182 when the mold assembly 70A is closed, at the same time that the sheets 181, 182 are compressed and thermally bond to one another at the flange 144. After thermoforming, upon inflation of the fluid-filled chamber 43, the internal pressure causes the protrusions 93 to generally flatten out relative to the bottom portion 142, as shown in FIG. 29.

A method of manufacturing the article of footwear 110 or 110A using the mold 70A includes disposing first and second polymer sheets 181, 182 in a mold assembly 70A, and disposing a preformed unitary outsole, such as outsole 160 or 160A in the mold assembly 70A adjacent the second polymer sheet 182. The method may also include disposing the tether element 162 in the mold assembly 70A between the first and second polymer sheets 181, 182. The tether element 162 can be formed and inflated prior to placement in the mold assembly 70A, placing the tethers 168 in tension. The outsole 160 or 160A is disposed so that the second polymer sheet 182 is between the tether element 162 and the outsole 160 or 160A. The outsole 160 or 160A may be preformed by injection molding or otherwise prior to placement in the mold assembly 70A. Disposing the preformed unitary outsole 160 adjacent the second polymer sheet 182 may include aligning the peaks 148A, 148B, 148C, 148D, 148E, 148F, 148G, 148H, 148I, 148I, 148K, 148L, 148M, 148N, 148O, 148P, 148Q, 148R, 148S, 148T, and 148U with the tether element 162, such as with the rows of tethers 168, as discussed with respect to FIG. 27.

The first and second polymer sheets 181 and 182 may be preheated prior to placement in the mold assembly 70A to aid in formability of the sheets to the mold surfaces. The mold assembly 70A is closed. Heat and pressure are applied to thermoform the sheet 181 to the surface of the mold portion 71. Vacuum forming may be used to draw the sheet 181 against the mold portion 71, and to draw the sheet 182 against the outsole 160, and against the portions of the surface of the mold portion 72A where the flange 144 is formed.

The components within the mold assembly 70A thermally bond to one another during the thermoforming process. More specifically, the first and second polymer sheets 181, 182 thermally bond to one another at the flange 144 to form the cushioning component 132 with the chamber 143 containing the tether element 162. The tether element 162 thermally bonds to inner surfaces 164, 166 of the first and second polymer sheets 181, 182, respectively. The first plate 163 thermally bonds to the top wall 122 of the first polymer sheet 181, and the second plate 165 thermally bonds to the bottom wall 124 of the second polymer sheet 182. Additionally, the bottom portion 170 of the outsole 160 thermally bonds to the outer surface 147 of the bottom wall 124 of the second polymer sheet 182. The medial side portion 145 of the outsole 160 thermally bonds to the medial side wall 126 of the second polymer sheet 182. The lateral side portion 146 of the outsole 160 thermally bonds to the lateral side wall 128 of the second polymer sheet 182.

After the cushioning component 132 is formed with the outsole 160 thermally bonded thereto, the cushioning component 132 is removed from the mold assembly 70A, and the peripheral flange 144 is secured to the side surfaces 134, 136 of an additional footwear component, such as the upper 120. The peripheral flange 144 is also secured to the surface of the upper 120 at the rear of the heel portion 13 and at the front of the forefoot portion 11 as is evident in FIG. 27. The flange 144 thus cups the entire periphery of the upper 120 and the first polymer sheet 181 extends across the entire bottom surface 190 of the upper 120. An insole 192 can be secured in the upper 120.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The invention claimed is:

1. A sole structure for an article of footwear, the sole structure comprising:
   a fluid-filled chamber including (i) a first portion, a second portion, and a third portion in fluid communication with one another and cooperating to provide the fluid-filled chamber with a substantially U-shape and (ii) a web area covering an entire area between the first portion, the second portion, and the third portion, the first portion and the second portion being spaced apart from one another across a width of the sole structure between a medial side of the sole structure and a lateral side of the sole structure by a gap; and
   a foam element disposed within the gap, contacting the first portion, the second portion, and the third portion of the fluid-filled chamber, and including a constant taper in a direction away from one of the first portion, the second portion, and the third portion.

2. The sole structure of claim 1, wherein the fluid-filled chamber and the foam element are disposed in a heel region of the sole structure.

3. The sole structure of claim 1, wherein the first portion extends along one of a medial side of the sole structure and a lateral side of the sole structure and the second portion extends along the other of the medial side of the sole structure and the lateral side of the sole structure.

4. The sole structure of claim 3, wherein the third portion extends between and joins the first portion and the second portion, the third portion extending from the medial side of the sole structure to the lateral side of the sole structure along a heel region of the sole structure.

5. The sole structure of claim 1, wherein the fluid-filled chamber includes an outer surface defined by a first outer surface of the first portion, a second outer surface of the second portion, a third outer surface of the third portion, and an outer surface of the web area.

6. The sole structure of claim 5, wherein the outer surface of the web area is concave.

7. The sole structure of claim 1, wherein the foam element abuts the web area.

8. A sole structure for an article of footwear, the sole structure comprising:
   a fluid-filled chamber extending continuously from a medial side of the sole structure to a lateral side of the sole structure along a heel region of the sole structure, the fluid-filled chamber including (i) a first portion extending along one of the medial side and the lateral side, (ii) a second portion extending along the other of the medial side and the lateral side, (iii) a third portion extending along the heel region between and fluidly coupling the first portion and the second portion and (iv) a web area covering an entire area between the first portion, the second portion, and the third portion, the first portion and the second portion being spaced apart from one another across a width of the sole structure between the medial side and the lateral side by a gap; and
   a foam element disposed within the gap, contacting the first portion, the second portion, and the third portion of the fluid-filled chamber, and including a constant taper in a direction away from one of the first portion, the second portion, and the third portion.

9. The sole structure of claim 8, wherein the web area is coplanar with an upper surface of the fluid-filled chamber.

10. The sole structure of claim 8, wherein the first portion, the second portion, and the third portion cooperate to provide the fluid-filled chamber with a substantially U-shape.

11. The sole structure of claim 8, wherein the first portion, the second portion, and the third portion include a substantially constant cross-sectional area.

12. The sole structure of claim 8, wherein the fluid-filled chamber includes a substantially constant cross-sectional area from the medial side of the sole structure to the lateral side of the sole structure along the heel region.

13. The sole structure of claim 8, wherein the third portion extends between and joins the first portion and the second portion, the third portion extending from the medial side of the sole structure to the lateral side of the sole structure along the heel region.

14. The sole structure of claim 8, wherein the fluid-filled chamber includes an outer surface defined by a first outer surface of the first portion, a second outer surface of the second portion, a third outer surface of the third portion, and an outer surface of the web area.

15. The sole structure of claim 14, wherein the outer surface of the web area is concave.

16. The sole structure of claim 8, wherein the foam element abuts the web area.

17. The sole structure of claim 1, wherein the web area is coplanar with an upper surface of the fluid-filled chamber.

* * * * *